US011582415B2

(12) United States Patent
Sakakibara

(10) Patent No.: US 11,582,415 B2
(45) Date of Patent: *Feb. 14, 2023

(54) IMAGING APPARATUS AND ELECTRONIC EQUIPMENT

(71) Applicant: SONY SEMICONDUCTOR SOLUTIONS CORPORATION, Kanagawa (JP)

(72) Inventor: Masaki Sakakibara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,364

(22) Filed: Jul. 6, 2021

(65) Prior Publication Data

US 2021/0337146 A1    Oct. 28, 2021

Related U.S. Application Data

(63) Continuation of application No. 16/755,981, filed as application No. PCT/JP2018/037501 on Oct. 9, 2018, now Pat. No. 11,089,249.

(30) Foreign Application Priority Data

Oct. 23, 2017  (JP) ................. 2017-204203

(51) Int. Cl.
*H04N 5/374*    (2011.01)
*H04N 5/357*    (2011.01)

(52) U.S. Cl.
CPC ............. *H04N 5/374* (2013.01); *H04N 5/357* (2013.01)

(58) Field of Classification Search
CPC ........ H04N 5/357; H04N 5/363; H04N 5/365; H04N 5/374; H04N 5/378
See application file for complete search history.

(56) References Cited

U.S. PATENT DOCUMENTS

2002/0100921 A1  8/2002  Mabuchi et al.
2009/0059047 A1  3/2009  Murata et al.
(Continued)

FOREIGN PATENT DOCUMENTS

JP    2002-209149 A    7/2002
JP    2002-300476 A    10/2002
(Continued)

OTHER PUBLICATIONS

International Search Report and Written Opinion of PCT Application No. PCT/JP2018/037501, dated Dec. 5, 2018, 05 pages of English Translation and 05 pages of ISRWO.

(Continued)

*Primary Examiner* — Kevin K Pyo
(74) *Attorney, Agent, or Firm* — Chip Law Group

(57) ABSTRACT

The present technology relates to an imaging apparatus and electronic equipment that can reduce noise. A photoelectric conversion element, a conversion unit that converts a signal from the photoelectric conversion element into a digital signal, a bias circuit that supplies a bias current for controlling a current flowing through an analog circuit in the conversion unit, and a control unit that controls the bias circuit on the basis of an output signal from the conversion unit are provided, and at the start of transfer of a charge from the photoelectric conversion element, the control unit boosts a voltage at a predetermined position of the analog circuit. The conversion unit converts the signal from the photoelectric conversion element into a digital signal using a slope signal whose level monotonously decreases with time. The (Continued)

present technology is applicable to, for example, an imaging apparatus.

28 Claims, 40 Drawing Sheets

(56) References Cited

U.S. PATENT DOCUMENTS

| | | | |
|---|---|---|---|
| 2017/0272678 A1* | 9/2017 | Sakakibara | ......... H01L 27/1461 |
| 2017/0353683 A1 | 12/2017 | Sakakibara et al. | |
| 2019/0280025 A1 | 9/2019 | Sakakibara | |

FOREIGN PATENT DOCUMENTS

| | | | | |
|---|---|---|---|---|
| JP | 2007-151170 A | 6/2007 | | |
| KR | 20020060093 A | 7/2002 | | |
| WO | WO-2016009832 A1 * | 1/2016 | ........... | H01L 27/146 |
| WO | 2016/114153 A1 | 7/2016 | | |

OTHER PUBLICATIONS

International Preliminary Report on Patentability of PCT Application No. PCT/JP2018/037501, dated Dec. 25, 2018, 05 pages of English Translation and 04 pages of IPRP.
Notice of Allowance for U.S. Appl. No. 16/755,981, dated Feb. 4, 2021, 9 pages.

* cited by examiner

IMAGING APPARATUS AND ELECTRONIC EQUIPMENT

CROSS REFERENCE TO RELATED APPLICATIONS

This application is continuation application of U.S. patent application Ser. No. 16/755,981, filed on Apr. 14, 2020, which is a U.S. National Phase of International Patent Application No. PCT/JP2018/037501 filed on Oct. 9, 2018, which claims priority benefit of Japanese Patent Application No. JP 2017-204203 filed in the Japan Patent Office on Oct. 23, 2017. Each of the above-referenced applications is hereby incorporated herein by reference in its entirety.

TECHNICAL FIELD

The present technology relates to an imaging apparatus and electronic equipment, and to an imaging apparatus and electronic equipment that are capable of adaptively changing a noise level and capturing an image with improved image quality.

BACKGROUND ART

Conventionally, in electronic equipment having an imaging function such as a digital still camera or a digital video camera, an image sensor, for example, a charge coupled device (CCD), a complementary metal oxide semiconductor (CMOS) image sensor, or the like is used.

The image sensor has a pixel in which a photodiode (PD) that performs photoelectric conversion and a plurality of transistors are combined, and an image on the basis of pixel signals output from the plurality of pixels arranged in a plane is constructed. Furthermore, the pixel signals output from the pixels are AD-converted in parallel, for example, by a plurality of analog to digital (AD) converters arranged with respect to each pixel column, and output.

Patent Document 1 proposes an imaging apparatus that reduces power consumption and random noise.

CITATION LIST

Patent Document

Patent Document 1: Japanese Patent Application Laid-Open No. 2007-151170

SUMMARY OF THE INVENTION

Problems to be Solved by the Invention

The noise level of the image sensor is defined by thermal noise, 1/f noise, and quantization noise. In order to reduce the thermal noise, it is conceivable to improve the gm of the circuit, but this leads to an increase in current consumed by the analog circuit, which can increase power.

Furthermore, the 1/f noise is sensitive to current, but it is mainly determined by the area and the process, and measures for these can lead to increased costs. The quantization noise is uniquely determined by the resolution of the AD converter, but at low illuminance, it is defined by the random noise of the image sensor itself and the quantization noise of the AD converter. The thermal noise and the 1/f noise of the random noise depend on the amount of current consumed by the analog circuit.

The present technology has been made in view of such a situation to enable the current consumed in the analog circuit to be adaptively variably adjusted from the AD converted output signal to reduce power at high illumination and achieve low noise at low illumination.

Solutions to Problems

An imaging apparatus according to an aspect of the present technology includes: a photoelectric conversion element; a conversion unit configured to convert a signal from the photoelectric conversion element into a digital signal; a bias circuit configured to supply a bias current for controlling current flowing through an analog circuit in the conversion unit; and a control unit configured to control the bias circuit on the basis of an output signal from the conversion unit, in which at start of transfer of a charge from the photoelectric conversion element, the control unit boosts a voltage at a predetermined position of the analog circuit.

Electronic equipment according to an aspect of the present technology includes: an imaging apparatus including: a photoelectric conversion element; a conversion unit configured to convert a signal from the photoelectric conversion element into a digital signal; a bias circuit configured to supply a bias current for controlling current flowing through an analog circuit in the conversion unit; and a control unit configured to control the bias circuit on the basis of an output signal from the conversion unit, in which at start of transfer of a charge from the photoelectric conversion element, the control unit boosts a voltage at a predetermined position of the analog circuit.

The imaging apparatus according to an aspect of the present technology includes: a photoelectric conversion element; a conversion unit configured to convert a signal from the photoelectric conversion element into a digital signal; a bias circuit configured to supply a bias current for controlling a current flowing through an analog circuit in the conversion unit; and a control unit configured to control the bias circuit on the basis of an output signal from the conversion unit. Furthermore, at the start of transfer of a charge from the photoelectric conversion element, the control unit boosts a voltage at a predetermined position of the analog circuit.

Electronic equipment according to an aspect of the present technology includes the imaging apparatus.

Note that the imaging apparatus and the electronic equipment may be independent apparatuses or may be internal blocks constituting a single apparatus.

Effects of the Invention

According to an aspect of the present technology, low power consumption at high illuminance and low noise at low illuminance can be achieved by adaptively variably adjusting the current consumed by the analog circuit from the AD converted output signal.

Note that effects described herein are not necessarily limited, but may also be any of those described in the present disclosure.

MODE FOR CARRYING OUT THE INVENTION

Modes for carrying out the present technology (hereinafter, the embodiments) will be described below.

<Schematic Configuration Example of the Imaging Apparatus>

Figure 1:
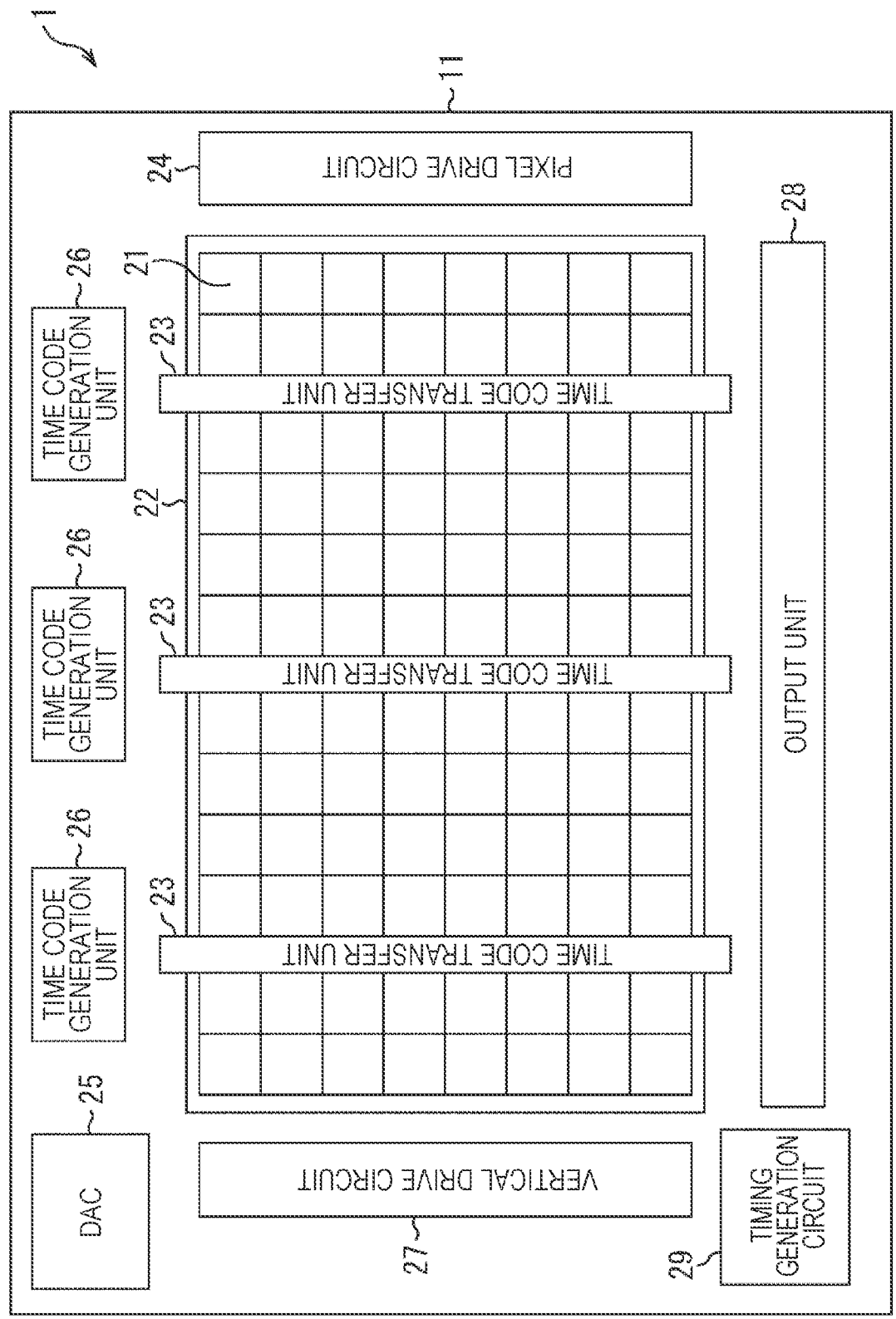
FIG. 1 is a diagram illustrating a schematic configuration of an imaging apparatus according to the present disclosure.

FIG. 1 illustrates a schematic configuration of an imaging apparatus according to the present disclosure.

An imaging apparatus 1 in FIG. 1 includes a pixel array unit 22 in which pixels 21 are arranged in a two-dimensional array pattern on a semiconductor substrate 11 using, for example, silicon (Si) as a semiconductor. The pixel array unit 22 is also provided with time code transfer units 23 that transfer a time code generated by time code generation units 26 to each pixel 21. Then, around the pixel array unit 22 on the semiconductor substrate 11, a pixel drive circuit 24, a D/A converter (DAC) 25, the time code generation units 26, a vertical drive circuit 27, an output unit 28, and a timing generation circuit 29 are formed.

As will be described later with reference to FIG. 2, each of the pixels 21 arranged in a two-dimensional array pattern is provided with a pixel circuit 41 and an ADC 42. The pixel 21 generates a charge signal corresponding to the amount of light received by a light receiving element (e.g., a photodiode) in the pixel is generated, converts it into a digital pixel signal SIG, and outputs the pixel signal SIG.

The pixel drive circuit 24 drives the pixel circuit 41 (FIG. 2) in the pixel 21. The DAC 25 functions as a generation unit that generates a reference signal (reference voltage signal) REF, which is a slope signal whose level (voltage) monotonously decreases with time, and supplies the generated reference signal REF to each pixel 21. The time code generation unit 26 generates a time code used when each pixel 21 converts the analog pixel signal SIG into a digital signal (AD conversion), and supplies the time code to the corresponding time code transfer unit 23.

A plurality of time code generation units 26 is provided with respect to the pixel array unit 22, and as many time code transfer units 23 as the number corresponding to the time code generation units 26 are provided in the pixel array unit 22. That is, the time code generation unit 26 and the time code transfer unit 23 that transfers the time code generated thereby correspond one-to-one.

The vertical drive circuit 27 performs control to cause the output unit 28 to output the digital pixel signal SIG generated in the pixel 21 in a predetermined order on the basis of a timing signal supplied from the timing generation circuit 29. The digital pixel signal SIG output from the pixel 21 is output from the output unit 28 to the outside of the imaging apparatus 1. The output unit 28 performs predetermined digital signal processing such as black level correction processing for correcting the black level, correlated double sampling (CDS) processing, or the like, as necessary, and then outputs the resulting signal to the outside.

The timing generation circuit 29 includes a timing generator or the like that generates various timing signals, and supplies the generated various timing signals to the pixel drive circuit 24, the DAC 25, the vertical drive circuit 27, and the like.

The imaging apparatus 1 is configured as described above. Note that, in FIG. 1, as described above, it has been described that all the circuits constituting the imaging apparatus 1 are formed on one semiconductor substrate 11. However, as will be described later, the circuits constituting the imaging apparatus 1 may be configured to be separately arranged on a plurality of semiconductor substrates 11.

<Detailed Configuration Example of the Pixel>

Figure 2:
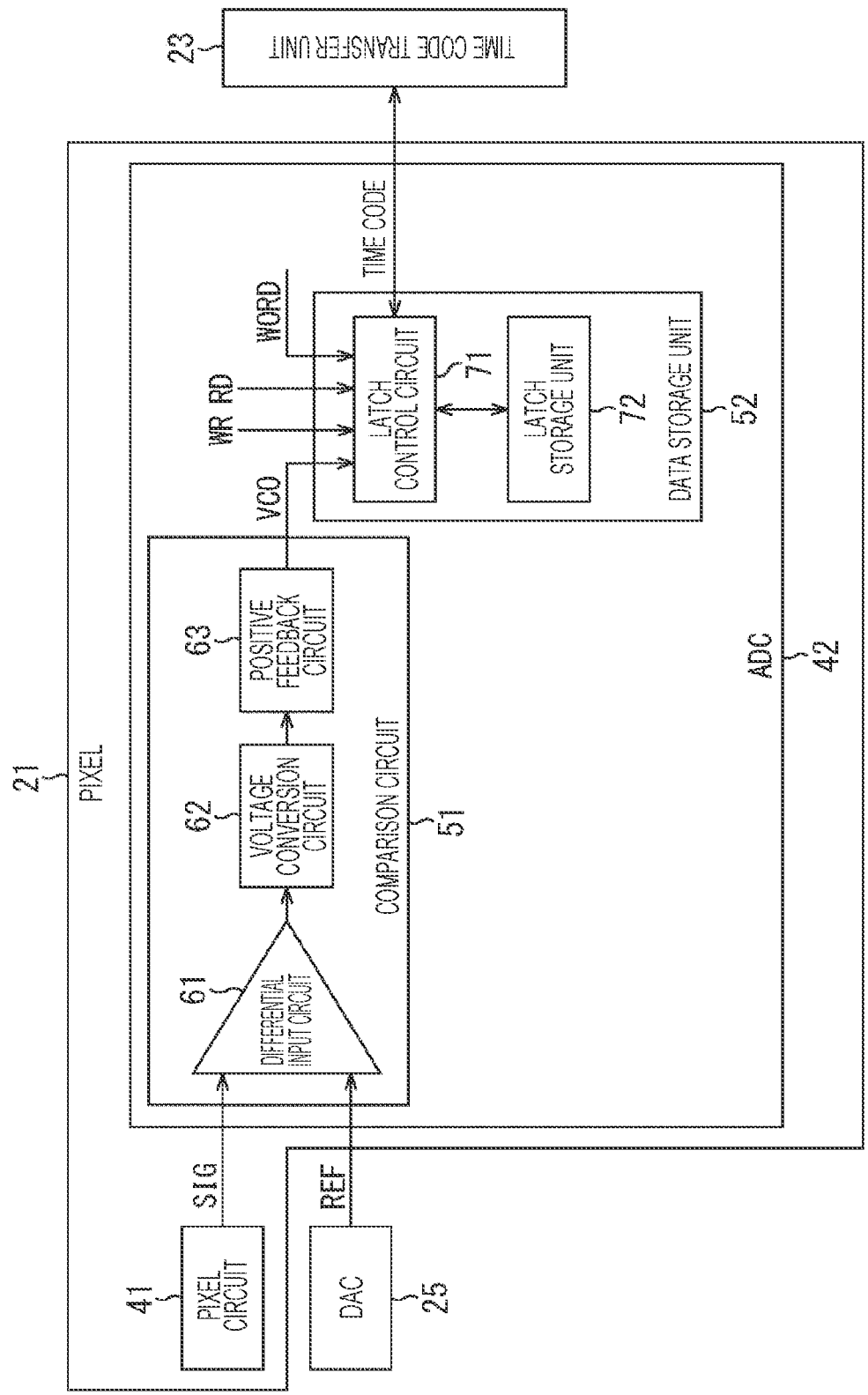
FIG. 2 is a block diagram illustrating a detailed configuration example of a pixel.

FIG. 2 is a block diagram illustrating a detailed configuration example of the pixel 21.

The pixel 21 includes the pixel circuit 41 and the ADC (AD converter) 42.

The pixel circuit 41 outputs a charge signal corresponding to the received light amount to the ADC 42 as an analog pixel signal SIG. The ADC 42 converts the analog pixel signal SIG supplied from the pixel circuit 41 into a digital signal.

The ADC 42 includes a comparison circuit 51 and a data storage unit 52.

The comparison circuit 51 compares the reference signal REF supplied from the DAC 25 with the pixel signal SIG, and outputs an output signal VCO as a comparison result signal indicative of a comparison result. The comparison circuit 51 inverts the output signal VCO when the reference signal REF and the pixel signal SIG are the same (voltage).

The comparison circuit 51 includes a differential input circuit 61, a voltage conversion circuit 62, and a positive feedback circuit (PFB) 63. Details will be described later with reference to FIG. 3.

In addition to receiving the output signal VCO from the comparison circuit 51, the data storage unit 52 receives a WR signal indicating a pixel signal writing operation and an RD signal indicating a pixel signal reading operation from the vertical drive circuit 27, and a WORD signal for controlling the read timing of the pixel 21 during a read operation of the pixel signal from the vertical drive circuit 27. Furthermore, the time code generated by the time code generation unit 26 is also supplied via the time code transfer unit 23.

The data storage unit 52 includes a latch control circuit 71 that controls a write operation and a read operation for a time code on the basis of the WR signal and the RD signal, and a latch storage unit 72 that stores the time code.

In the time code writing operation, the latch control circuit 71 causes the latch storage unit 72 to store the time code supplied from the time code transfer unit 23 and updated every unit time while the Hi (High) output signal VCO is input from the comparison circuit 51.

Then, when the reference signal REF and the pixel signal SIG are the same (voltage) and the output signal VCO supplied from the comparison circuit 51 is inverted to Lo (Low), writing (updating) of the supplied time code is stopped, and the time code stored last in the latch storage unit 72 is retained in the latch storage unit 72. The time code stored in the latch storage unit 72 represents the time when the pixel signal SIG and the reference signal REF are equal, and data indicating that the pixel signal SIG was the reference voltage at that time, i.e., a digitized light amount value.

After the sweep of the reference signal REF ends, and the time code is stored in the latch storage units 72 of all the pixels 21 in the pixel array unit 22, the operation of the pixel 21 is changed from the write operation to the read operation.

In the time code read operation, the latch control circuit 71 outputs the time code (digital pixel signal SIG) stored in the latch storage unit 72 to the time code transfer unit 23 when the pixel 21 has reached its own read timing on the basis of the WORD signal that controls the read timing. The time code transfer unit 23 sequentially transfers the supplied time code in the column direction (vertical direction) and supplies it to the output unit 28.

In the following, in order to distinguish from the time code written in the latch storage unit 72 in the time code write operation, the digitized pixel data indicating that the pixel signal SIG was the reference voltage at that time, which is an inverted time code when the output signal VCO read from the latch storage unit 72 in the time code read operation is inverted, is also referred to as AD converted pixel data.

<First Configuration Example of the Comparison Circuit>

Figure 3:
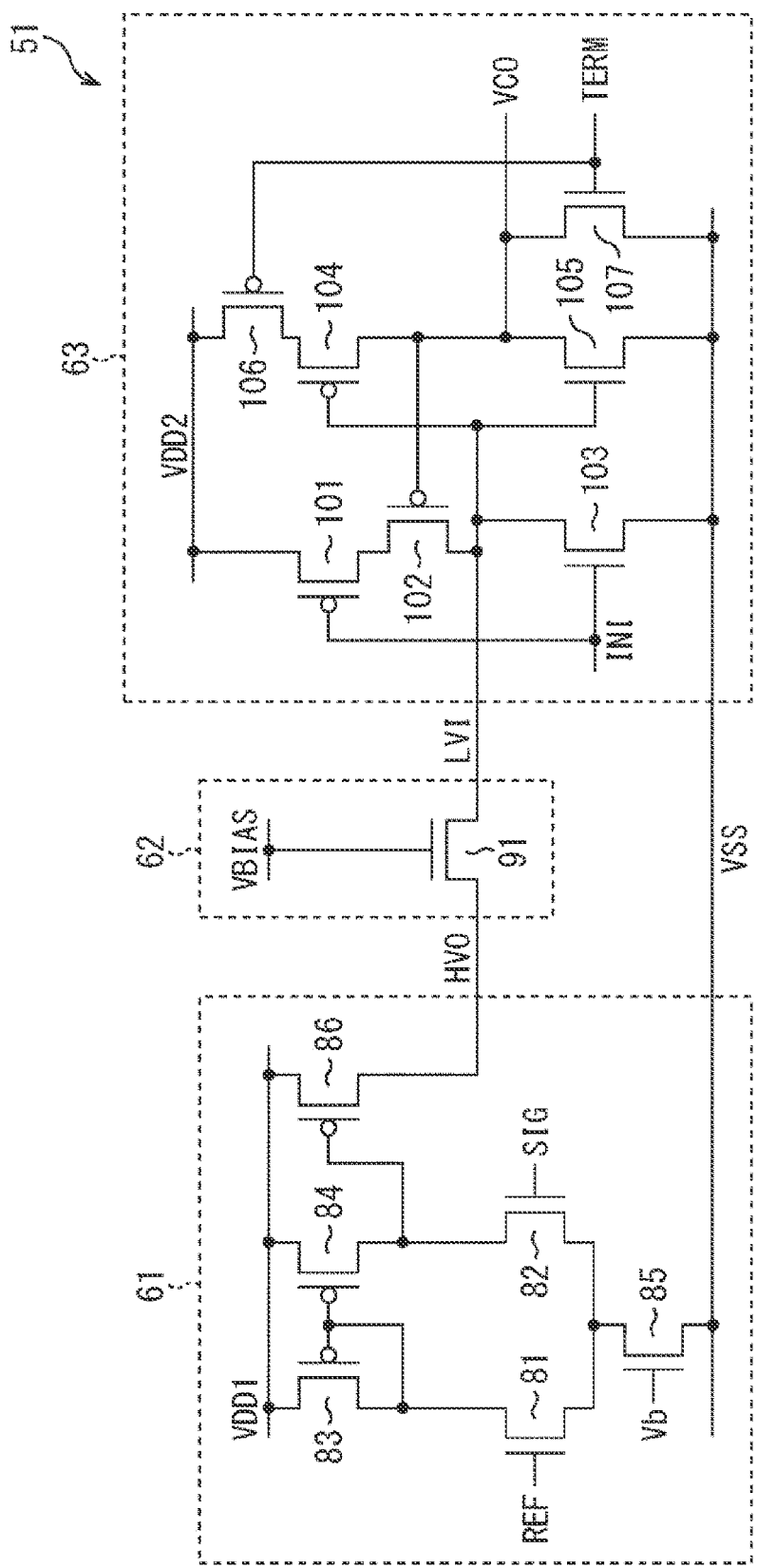
FIG. 3 is a block diagram illustrating a detailed configuration example of a comparison circuit.

FIG. 3 is a circuit diagram illustrating a detailed configuration of the differential input circuit 61, the voltage conversion circuit 62, and the positive feedback circuit 63 that constitute the comparison circuit 51.

The differential input circuit 61 compares the pixel signal SIG output from the pixel circuit 41 in the pixel 21 with the reference signal REF output from the DAC 25, and outputs a predetermined signal (current) when the pixel signal SIG is higher than the reference signal REF.

The differential input circuit 61 includes transistors 81 and 82 forming a differential pair, transistors 83 and 84 constituting a current mirror, a transistor 85 as a constant current source for supplying current Icm corresponding to input bias current Vb, and a transistor 86 for outputting output signal HVO of the differential input circuit 61.

The transistors 81, 82, and 85 are constituted by negative channel MOS (NMOS) transistors, and the transistors 83, 84, and 86 are constituted by positive channel MOS (PMOS) transistors.

Of the transistors 81 and 82 forming the differential pair, the reference signal REF output from the DAC 25 is input to the gate of the transistor 81, and the pixel signal SIG output from the pixel circuit 41 in the pixel 21 is input to the gate of the transistor 82. The sources of the transistors 81 and 82 are connected to the drain of the transistor 85, and the source of the transistor 85 is connected to a predetermined voltage VSS (VSS<VDD2<VDD1).

The drain of the transistor 81 is connected to the gates of the transistors 83 and 84 constituting the current mirror circuit and the drain of the transistor 83, and the drain of the transistor 82 is connected to the drain of the transistor 84 and the gate of the transistor 86. The sources of the transistors 83, 84, and 86 are connected to a first power supply voltage VDD1.

The voltage conversion circuit 62 includes, for example, an NMOS transistor 91. The drain of the transistor 91 is connected to the drain of the transistor 86 of the differential input circuit 61, the source of the transistor 91 is connected to a predetermined connection point in the positive feedback circuit 63, and the gate of the transistor 86 is connected to bias voltage VBIAS.

The transistors 81 to 86 that constitute the differential input circuit 61 are circuits that operate at a high voltage up to the first power supply voltage VDD1, and the positive feedback circuit 63 is a circuit that operates at a second power supply voltage VDD2 that is lower than the first power supply voltage VDD1. The voltage conversion circuit 62 converts the output signal HVO input from the differential input circuit 61 into a low voltage signal (conversion signal) LVI that allows the positive feedback circuit 63 to operate, and supplies it to the positive feedback circuit 63.

It is sufficient if the bias voltage VBIAS is a voltage that can be converted into a voltage that does not destroy the transistors 101 to 105 of the positive feedback circuit 63 operating at a constant voltage. For example, the bias voltage VBIAS can be the same voltage as the second power supply voltage VDD2 of the positive feedback circuit 63 (VBIAS=VDD2).

The positive feedback circuit 63 outputs a comparison result signal that is inverted when the pixel signal SIG is higher than the reference signal REF on the basis of the conversion signal LVI obtained by converting the output signal HVO from the differential input circuit 61 into a signal corresponding to the second power supply voltage VDD2. Furthermore, the positive feedback circuit 63 increases the transition speed when the output signal VCO output as the comparison result signal is inverted.

The positive feedback circuit 63 includes seven transistors 101 to 107. Here, the transistors 101, 102, 104, and 106 are configured by PMOS transistors, and the transistors 103, 105, and 107 are configured by NMOS transistors.

The source of the transistor 91 which is the output terminal of the voltage conversion circuit 62 is connected to the drains of the transistors 102 and 103 and the gates of the transistors 104 and 105. The source of the transistor 101 is connected to the second power supply voltage VDD2, the drain of the transistor 101 is connected to the source of the transistor 102, and the gate of the transistor 102 is connected to the drains of the transistors 104 and 105 that are also the output terminals of the positive feedback circuit 63.

The sources of the transistors 103, 105, and 107 are connected to the predetermined voltage VSS. An initialization signal INI is supplied to the gates of the transistors 101 and 103. A control signal TERM, which is a second input and is not the conversion signal LVI, which is a first input, is supplied to the gate of the transistor 106 and the gate of the transistor 107.

The source of the transistor 106 is connected to the second power supply voltage VDD2, and the drain of the transistor 106 is connected to the source of the transistor 104. The drain of the transistor 107 is connected to the output terminal of the comparison circuit 51, and the source of the transistor 107 is connected to the predetermined voltage VSS.

In the comparison circuit 51 configured as described above, when the control signal TERM that is the second input is set to Hi, the output signal VCO can be set to Lo regardless of the state of the differential input circuit 61.

For example, when the voltage of the pixel signal SIG falls below the final voltage of the reference signal REF due to a higher brightness than expected (for example, a sun image reflected in the angle of view of the imaging apparatus 1), the output signal VCO of the comparison circuit 51 becomes Hi and the comparison period ends, such that the data storage unit 52 controlled by the output signal VCO cannot fix the value and loses the AD conversion function.

In order to prevent such a situation from occurring, by inputting the Hi pulse control signal TERM at the end of the sweep of the reference signal REF, the output signal VCO that has not yet been inverted to Lo can be forcibly inverted. Since the data storage unit 52 stores (latches) the time code immediately before the forcible inversion, in a case where the configuration of FIG. 3 is adopted, the ADC 42 eventually functions as an AD converter that clamps the output value with respect to luminance input at a certain level or more.

When the bias voltage VBIAS is controlled to Lo level, the transistor 91 is shut off, and the initialization signal INI is set to Hi, the output signal VCO becomes Hi regardless of the state of the differential input circuit 61. Therefore, by combining the forced Hi output of the output signal VCO and the forced Lo output by the control signal TERM described above, the output signal VCO can be set to any value regardless of the states of the differential input circuit 61 and the pixel circuit 41 and the DAC 25, which are the preceding stage.

With this function, for example, it is possible to test a circuit subsequent to the pixel 21 with only an electric signal input without depending on an optical input to the imaging apparatus 1.

<Detailed Configuration Example of the Pixel Circuit>

Figure 4:
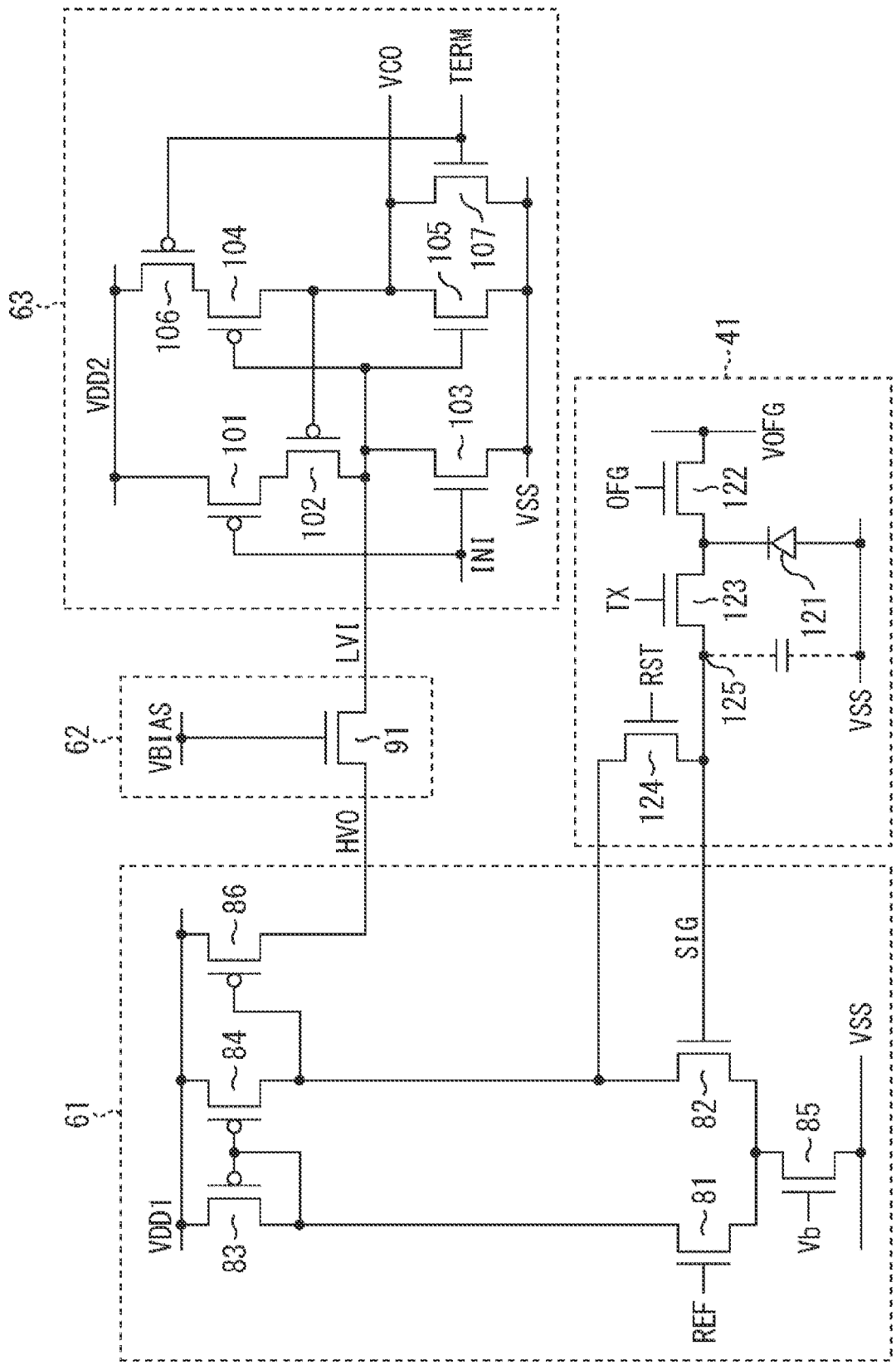
FIG. 4 is a diagram explaining a detailed configuration of a pixel circuit.

A detailed configuration of the pixel circuit 41 will be described with reference to FIG. 4. FIG. 4 is a circuit diagram illustrating details of the pixel circuit 41 in addition to the differential input circuit 61 of the comparison circuit 51 illustrated in FIG. 3.

The pixel circuit 41 includes a photodiode (PD) 121 as a photoelectric conversion element, a discharge transistor 122, a transfer transistor 123, a reset transistor 124, and an FD (floating diffusion layer) 125.

The discharge transistor 122 is used in a case where the exposure period is adjusted. Specifically, when the discharge transistor 122 is turned on when it is desired to start the exposure period at optimal timing, the charge accumulated in the photodiode 121 until then is discharged. Therefore, after the discharge transistor 122 is turned off, the exposure period starts.

The transfer transistor 123 transfers the charge generated by the photodiode 121 to the FD 125. A reset transistor 124 resets the charge held in the FD 125. The FD 125 is connected to the gate of the transistor 82 of the differential input circuit 61. Therefore, the transistor 82 of the differential input circuit 61 also functions as an amplification transistor of the pixel circuit 41.

The source of the reset transistor 124 is connected to the gate of the transistor 82 of the differential input circuit 61 and the FD 125, and the drain of the reset transistor 124 is connected to the drain of the transistor 82. Therefore, there is no fixed reset voltage for resetting the charge of FD 125. This is because the reset voltage for resetting the FD 125 can be arbitrarily set using the reference signal REF by controlling the circuit state of the differential input circuit 61, and the fixed pattern noise of the circuit is stored in the FD 125 so that its component can be cancelled by the CDS operation.

<Pixel Unit Timing Chart>

The operation of the pixel 21 illustrated in FIG. 4 will be described with reference to the timing chart of FIG. 5.

First, at time t1, the reference signal REF is set to reset voltage $V_{rst}$ that resets the charge of the FD 125 from standby voltage $V_{stb}$ up to then, and the charge of the FD 125 is reset by turning on the reset transistor 124. Furthermore, at time t1, the initialization signal INI supplied to the gates of the transistors 101 and 103 of the positive feedback circuit 63 is set to Hi, and the positive feedback circuit 63 is set to the initial state.

At time t2, the reference signal REF is raised to predetermined voltage $V_u$, and comparison between the reference signal REF and the pixel signal SIG (sweep of the reference signal REF) is started. At this point of time, because the reference signal REF is larger than the pixel signal SIG, the output signal VCO is Hi.

At time t3 when it is judged that the reference signal REF and the pixel signal SIG are the same, the output signal VCO is inverted (transitioned to Low). When the output signal VCO is inverted, the positive feedback circuit 63 speeds up the inversion of the output signal VCO as described above. Furthermore, the data storage unit 52 stores time data (N-bit DATA [1] to DATA [N]) at the point of time when the output signal VCO is inverted.

At time t4 when the signal write period ends and the signal read period starts, the voltage of the reference signal REF supplied to the gate of the transistor 81 of the comparison circuit 51 is reduced to the level at which the transistor 81 is turned off (standby voltage $V_{stb}$). Therefore, the current consumption of the comparison circuit 51 during the signal read period is suppressed.

At time t5, the WORD signal for controlling the read timing becomes Hi, and N-bit latched time signals DATA [0] to DATA [N] are output from the latch control circuit 71 of the data storage unit 52. The data acquired here is P-phase data at a reset level when correlated double sampling (CDS) processing is performed.

At time t6, the reference signal REF is raised to the predetermined voltage $V_u$, the initialization signal INI supplied to the gates of the transistors 101 and 103 is set to Hi, and the positive feedback circuit 63 is set to the initial state again.

At time t7, the transfer transistor 123 of the pixel circuit 41 is turned on by a Hi transfer signal TX, and the charge generated by the photodiode 121 is transferred to the FD 125.

After the initialization signal INI is returned to Low, the comparison between the reference signal REF and the pixel signal SIG (sweep of the reference signal REF) is started. At this point of time, because the reference signal REF is larger than the pixel signal SIG, the output signal VCO is Hi.

Then, at time t8 when it is judged that the reference signal REF and the pixel signal SIG are the same, the output signal VCO is inverted (transitioned to Low). When the output signal VCO is inverted, the positive feedback circuit 63 speeds up the inversion of the output signal VCO. Furthermore, the data storage unit 52 stores time data (N-bit DATA [1] to DATA [N]) at the point of time when the output signal VCO is inverted.

At time t9 when the signal write period ends and the signal read period starts, the voltage of the reference signal REF supplied to the gate of the transistor 81 of the comparison circuit 51 is reduced to the level at which the transistor 81 is turned off (standby voltage $V_{stb}$). Therefore, the current consumption of the comparison circuit 51 during the signal read period is suppressed.

At time t10, the WORD signal for controlling the read timing becomes Hi, and N-bit latched time signals DATA [0] to DATA [N] are output from the latch control circuit 71 of the data storage unit 52. The data acquired here is D-phase data of the signal level when CDS processing is performed. Time t11 is the same state as time t1 described above in which the next 1V (one vertical scanning period) is driven.

By the drive of the pixel 21 described above, first, P-phase data (reset level) is acquired and then read, and next D-phase data (signal level) is acquired and read.

With the above operation, each pixel 21 of the pixel array unit 22 of the imaging apparatus 1 can perform a global shutter operation in which all the pixels are reset simultaneously and all the pixels are exposed simultaneously. Because all the pixels can be exposed and read simultaneously, it is not necessary to provide a holding portion that holds a charge until the charge is read that is usually provided in the pixel. Furthermore, the configuration of the pixel 21 does not require a selection transistor or the like for selecting a pixel that outputs the pixel signal SIG, which is necessary for a column parallel read type imaging apparatus.

By the drive of the pixel 21 described with reference to FIG. 5, the discharge transistor 122 is always controlled to be off. However, as indicated by the broken lines in FIG. 5, at a desired time, a discharge signal OFG is set to Hi and the discharge transistor 122 is once turned on and then turned off to set an arbitrary exposure period.

<Regarding Noise>

Incidentally, the noise level of the imaging apparatus 1 (FIG. 1) is defined by thermal noise, 1/f noise, and quantization noise. In order to reduce the thermal noise, it is conceivable to improve the gm of the circuit, but the current consumed by the analog circuit is increased, and the power may be increased.

Furthermore, the 1/f noise is also sensitive to current, but it is mainly determined by the area and the process, and measures for these can increase costs. The quantization noise is uniquely determined by the resolution of the ADC 42, but at low illumination, it is defined by the random noise (thermal noise or 1/f noise) of the image sensor itself and the quantization noise of the ADC 42, and the thermal noise and the 1/f noise depend on the amount of current consumed by the analog circuit.

Thus, the imaging apparatus 1 that can achieve low power at high illumination and low noise at low illumination by adaptively variably adjusting the current consumed by the analog circuit from the AD converted output signal (output signal from ADC 42) will be further described below.

Figure 6:
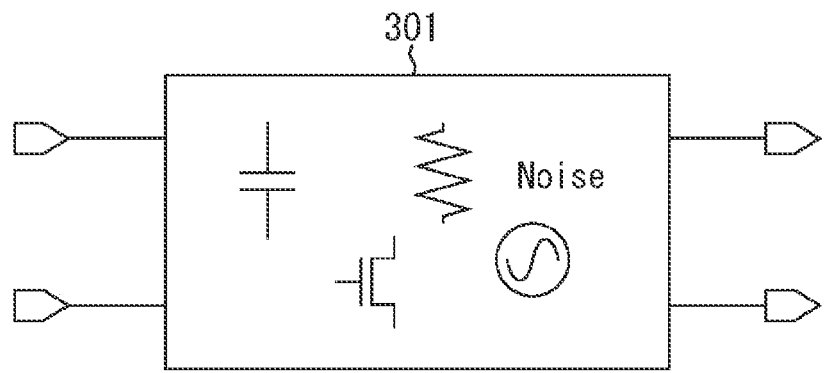
FIG. 6 is a diagram for explaining a configuration of a circuit including noise.

In the following description, noise will be illustrated and described as follows. As illustrated in FIG. 6, a predetermined circuit 301 is a circuit including noise. Noise is generated from a resistor element, a capacitor element, a transistor element, or the like in the circuit 301. It is assumed that external control for reducing the noise is performed on the circuit 301 including an element that may generate the noise.

Figure 7:
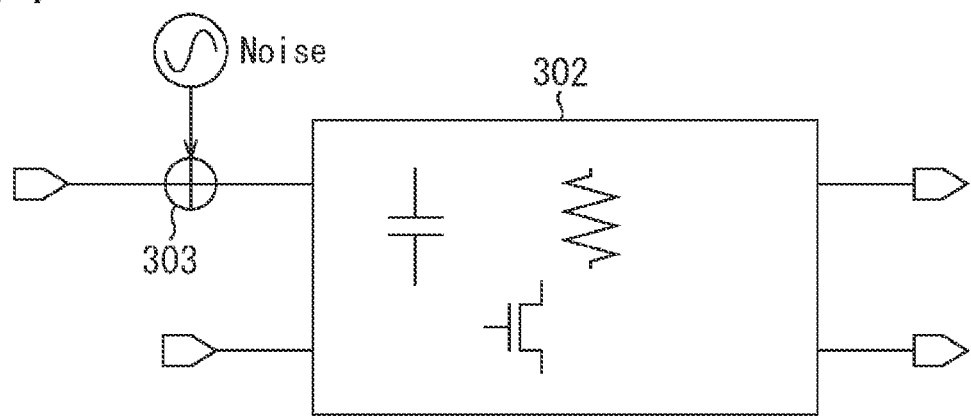
FIG. 7 is a diagram for explaining a configuration of a circuit including noise.

In this case, as illustrated in FIG. 7, the following explanation is given by describing that the noise is equivalently input-referred, a predetermined amount of noise is given by input, and the circuit 302 itself is noiseless. In the circuit diagram illustrated in FIG. 7, the circuit 302 is a circuit that does not generate noise. An adding unit 303 is provided outside the circuit 302, and a predetermined amount of noise is input to the adding unit 303. Since the adding unit 303 is connected to the circuit 302, as a result, noise is supplied to the circuit 302.

Figure 8:
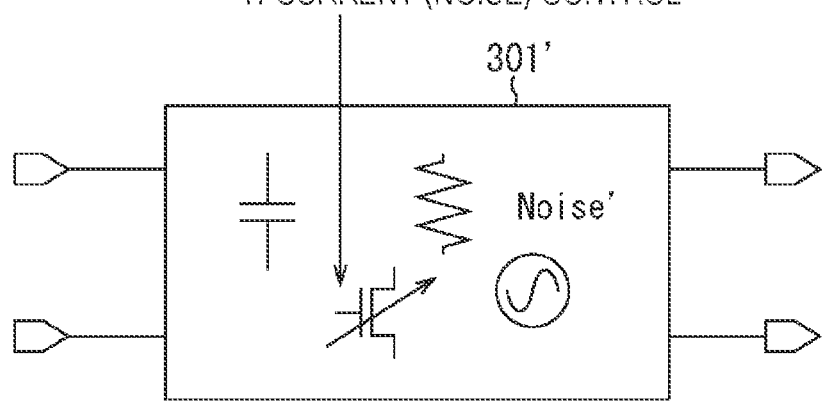
FIG. 8 is a diagram for explaining a configuration of a circuit including noise.

Referring to the circuit 301 illustrated in FIG. 6 again, for example, when the current flowing through the transistor element included in the circuit 301 is changed, the amount of noise is also changed. In other words, the amount of noise can be controlled by controlling the current flowing through the transistor element. Therefore, as illustrated in FIG. 8, it is conceived to control the current flowing through the transistor element in a circuit 301' (depicted with a prime for distinction from the circuit 301 illustrated in FIG. 6) to control the noise of the circuit 301'.

Figure 9:
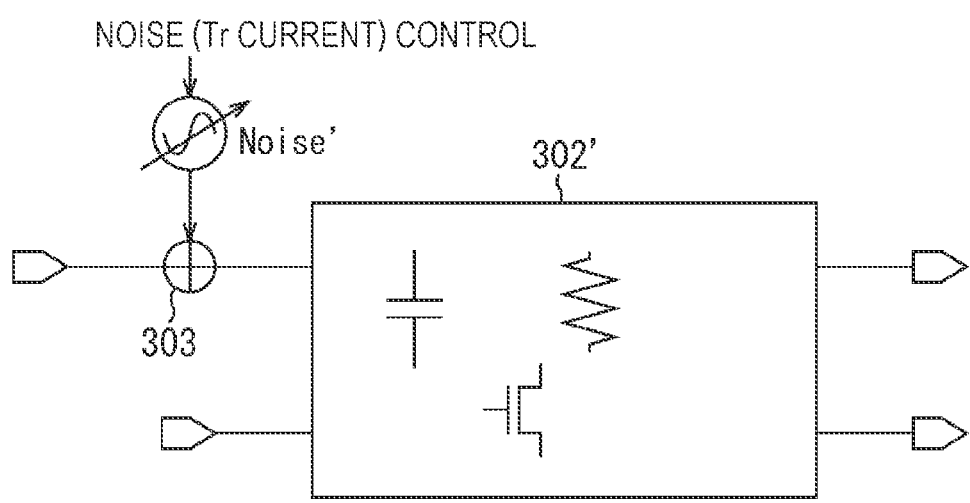
FIG. 9 is a diagram for explaining a configuration of a circuit including noise.

This can be represented by the noiseless circuit 302 illustrated in FIG. 7 as illustrated in FIG. 9. That is, referring to FIG. 9, the noise of the circuit 302' can be controlled by controlling the amount of noise input to the noiseless circuit 302' (the amount of noise input to the adding unit 303).

As described above, in the imaging apparatus 1 noise such as thermal noise, 1/f noise, and quantization noise occurs. The ADC 42 included in the imaging apparatus 1 includes, for example, a plurality of transistor elements as illustrated in FIG. 3. A further description will be given regarding the imaging apparatus 1 that controls the amount of noise generated in the ADC 42 by controlling the current flowing through these transistor elements and performs imaging with improved image quality.

<Configuration of the Imaging Apparatus that Performs Noise Control>

Figure 10:
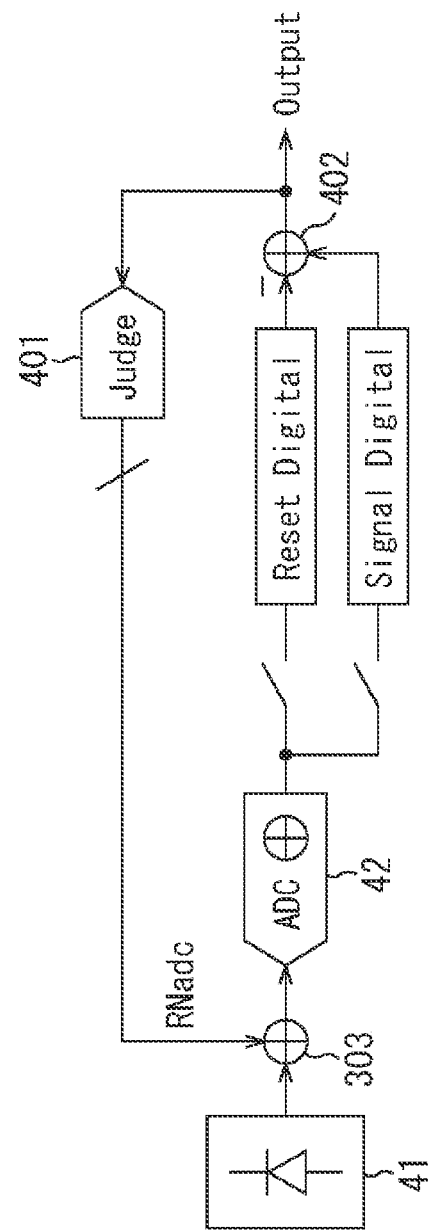
FIG. 10 is a diagram for explaining a configuration of a circuit including a judgement unit.

FIG. 10 is a diagram illustrating the configuration of an imaging apparatus that performs noise control, and particularly the configuration of the ADC 42 and peripheral circuits that include a configuration that controls the amount of noise generated in the ADC 42. In order to control the amount of noise generated in the ADC 42, a judgement unit 401 that performs judgement described later on the basis of the output from the ADC 42 is provided.

As a result of judgement by the judgement unit 401, the amount of noise supplied to the ADC 42 is controlled. As will be described later, the amount of noise is controlled by controlling the current flowing through a predetermined transistor element in the ADC 42. The judgement unit 401 functions as a control unit that controls the current in the ADC 42.

As output from the ADC 42, reset digital data and signal digital data are output. The difference between the reset digital data and the signal digital data is calculated by the adding unit 402, and a signal of charges accumulated in (the photodiode 121 in) the pixel circuit 41 is generated and output as an output signal.

The output signal is also input to the judgement unit 401. As will be described in detail later, the judgement unit 401 judges the nature of a captured image, for example, whether it is high illuminance or low illuminance, and as a result of the judgement, controls the amount of noise.

Figure 11:
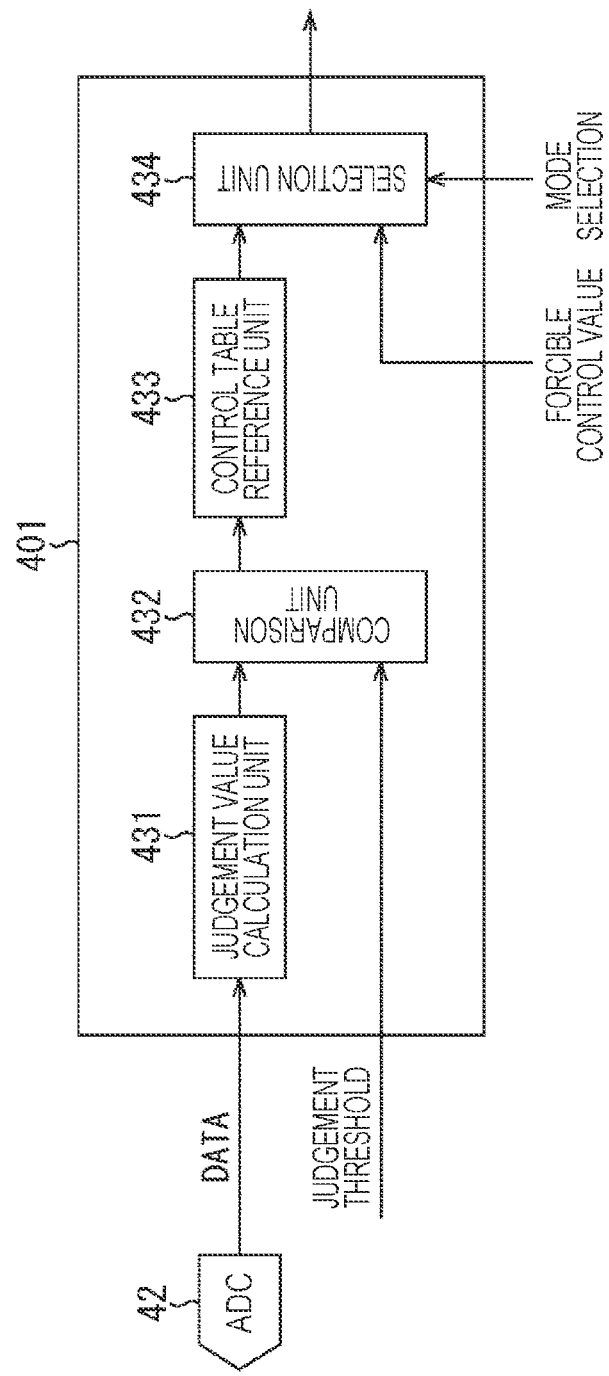
FIG. 11 is a diagram for explaining a configuration of a judgement unit.

FIG. 11 is a diagram illustrating a configuration example of the judgement unit 401. The judgement unit 401 includes a judgement value calculation unit 431, a comparison unit 432, a control table reference unit 433, and a selection unit 434.

The pixel signal output from the ADC 42 is supplied to the judgement value calculation unit 431 of the judgement unit 401. The supplied pixel signal may be a pixel value of the entire pixel area, a pixel value for one pixel, a pixel value representing a pixel including one or more pixels, and the like.

A pixel including one or more pixels may be, for example, a pixel arranged in a predetermined region of the pixel array unit or an image plane phase difference pixel. Furthermore, such a pixel can be a representative pixel of pixels in a region around the pixel, and a signal from a pixel that is the representative pixel may be read before a pixel that is not the representative pixel. Then, judgement can be performed by the judgement unit 401 using a signal read from the representative pixel.

The unit of the pixel signal input to the judgement value calculation unit 431 can be matched with the unit to be controlled. For example, in a case where the control is performed in units of one pixel, the pixel signal is supplied in units of one pixel.

That is, the accuracy with which the judgement unit 401 performs the judgement can be the entire pixel area, the pixel unit, or the plurality of pixel units.

The unit of the pixel signal input to the judgement value calculation unit 431 may be every pixel, every column, every pixel block including a predetermined number of pixels, all pixels, and the like.

Furthermore, control timing (timing for judgement), for example, timing when the pixel signal is input to the judgement value calculation unit 431, timing for judgement by the judgement unit 401, and the like, may be constant (per frame) or may be per a predetermined number of frames.

Note that the timing at which the judgement unit 401 performs the judgement and the timing at which the current value and the like are controlled using the result of the judgement can be different as described later. Here, the timing for performing the judgement is described as the timing for control, and the description will be continued.

Furthermore, in a case where one image is formed of a plurality of frames (subframes), control may be performed for each subframe, or control may be performed in a predetermined subframe of the subframes.

For example, in a case where one subframe is generated using four subframes, control may be performed for each subframe, or control may be performed for a predetermined subframe of the four subframes, e.g., the first subframe (control using a value of the predetermined subframes is performed for the other subframes).

The judgement value calculation unit 431 calculates an average value in the screen, a representative value, a maximum value as to whether or not the image is saturated, and the like, using the input pixel signal. All of these may be calculated, or at least one of them may be calculated.

Note that the judgement value calculated by the judgement value calculation unit 431 may be calculated using a pixel signal that has been subjected to processing such as defect correction in advance.

The judgement value from the judgement value calculation unit 431 is supplied to the comparison unit 432. A judgement threshold value is also supplied to the comparison unit 432. The judgement threshold value can be configured to be supplied from the outside of the judgement unit 401, or can be configured to be held or generated by the comparison unit 432. The judgement threshold value may be a fixed value or may be a variable value that varies with a predetermined condition.

The comparison unit 432 compares the judgement value from the judgement value calculation unit 431 with the judgement threshold value, and supplies a result of the comparison to the control table reference unit 433. The control table reference unit 433 refers to a control signal for noise control of the analog circuit, for example, a current value table. The table is a table in which, for example, the comparison result and the current value are associated with each other.

The table may be held in the control table reference unit 433 or may be held outside the control table reference unit 433.

The selection unit 434 is supplied with a reference value (for example, a current value), a forcible control value, and a mode selection signal from the control table reference unit 433. In response to the mode selection signal, the selection unit 434 judges whether or not to perform forcible control, and as a result of the judgement, selects either the reference value or the forcible control value from the control table reference unit 433, and supplies the result of the selection to each analog circuit, e.g., the ADC 42.

<First Configuration for Controlling the Current of the Differential Input Circuit>

Figure 12:
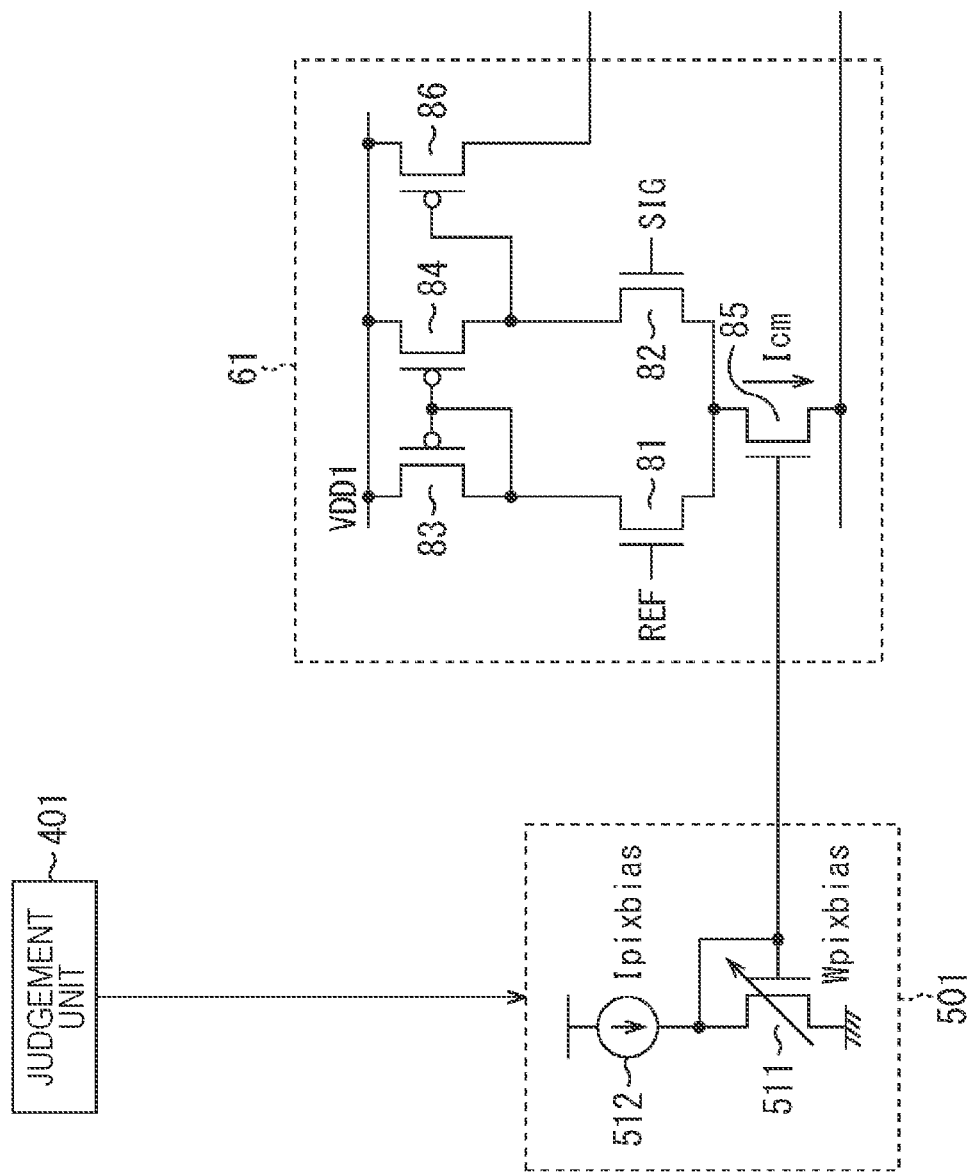
FIG. 12 is a diagram for explaining a configuration of a bias circuit.

FIG. 12 illustrates a configuration example of the ADC 42 and its peripheral units in a case where the current flowing through the transistor elements in the ADC 42 is controlled according to a result of the judgement from the judgement unit 401. FIG. 12 illustrates only the differential input circuit 61 in the ADC 42. A bias circuit 501 that controls current Icm flowing through the transistor 85 of the differential input circuit 61 is connected to the gate of the transistor 85.

The judgement result from the judgement unit 401 is supplied to the bias circuit 501. The bias circuit 501 includes a plurality of transistors 511 and a current source 512. The bias circuit 501 is configured to be capable of changing the current value of the connected differential input circuit 61 by changing the number used from a plurality of transistors constituting the transistor 511.

In a case where the current flowing through the bias circuit 501 is current Ipixbias, channel length L of the transistor 511 is fixed, channel width W (bias W size) is Wpixbias, and the pixel current source W size is Wcmbias, the current Icm flowing through the transistor 85 is Icm=Ipixbias×(Wcmbias/Wpixbias).

That is, control is possible using the characteristic that the current density per unit W is constant. Even if this current value is on the order of one digit [nA] on the differential input circuit 61 side, the operation is possible because of the configuration including the positive feedback circuit 63 in the subsequent stage (PositiveFeedBack configuration).

In this way, by controlling the current flowing through the transistor (here, the transistor 85) in the differential input circuit 61, noise generated by the transistor 85 (the entire circuit including the transistor 85) can be controlled.

For example, in a case where a bright image (high illuminance image) is captured, even if the noise is large, it is considered that the influence of the noise on the image quality is small. Furthermore, in a case where a dark image (low illuminance image) is captured, if the noise is large, it is considered that the influence of the noise on the image quality is large.

Furthermore, the noise also depends on the current value flowing through the transistor, and the noise tends to decrease as the current value increases.

For these reasons, when the judgement unit 401 can judge that an image with high illuminance is being captured, a judgement value that controls the current value of (the transistor 85 in) the differential input circuit 61 to be low is output to the bias circuit 501, and the bias circuit 501 performs control to reduce the current value in the differential input circuit 61. For this reason, when an image with a high illuminance is captured, a reduction in power can be achieved.

Furthermore, when the judgement unit 401 can judge that a low illuminance image is being captured, a judgement value for controlling the current value of (the transistor 85 in) the differential input circuit 61 is output to the bias circuit 501, and the bias circuit 501 performs control to increase the current value in the differential input circuit 61. For this reason, noise can be reduced when an image with low illuminance is captured.

<Second Configuration for Controlling the Current of the Differential Input Circuit>

Figure 13:
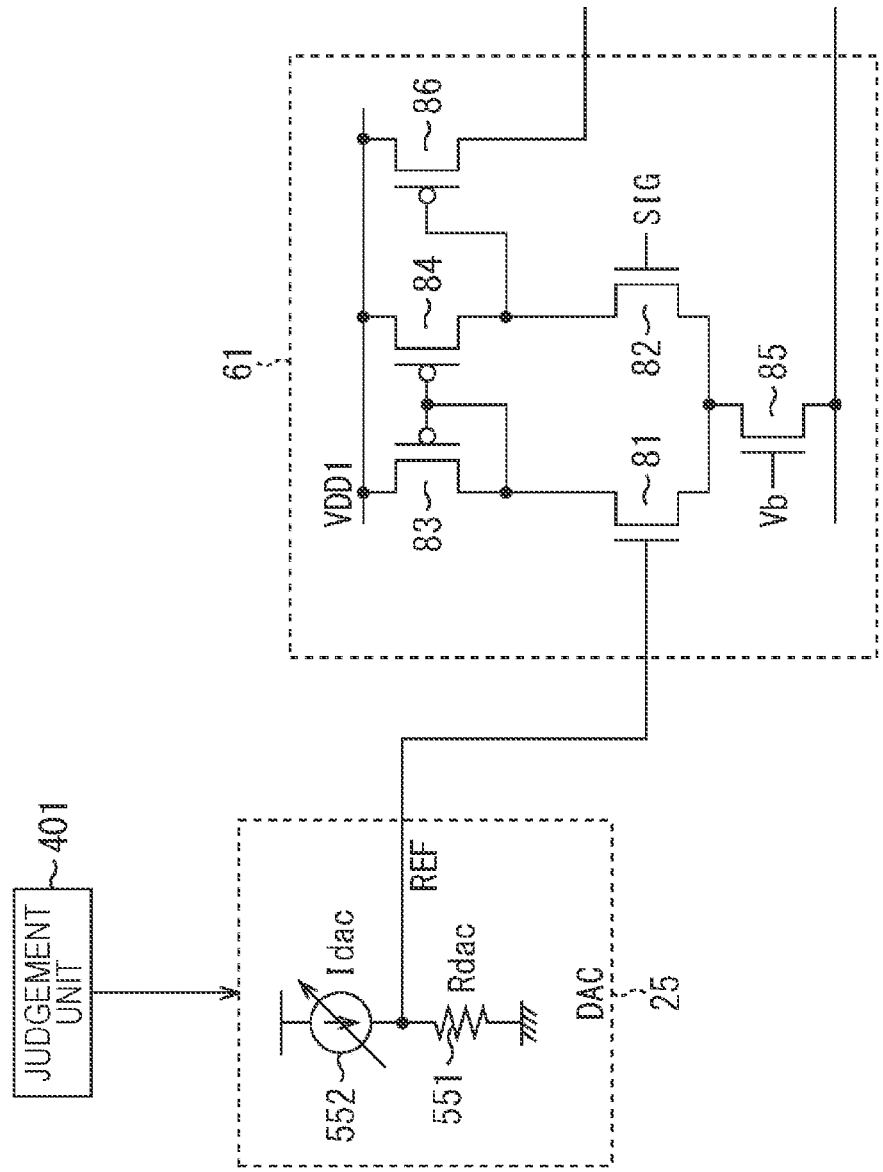
FIG. 13 is a diagram for explaining a configuration of a DAC.

FIG. 13 illustrates a second configuration example of the ADC 42 and its peripheral units in a case where the current flowing through the transistor elements in the ADC 42 is controlled according to a result of the judgement from the judgement unit 401. FIG. 13 illustrates only the differential input circuit 61 in the ADC 42. A DAC 25 that controls the reference signal REF supplied to the transistor 81 of the differential input circuit 61 is connected to the gate of the transistor 81.

As described above, the DAC 25 generates the reference signal (reference voltage signal) REF, which is a slope signal whose level (voltage) monotonously decreases with time, and supplies it to each pixel 21.

The determination result from the judgement unit 401 is supplied to the DAC 25. The DAC 25 includes a resistor 551 and a current source 552. In the DAC 25, for example, the current source 552 includes a plurality of current sources, and the current value from the current source 552 is controlled by individually controlling on and off of the plurality of current sources.

The DAC 25 is configured such that the ground (GND) is a reference potential, and the waveform of the DAC (the waveform of the reference signal REF) is determined by IR drop of the current flowing through the resistor 551. In general, it is known that in a case where the current is large, the current shot noise increases and the noise of the DAC 25 deteriorates. In consideration of the voltage range of the FD 125 (FIG. 4), for example, in a case where the signal amount is small, or the like, the current of the DAC waveform is uniformly reduced as illustrated in FIG. 14.

Figure 14:
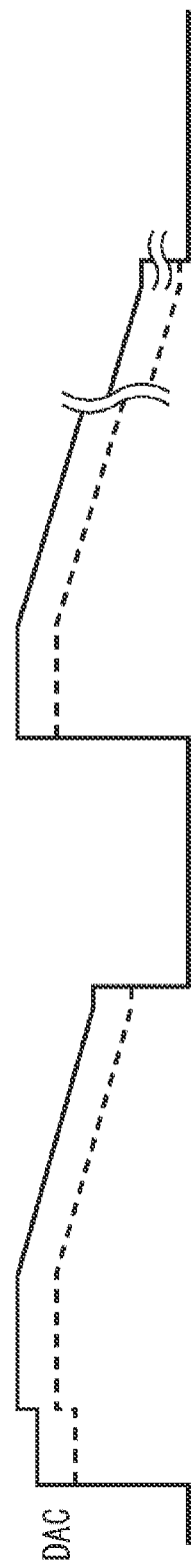
FIG. 14 is a diagram for explaining a waveform of a signal output from a DAC.

In FIG. 14, the solid line indicates the waveform of the reference signal REF during normal time, and the dotted line indicates the waveform of the reference signal REF at a time when the current is uniformly reduced. Thus, by giving an offset to the reference signal REF, it is possible to reduce the noise generated in the DAC 25.

Although indicated here as DC, for example, it may be changed together with the offset in accordance with the gain (gradient of the slope). Furthermore, as indicated by the dotted line in FIG. 14, since the DC value of the initial voltage of the FD 125 can also be reduced, the dark current of the FD 125 can be suppressed, and the shot noise due to the dark current of the FD 125 can also be suppressed. Therefore, the random noise can be further reduced.

That is, in the case of a low luminance signal (when the signal level is low), control is performed to reduce dark current shot noise by reducing the current value and setting the initial voltage of the FD 125 of the pixel low. On the other hand, in the case of a high luminance signal (when the signal level is high), control is performed such that the current is increased and the voltage of the FD 125 is increased so that a high luminance signal can be obtained.

At this time, although there is a possibility that the dark current shot noise increases, it is not noticeable because of high luminance. Furthermore, since one DAC 25 is provided for all the pixels, it does not consume as much power as the differential input circuit 61. Therefore, reducing the current of the differential input circuit 61 results in lower power. For example, in a case where the pixel is 10 Mpix, the effect can be obtained at 10M magnification.

<Third Configuration for Controlling the Current of the Differential Input Circuit>

Figure 15:
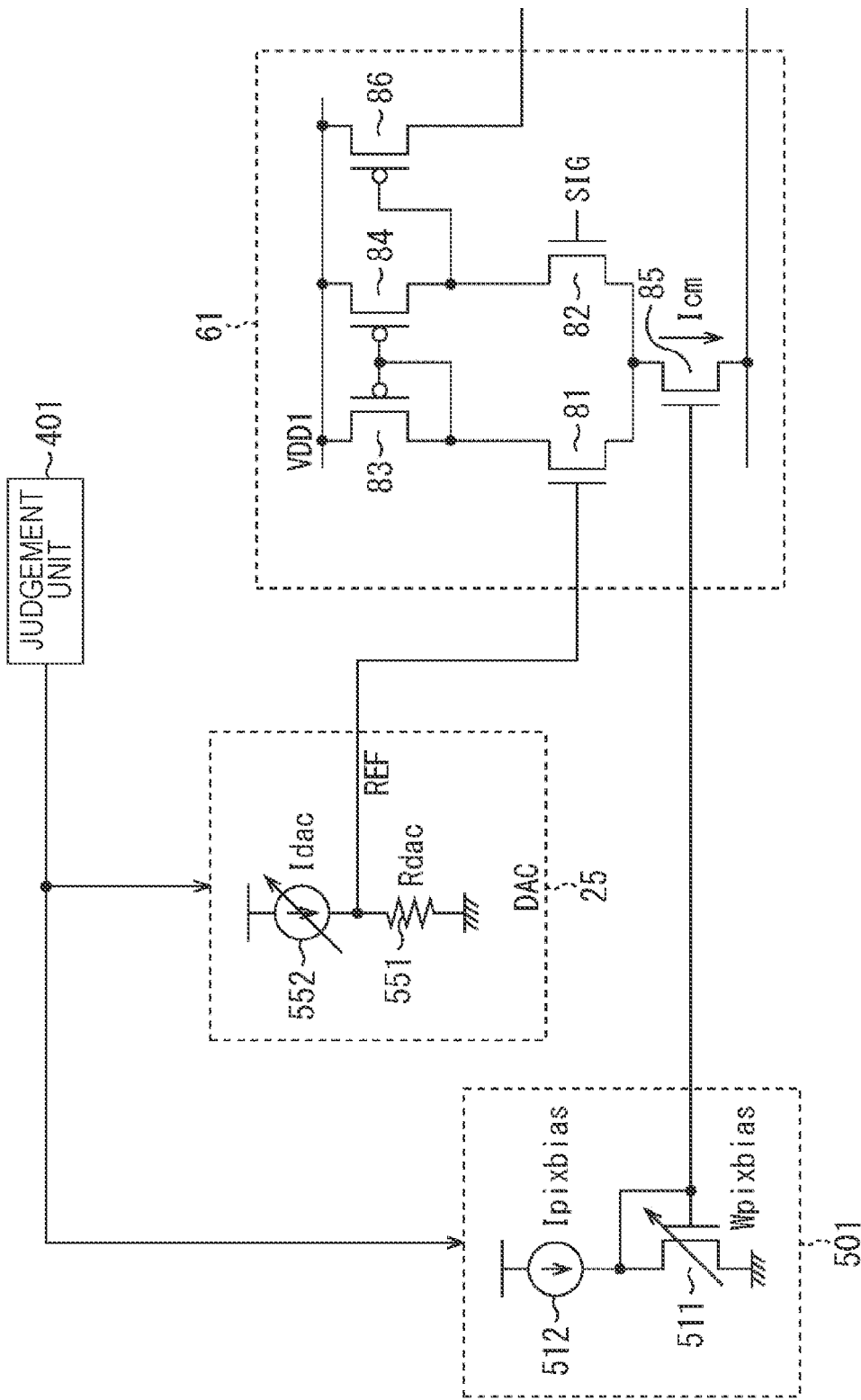
FIG. 15 is a diagram for explaining a configuration of a bias circuit.

The first configuration for controlling the current of the differential input circuit illustrated in FIG. 12 and the second configuration for controlling the current of the differential input circuit illustrated in FIG. 13 may be combined. FIG. 15 illustrates a configuration example of the ADC 42 and peripheral units thereof, in which the first configuration and the second configuration are combined.

In the ADC 42 illustrated in FIG. 15, the bias circuit 501 that controls a current flowing through the transistor 85 of the differential input circuit 61 is connected to the gate of the transistor 85. Furthermore, the DAC 25 that controls the reference signal REF supplied to the transistor 81 of the differential input circuit 61 is connected to the gate of the transistor 81.

The judgement result from the judgement unit 401 are supplied to the bias circuit 501 and the DAC 25. The control performed by the bias circuit 501 and the DAC 25 is similar to the case described above.

That is, in a case where the judgement unit 401 judges that the signal value is a low luminance signal (signal level is low) that should be resistant to noise, the bias circuit 501 feeds back the current value to the analog circuit (such as the ADC 42), and it works in the direction that the noise is reduced. In the case of the differential input circuit 61, control for increasing the current value of the current Icm flowing in the differential input circuit 61 is performed, and control for reducing the thermal noise generated by the circuit is performed.

Conversely, the DAC 25 performs control to reduce the dark current shot noise by reducing the current value and setting the initial voltage of the FD 125 of the pixel low.

When the illuminance is high, the bias circuit 501 performs control for reducing the current Icm in the differential input circuit 61. At this time, although the noise is increased, the differential input circuit 61 can be reduced in power consumption. In contrast to the bias circuit 501, the DAC 25 performs control to increase the current and increase the voltage of the FD 125 so that a signal with high illuminance can be obtained.

Even with such a configuration, it is possible to control the current flowing through the differential input circuit 61 and to control the noise. Furthermore, by individually controlling the current flowing through the plurality of transistors in the differential input circuit 61, the noise can be controlled more appropriately.

<Fourth Configuration for Controlling the Current of the Differential Input Circuit>

As described above, according to the first to third configurations of the differential input circuit, the noise can be suppressed. For example, as indicated by the dotted lines in FIG. 14 and as the description is added, according to the present technology, since the DC value of the initial voltage of the FD 125 can also be reduced, the dark current of the FD 125 can be suppressed, and the shot noise due to the dark current of the FD 125 can also be suppressed. Therefore, the random noise can be further reduced.

That is, in the case of a low luminance signal (when the signal level is low), control is performed to reduce dark current shot noise by reducing the current value and setting the initial voltage of the FD 125 of the pixel low. On the other hand, in the case of a high luminance signal (when the signal level is high), control is performed such that the current is increased and the voltage of the FD 125 is increased so that a high luminance signal can be obtained.

Figure 16:
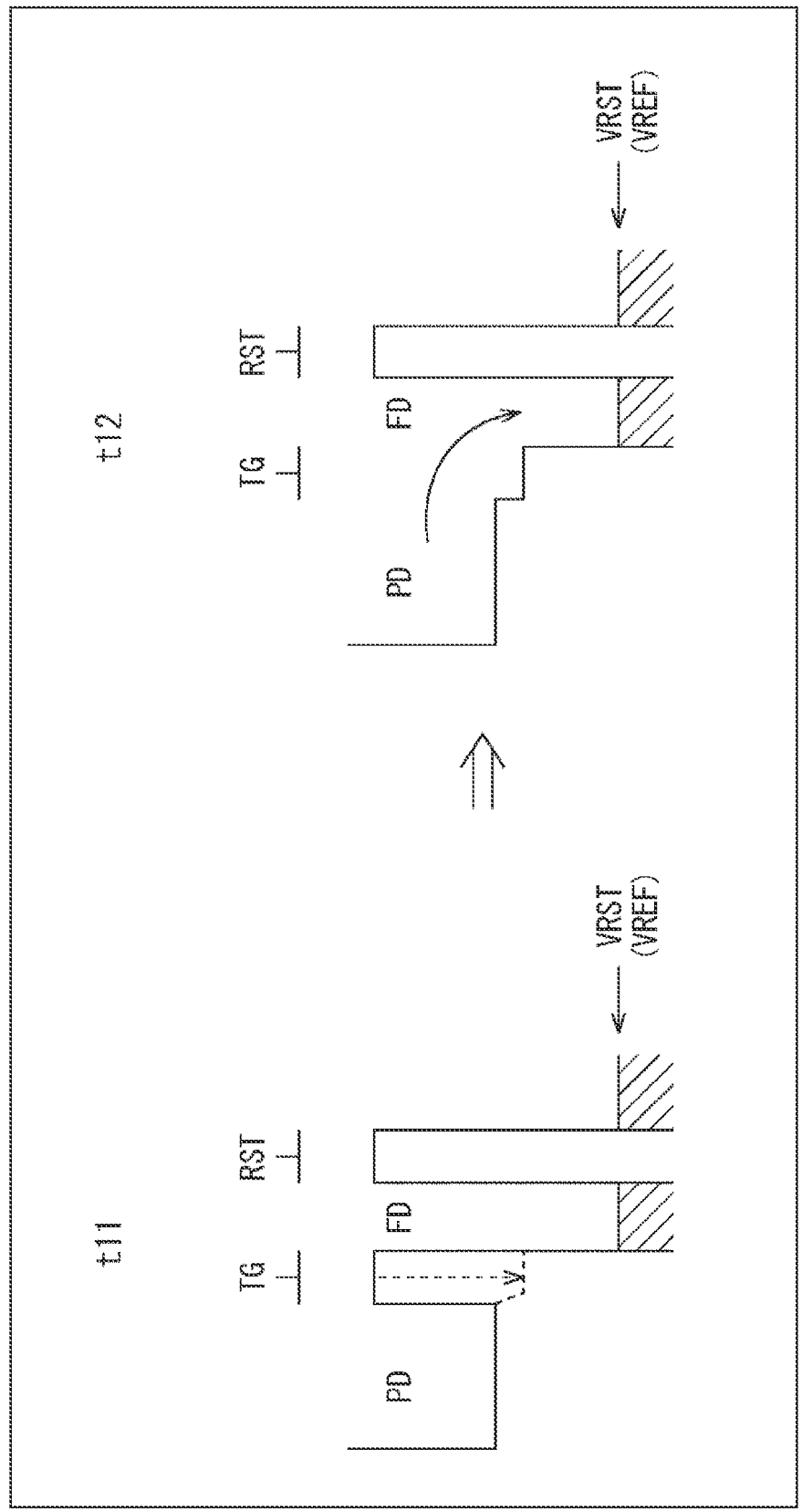
FIG. 16 is a diagram for explaining the generation of a backflow charge from an FD.

By the way, as illustrated in FIG. 16, at time t11, in a case where the initial voltage of the FD 125 is set to a low voltage (high potential), i.e., in a case where the reset voltage $V_{rst}$ for resetting the charge of the FD 125 is set to a low voltage (high potential), even if the transfer gate (TG in the figure) is opened at time t12, the charge remaining in the FD 125 does not flow back to the PD 121 side.

Figure 17:
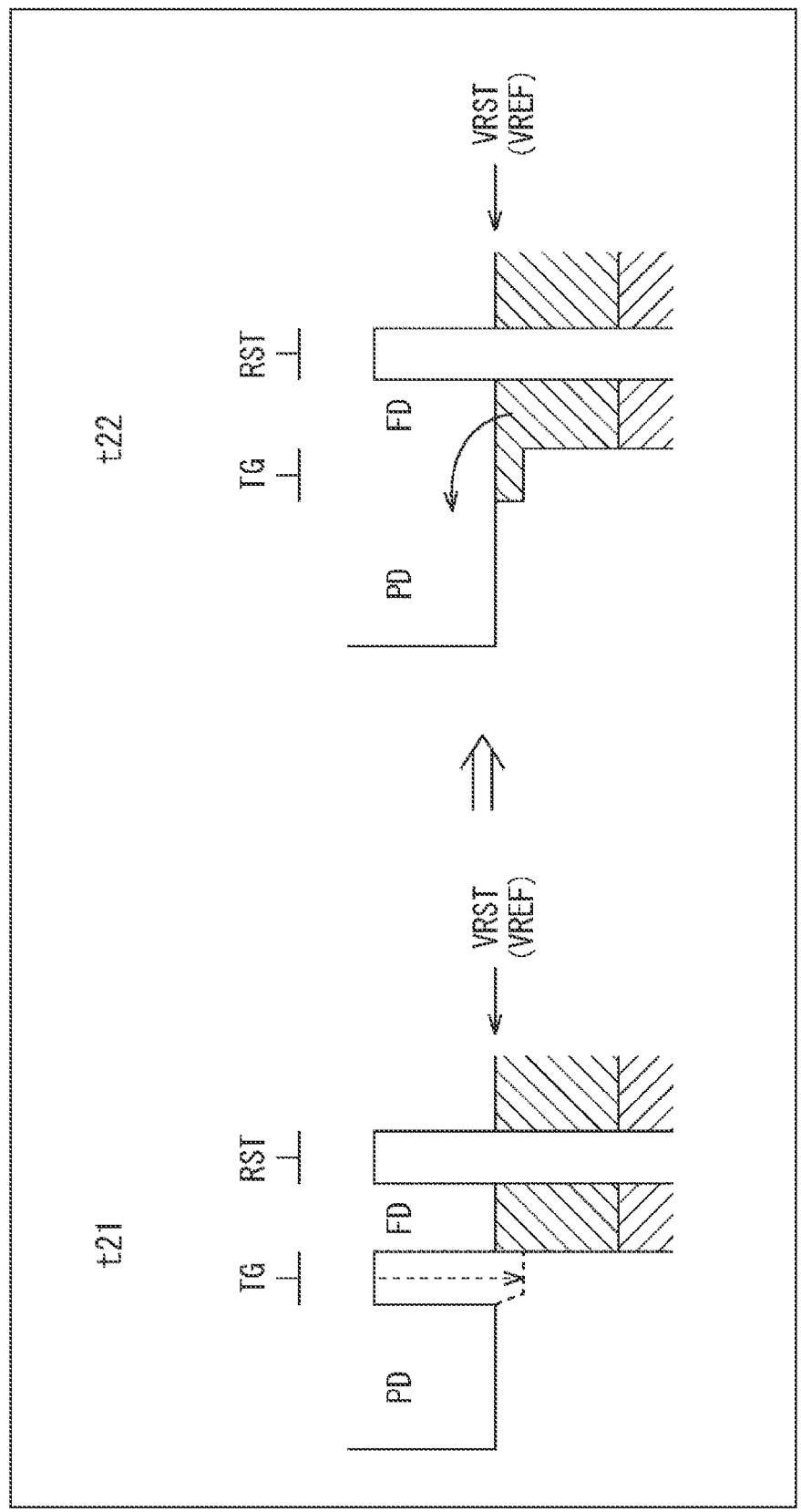
FIG. 17 is a diagram for explaining the generation of a backflow charge from the FD.

However, as illustrated in FIG. 17, at time t21, in a case where the initial voltage of the FD 125 is set to a high voltage (low potential), i.e., in a case where the reset voltage $V_{rst}$ for resetting the charge of the FD 125 is set to a high voltage (low potential), when the transfer gate (TG in the figure) is opened at time t22, there is a possibility that the charge remaining in the FD 125 flows back to the PD 121 side.

As described above, according to the first to third configurations of the differential input circuit, control is performed to set the initial voltage of the FD 125 of the pixel low, so that the dark current shot noise can be reduced. When such control is performed, the situation described with reference to FIG. 17 occurs, and there is a possibility that the charge remaining in the FD 125 flows back to the PD 121 side.

Therefore, a description will be given of a fourth configuration for controlling the current of the differential input circuit for performing control so as to reduce the dark current shot noise and prevent the charge remaining in the FD 125 from flowing back to the PD 121 side.

In the fourth configuration that controls the current of the differential input circuit, in order to suppress the dark current of the FD 125, the initial voltage of the FD 125 is reduced and in order to create a situation where transfer is possible and no backflow charge is generated, control of temporarily increasing the voltage of the FD 125 during transfer (control for temporarily reducing the potential) is performed.

Figure 18:
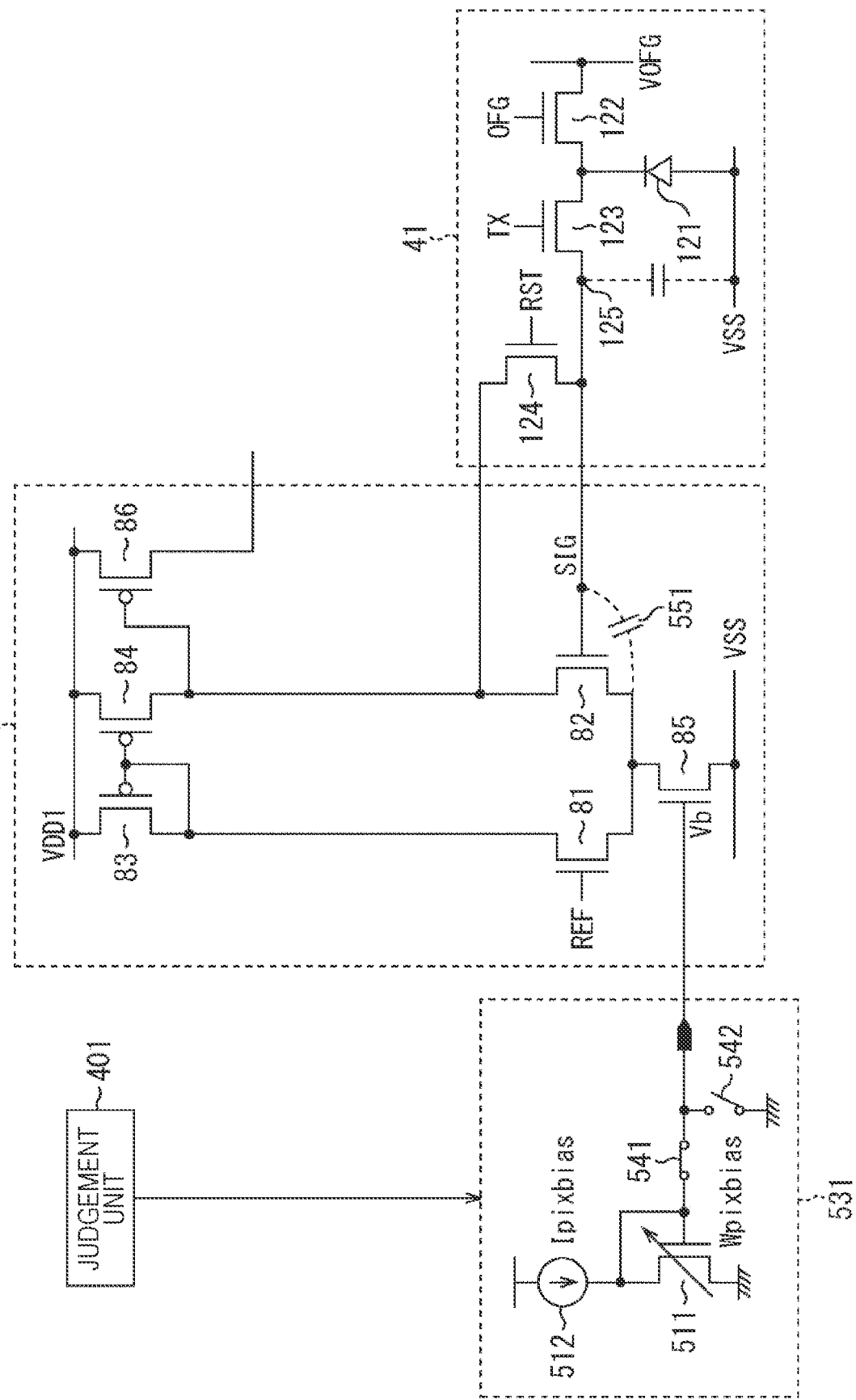
FIG. 18 is a diagram for explaining a configuration of a bias circuit.

FIG. 18 illustrates a configuration example (fourth configuration) of the ADC 42 and its peripheral units in a case where the current flowing through the transistor element in the ADC 42 is controlled according to a result of the judgement from the judgement unit 401. FIG. 18 illustrates the differential input circuit 61 and the pixel circuit 41 in the ADC 42.

A bias circuit 531 for controlling the current Icm flowing through the transistor 85 of the differential input circuit 61 is connected to the gate of the transistor 85. The bias circuit 531 has a configuration in which a switch 541 and a switch 542 are added to the configuration of the bias circuit 501 (FIG. 12).

That is, the bias circuit 531 is configured to be supplied with the judgement result from the judgement unit 401. Furthermore, the bias circuit 531 includes a plurality of transistors 511 and a current source 512. The bias circuit 531 is configured such that the current value of the connected differential input circuit 61 can be varied by changing the number of the plurality of transistors used constituting the transistors 511.

Furthermore, the bias circuit 531 includes the switch 541 and the switch 542. When one of the switch 541 and the switch 542 is opened, the other is controlled to be closed.

Specifically, at the timing when the transfer gate TX is turned on, the switch 541 is opened and the switch 542 is closed. Furthermore, at times other than the timing when the transfer gate TX is turned on, the switch 541 is closed and the switch 542 is opened.

The timing when the transfer gate TX is turned on may be the same timing as when the transfer gate TX is turned on, or may be timing just before the transfer gate TX is turned on.

With such control, when the transfer gate TX is turned on and transfer of the charge from the FD 125 is started, the switch 541 is opened and the switch 542 is closed, so that the gate of the transistor 85 is in a grounded state. When the gate of the transistor 85 is in a grounded state, the potential of the drain of the transistor 85 is in a raised state.

Since the drain of the transistor 85 is connected to the source side of the transistor 82, as a result, the potential of the source of the transistor 82 is in a raised state.

The transistor 82 of the differential input circuit 61 functions as an amplification transistor. When the parasitic capacitance of the amplification transistor is parasitic capacitance 551, when the source side of the transistor 85 becomes a high potential, the potential of the parasitic capacitance 551 of the amplification transistor rises.

Since the FD 125 is connected to the amplification transistor (transistor 82), when the potential of the parasitic capacitance 551 increases, the potential of the FD 125 increases eventually.

As described above, when the transfer gate TX is turned on and transfer of the charge from the FD 125 is started, by opening the switch 541 and closing the switch 542, the voltage of the FD 125 can be boosted.

Even in the state of the time t21 illustrated in FIG. 17, by boosting the FD 125, the state of the time t11 temporarily illustrated in FIG. 16 is provided, and the charge remaining in the FD 125 can be prevented from flowing back to the PD 121 side.

Furthermore, by opening the switch 541 and closing the switch 542, the voltage of the FD 125 is temporarily boosted, and then the switch 541 is closed and the switch 542 is opened, it is possible to provide the state in which the bias circuit 531 supplies input bias current Vb to the transistor 85. Therefore, as described above, it is possible to switch to a state where the dark current of the FD 125 can be suppressed, and the shot noise due to the dark current of the FD 125 can be suppressed.

Figure 19:
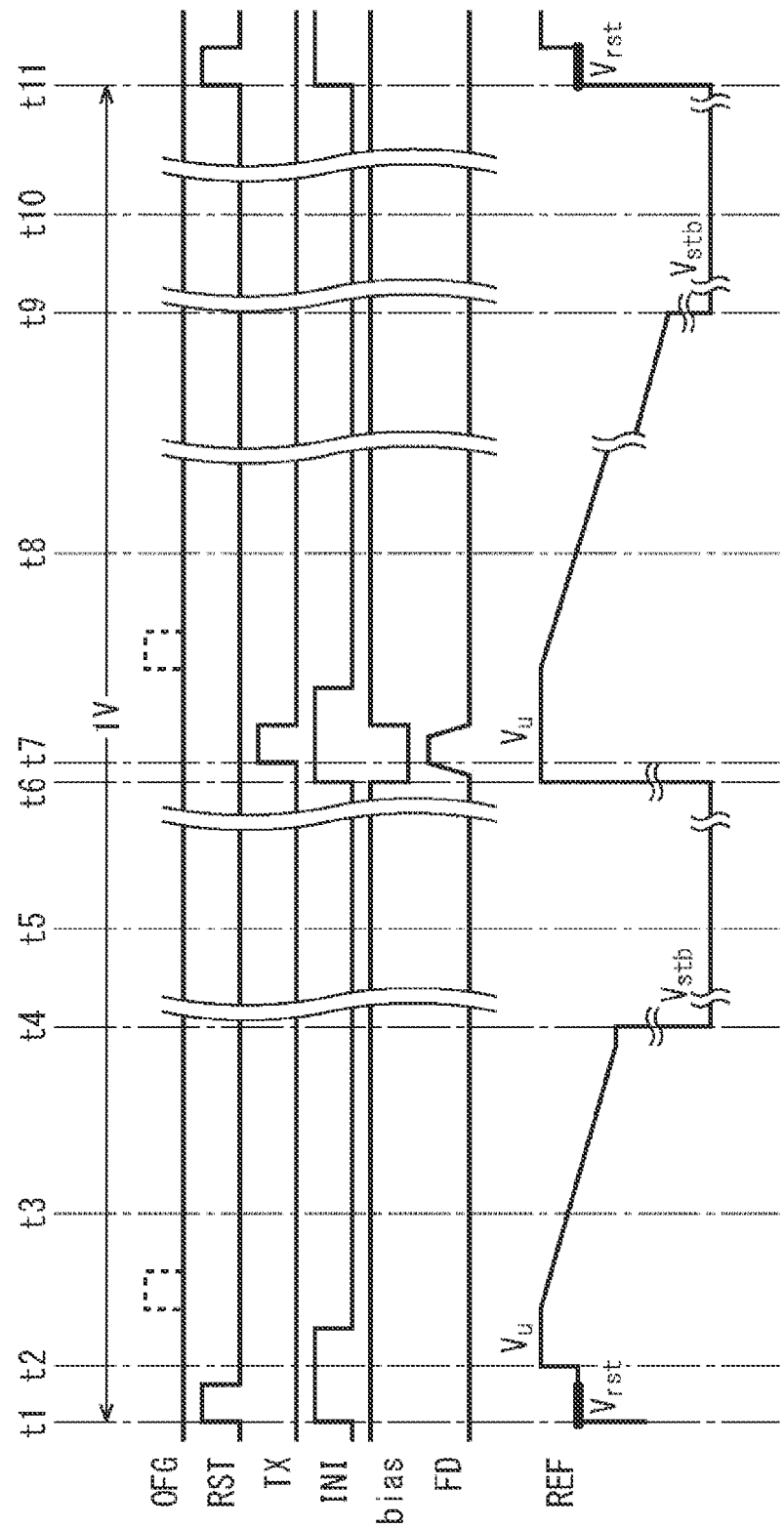
FIG. 19 is a timing chart for explaining the operation of a pixel.

The operation of the pixel 21 illustrated in FIG. 18 will be described with reference to the timing chart of FIG. 19. The timing chart illustrated in FIG. 19 is a timing chart obtained by adding the control pulse bias for controlling whether or not to supply the input bias current Vb from the bias circuit 53 and the voltage value of the FD 125 to the timing chart illustrated in FIG. 5. Therefore, the description is omitted regarding what is described with reference to the timing chart illustrated in FIG. 5.

The control pulse bias is a pulse for controlling opening/closing of the switch 541 and the switch 542. Here, it is assumed that when the control pulse bias is off, the switch 541 is opened and the switch 542 is closed. Therefore, in a case where the control pulse bias is off, the bias circuit 531 is in a grounded state, and the bias current Vb is in a state of not being supplied to the transistor 85.

Furthermore, when the control pulse bias is on, the switch 541 is closed and the switch 542 is opened. Therefore, in a case where the control pulse bias is on, the bias circuit 531 is in a state of being connected to the transistor 511, and the bias current Vb is in a state of being supplied to the transistor 85.

Therefore, when the control pulse bias is switched from on to off, the value of the input bias current Vb from the bias circuit 53 is switched from a predetermined current value (for example, current Ipixbias) to zero (ground).

At time t7, the transfer transistor 123 of the pixel circuit 41 is turned on by a Hi transfer signal TX, and the charge generated by the photodiode 121 is transferred to the FD 125. At time t6 before time t7, the switch 541 is opened and the switch 542 is closed by supplying an off control pulse bias to the switch 541 and the switch 542.

Therefore, at time t7, the value of the input bias current Vb from the bias circuit 53 is switched from a predetermined current value (for example, current Ipixbias) to zero (ground).

At time t6, when the value of the input bias current Vb from the bias circuit 53 is zero, the voltage value of the FD 125 is gradually increased.

Note that, here, a description is given of a case by way of example where the timing at which the control pulse bias is turned off before the timing at which the transfer signal TX becomes Hi (the timing at which the value of the input bias current Vb from the bias circuit 531 is set to zero, i.e., the timing at which the opening/closing of the switches 541 and 542 is controlled) is set. However, the timing when the transfer signal TX becomes Hi and the timing when the control pulse bias is turned off may be substantially the same (time t7).

At a point of time when the transfer signal TX returns to low (almost simultaneously or after the transfer signal TX returns low), the value of the input bias current Vb from the bias circuit 53 returns to a predetermined current value (for example, current Ipixbias). That is, in this case, when the control pulse bias is turned back on, the switch 541 is closed and the switch 542 is opened.

When the input bias current Vb from the bias circuit 53 is in a state of being supplied to the differential input circuit 61, the voltage of the FD 125 is stepped down.

In this way, the voltage of the FD 125 is once boosted at the start of transfer, so that the charge remaining in the FD 125 can be prevented from flowing back to the PD 121 side. Furthermore, when the voltage of the FD 125 is once boosted and then returned to its original state, and the transfer of the charge from the FD 125 is performed in a state where the voltage has been returned to the original state, transfer that suppresses the generation of the dark current in the FD 125 can be performed.

Note that a description is given of the case as an example where the bias circuit 531 illustrated in FIG. 18 includes the switch 541 and the switch 542, but the bias circuit 531 may include one switch. In other words, the bias circuit 531 that performs the control described above can be provided as long as it includes one switch connected to the ground side at the start of transfer and connected to the transistor 511 at other times than the start of transfer, and such a configuration is also within the scope of the present technology.

<Fifth Configuration for Controlling the Current of the Differential Input Circuit>

Figure 20:
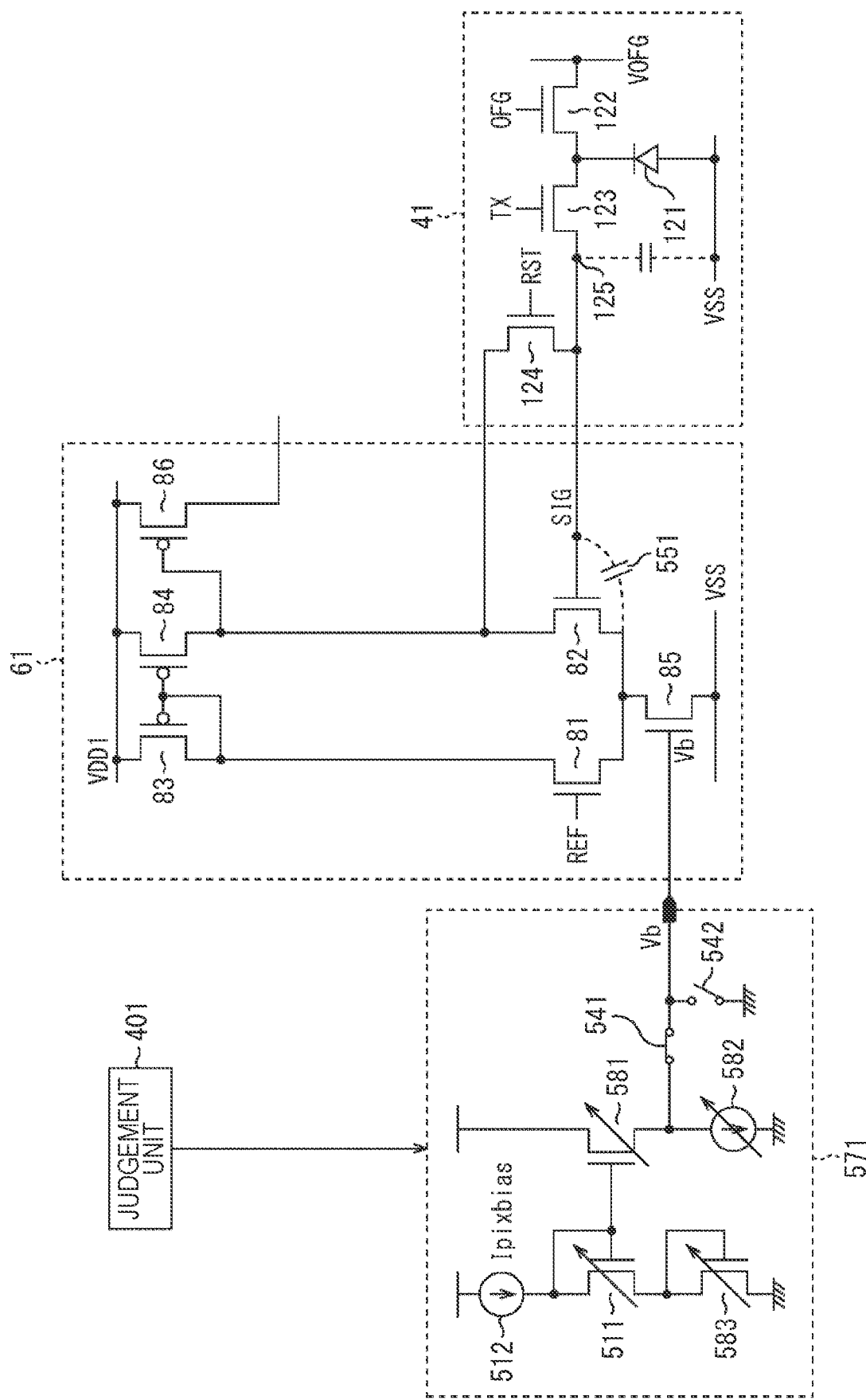
FIG. 20 is a diagram for explaining a configuration of a bias circuit.

FIG. 20 illustrates a configuration example (fifth configuration) of the ADC 42 and its peripheral units in a case where the current flowing through the transistor element in the ADC 42 is controlled according to a result of the judgement from the judgement unit 401. FIG. 20 illustrates the differential input circuit 61 and the pixel circuit 41 in the ADC 42.

In the configuration illustrated in FIG. 20, similar to FIG. 18, the bias circuit 571 that controls the current Icm flowing through the transistor 85 of the differential input circuit 61 is connected to the gate of the transistor 85. This bias circuit 571 has a configuration in which a transistor 581 constituting a source follower circuit and a variable current source 582 are added to the configuration of the bias circuit 531 (FIG. 18), and a transistor 583 for adjusting the operating point of the voltage is added.

The added transistor 581 and transistor 583 are, similar to the transistor 511, each include a plurality of transistors.

For example, in the bias circuit 531 illustrated in FIG. 18, the drive capability of the bias circuit 531 is determined by a transistor connected to the photodiode 121 constituting the pixel 21.

When the number of pixels to which the circuits are connected increases, i.e., when the number of pixels 21 in the pixel array unit 22 (FIG. 1) increases, the number of bias circuits 531 connected to the pixels 21 also increases.

When the number of pixels 21 increases in this way, it can be difficult to activate the bias circuit 531 within a specified time and flow the current to all the pixels 21 in the pixel array unit 22 (to flow the current within the limited ADC time).

Therefore, the configuration of the bias circuit 571 as illustrated in FIG. 20 is adopted so that the bias circuit 571 can be activated within a specified time even when the number of pixels 21 is increased.

The bias circuit 571 illustrated in FIG. 20 includes the source follower circuit including the transistor 581. The source follower circuit is used as a buffer, and a voltage once buffered in the buffer is configured to be supplied to the transistor 85. Therefore, by using the buffered voltage, the bias circuit 571 can be activated within a specified time.

The operation of the pixel 21 including the bias circuit 571 illustrated in FIG. 20 is performed according to the timing chart illustrated in FIG. 19. Since the description with reference to the timing chart illustrated in FIG. 19 has already been made, the description is omitted here.

An arrangement example of the bias circuit 571 will be described with reference to FIGS. 21 and 22.

Figure 21:
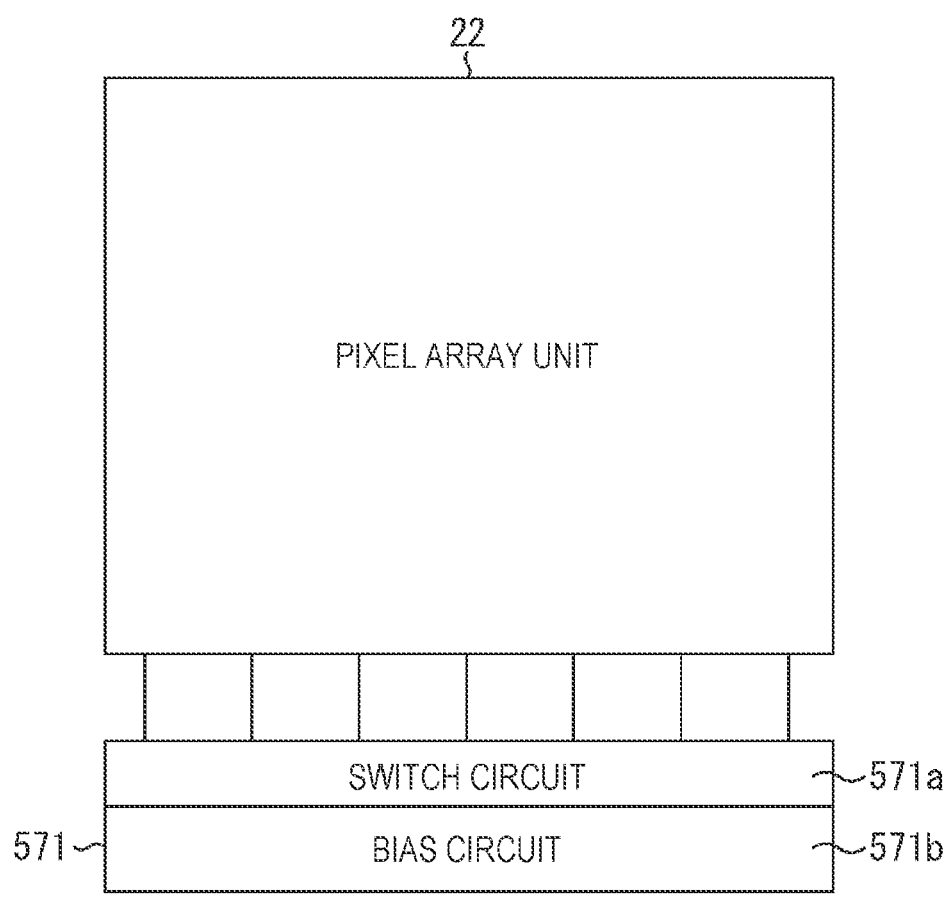
FIG. 21 is a diagram for explaining the arrangement position of a bias circuit.

FIG. 21 is a diagram illustrating an example of an arrangement position of the bias circuit 571 with respect to the pixel array unit 22. Here, the bias circuit 571 is described separately with respect to a switch circuit 571a and a bias circuit 571b.

The switch circuit 571a is a circuit including the switch 541 and the switch 542, and the bias circuit 571b is a circuit including the transistor 511, the current source 512, the transistor 581, the variable current source 582, and the transistor 583.

In the arrangement example illustrated in FIG. 21, the bias circuit 571 is provided on one of the four sides of the pixel array unit 22, the switch circuit 571a is provided on the pixel array unit 22 side, and the pixel array unit 22 (each pixel 21) is arranged to be connected to the bias circuit 571b across the switch circuit 571a.

Figure 22:
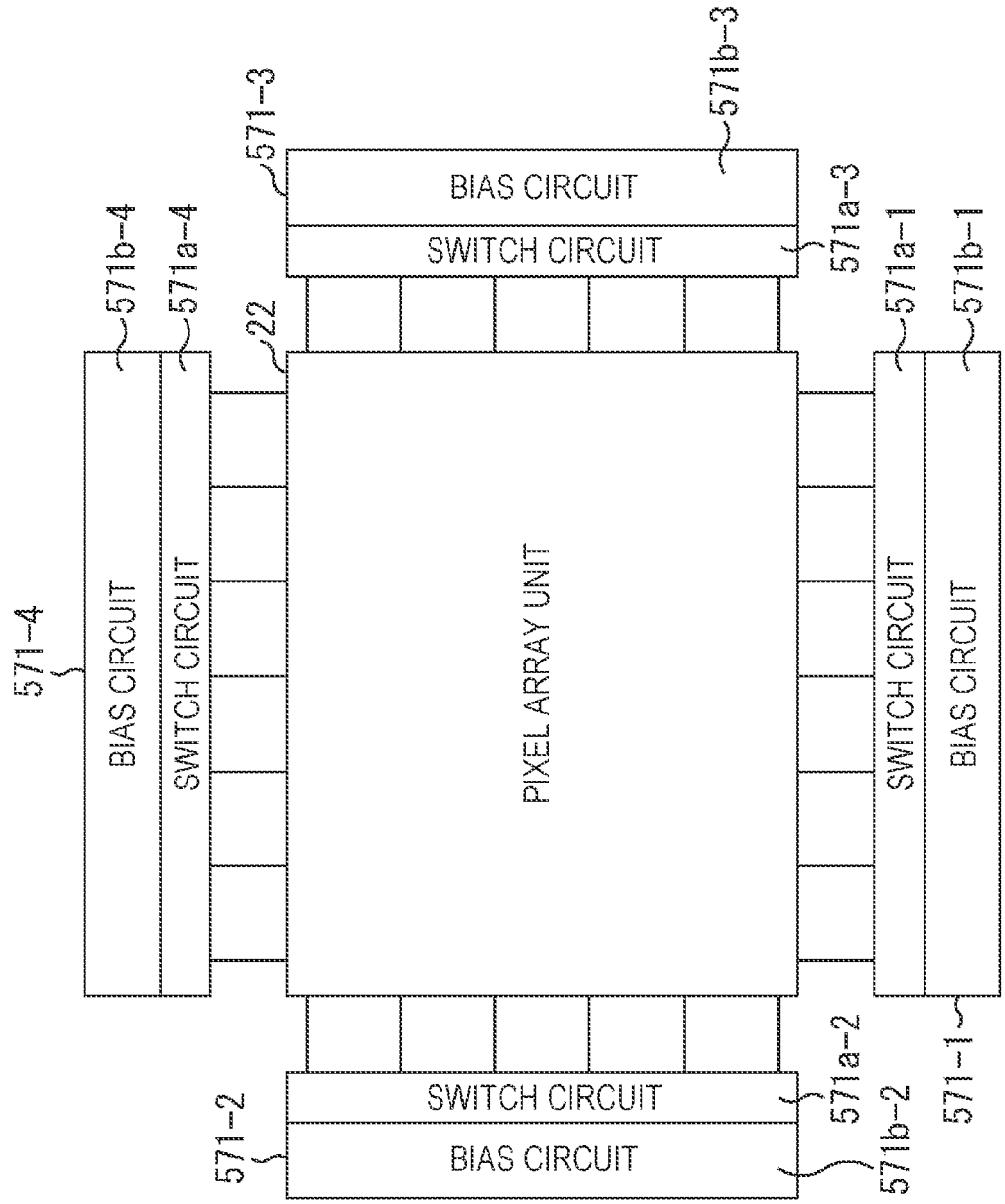
FIG. 22 is a diagram for explaining the arrangement position of the bias circuit.

In the arrangement example illustrated in FIG. 22, bias circuits 571-1 to 571-4 are provided on four of the four sides of the pixel array unit 22, respectively. As in the arrangement example illustrated in FIG. 21, regarding the bias circuits 571 provided on the respective sides of the pixel array unit 22, switch circuits 571a-1 to 571a-4 are provided on the pixel array unit 22 side, and the pixel array unit 22 (each pixel 21) is arranged to be connected to bias circuits 571b-1 to 571b-4 across the switch circuits 571a-1 to 571a-4.

In the arrangement example illustrated in FIG. 21, the bias circuit 571 is illustrated to be provided on one of the four sides of the pixel array unit 22, and in the arrangement example illustrated in FIG. 22, the bias circuits 571 are illustrated to be provided on the four of the four sides of the pixel array unit 22. Although not illustrated, the bias circuit 571 can also be arranged to be provided on two of the four sides of the pixel array unit 22, or the bias circuit 571 can also be arranged to be provided on three of the four sides of the pixel array unit 22.

Which of the four sides of the pixel array unit 22 is provided with the bias circuit 571 is a design matter that can be appropriately changed depending on layout constraints.

In a case where the bias circuit 571 is arranged on the four sides of the pixel array unit 22 as in the arrangement example illustrated in FIG. 22, the bias circuits 571 are arranged to be created as transistors having the same characteristics around the pixel array unit 22 and the bias current (voltage) can be supplied from the periphery. With such arrangement, the characteristic difference between the sensors (characteristic difference between the pixels 21) can be reduced as compared with a case where the bias circuit 571 is arranged on one side of the pixel array unit 22 as in the arrangement example illustrated in FIG. 21.

In the arrangement examples illustrated in FIGS. 21 and 22, the bias circuit 571 has been described as an example. However, the arrangement example illustrated in FIG. 21 or FIG. 22 can also be applied to the bias circuit 531 illustrated in FIG. 18.

<Sixth Configuration for Controlling the Current of the Differential Input Circuit>

Figure 23:
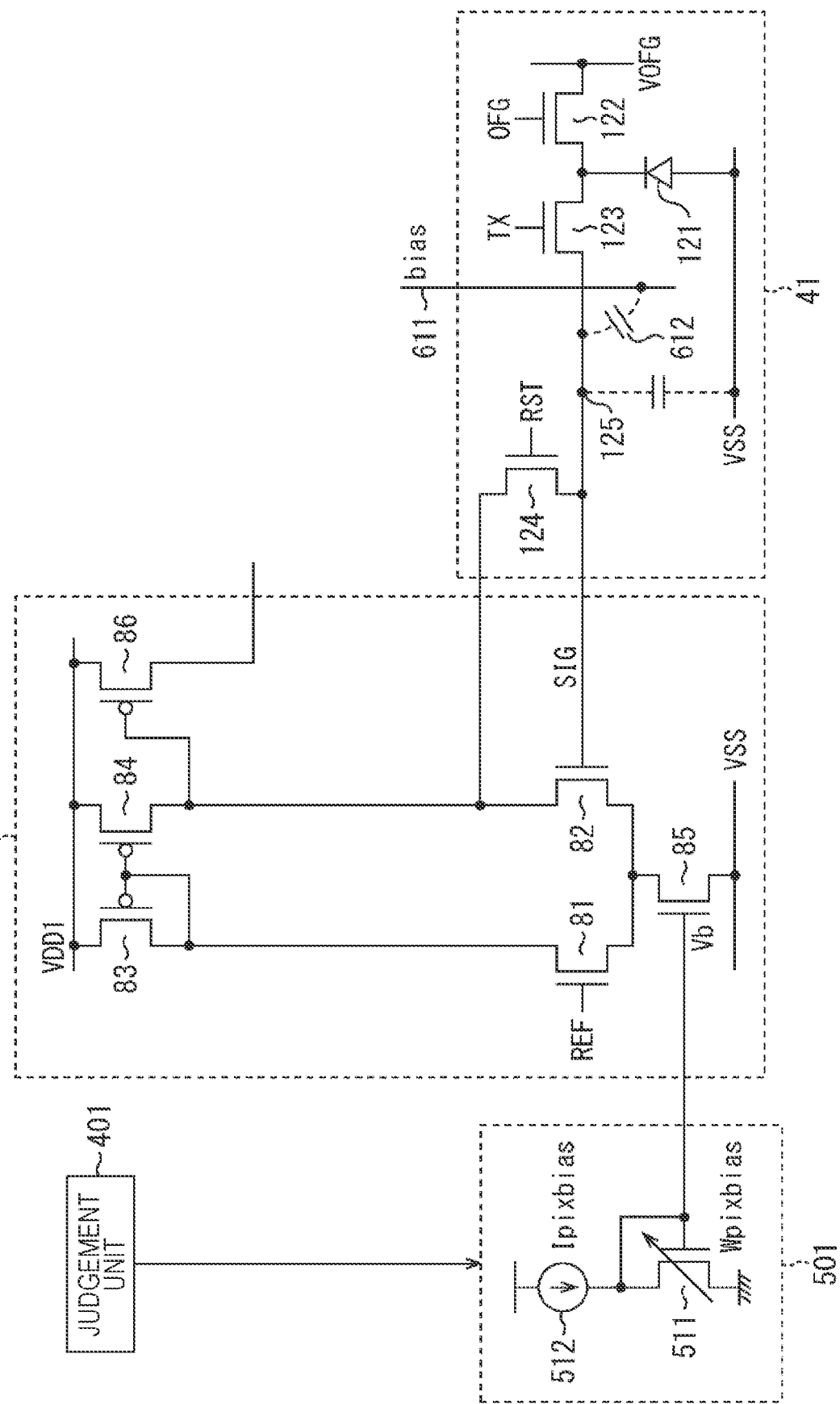
FIG. 23 is a diagram for explaining a configuration of a bias circuit.

FIG. 23 illustrates a configuration example (sixth configuration) of the ADC 42 and its peripheral units in a case where the current flowing through the transistor element in the ADC 42 is controlled according to a result of the judgement from the judgement unit 401. FIG. 23 illustrates the differential input circuit 61 and the pixel circuit 41 in the ADC 42.

The configuration of the pixel circuit 41 illustrated in FIG. 23 is a configuration in which a wiring 611 is disposed in the vicinity of the FD 125 and the FD 125 and the wiring 611 are coupled as a configuration for once boosting the voltage of the FD 125 at the start of transfer.

A bias circuit, for example, the bias circuit 501 illustrated in FIG. 12, is connected to the differential input circuit 61, and the bias current Vb is configured to be supplied on the basis of the result of judgement of the judgement unit 401.

The wiring 611 is a metal wiring and is configured such that a voltage is applied at the start of transfer. For example, a voltage source can be configured to be connected to the wiring 611, and the voltage source can be controlled by the judgement unit 401 so as to apply a voltage having a predetermined voltage value to the wiring 611 at the time of transfer.

When a voltage is applied to the wiring 611, the voltage of the coupled FD 125 is boosted. When a voltage is applied to the wiring 611, the potential of the parasitic capacitance 612 increases, and the potential of the FD 125 also increases.

Figure 24:
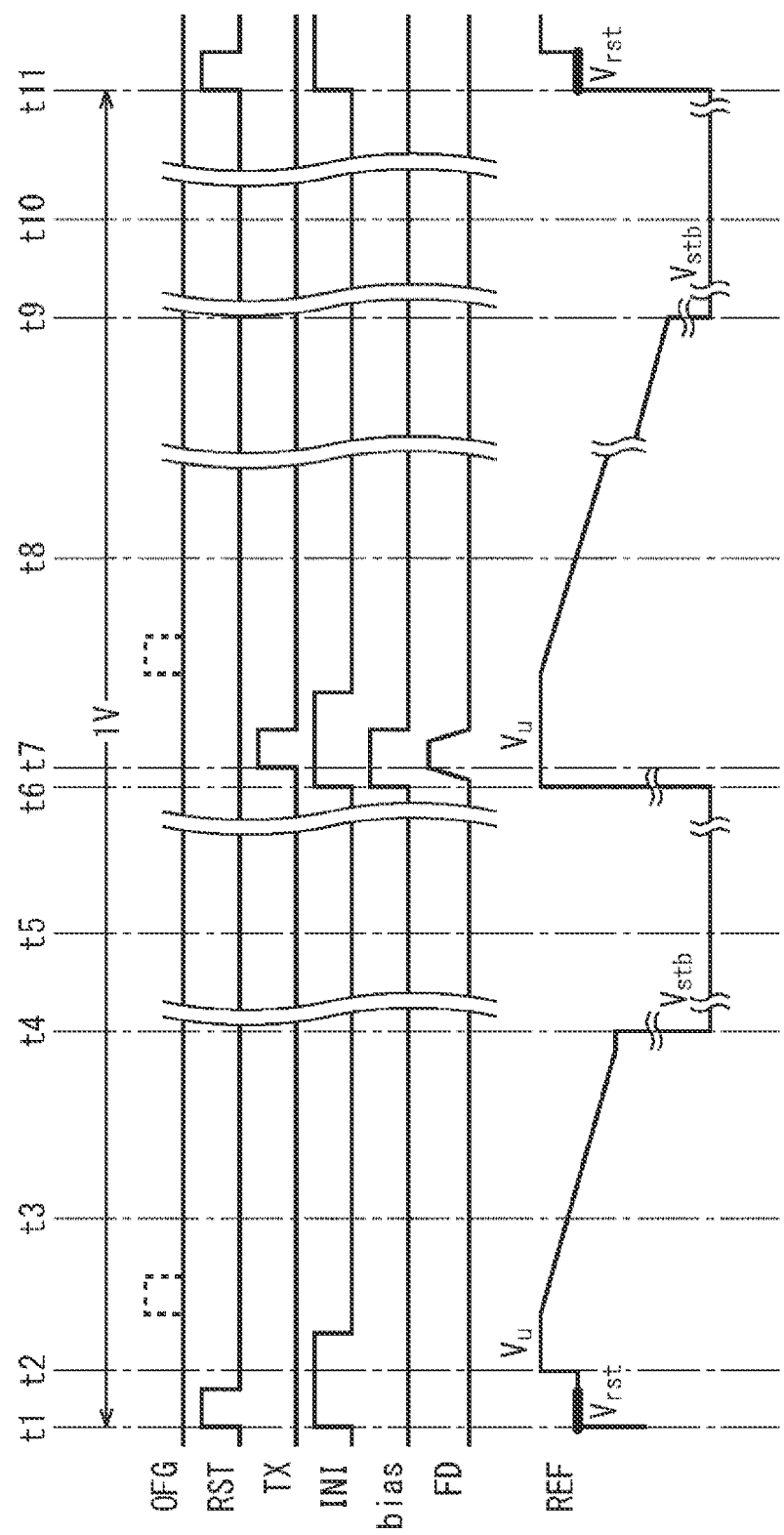
FIG. 24 is a timing chart for explaining the operation of a pixel.

The operation of the pixel 21 illustrated in FIG. 23 will be described with reference to the timing chart of FIG. 24. The timing chart illustrated in FIG. 24 is similar to the timing chart illustrated in FIG. 19, but the control pulse (control pulse bias) for applying a voltage to the wiring 611 is different. A description of the portions described with reference to the timing chart illustrated in FIG. 19 is omitted.

At time t7, the transfer transistor 123 of the pixel circuit 41 is turned on by a Hi transfer signal TX, and the charge generated by the photodiode 121 is transferred to the FD 125. At time t6 prior to time t7, in order to apply a voltage to the wiring 611, an ON control pulse bias is output to a voltage source, which is not illustrated. Therefore, the voltage is applied to the wiring 611, and the voltage value of the FD 125 is boosted.

Note that, here, a description is given of a case by way of example where the timing at which the control pulse bias is turned on before the timing at which the transfer signal TX becomes Hi is set. However, the timing when the transfer signal TX becomes Hi and the timing when the control pulse bias is turned on may be substantially the same (time t7).

At the point of time when the transfer signal TX is returned to Low (almost simultaneously or after the transfer signal TX returns to Low), the control pulse bias is turned off, and the application of the voltage to the wiring 611 ends. When no voltage is applied to the wiring 611, the voltage of the FD 125 is lowered.

In this manner, when the voltage of the FD 125 is once boosted at the start of transfer, the charge remaining in the FD 125 can be prevented from flowing back to the PD 121 side. Furthermore, when the voltage of the FD 125 is once boosted and then returned to its original state, and the transfer of the charge from the FD 125 is performed in a state where the voltage has been returned to the original state, transfer that suppresses the generation of the dark current in the FD 125 can be performed.

<Seventh Configuration for Controlling the Current of the Differential Input Circuit>

Figure 25:
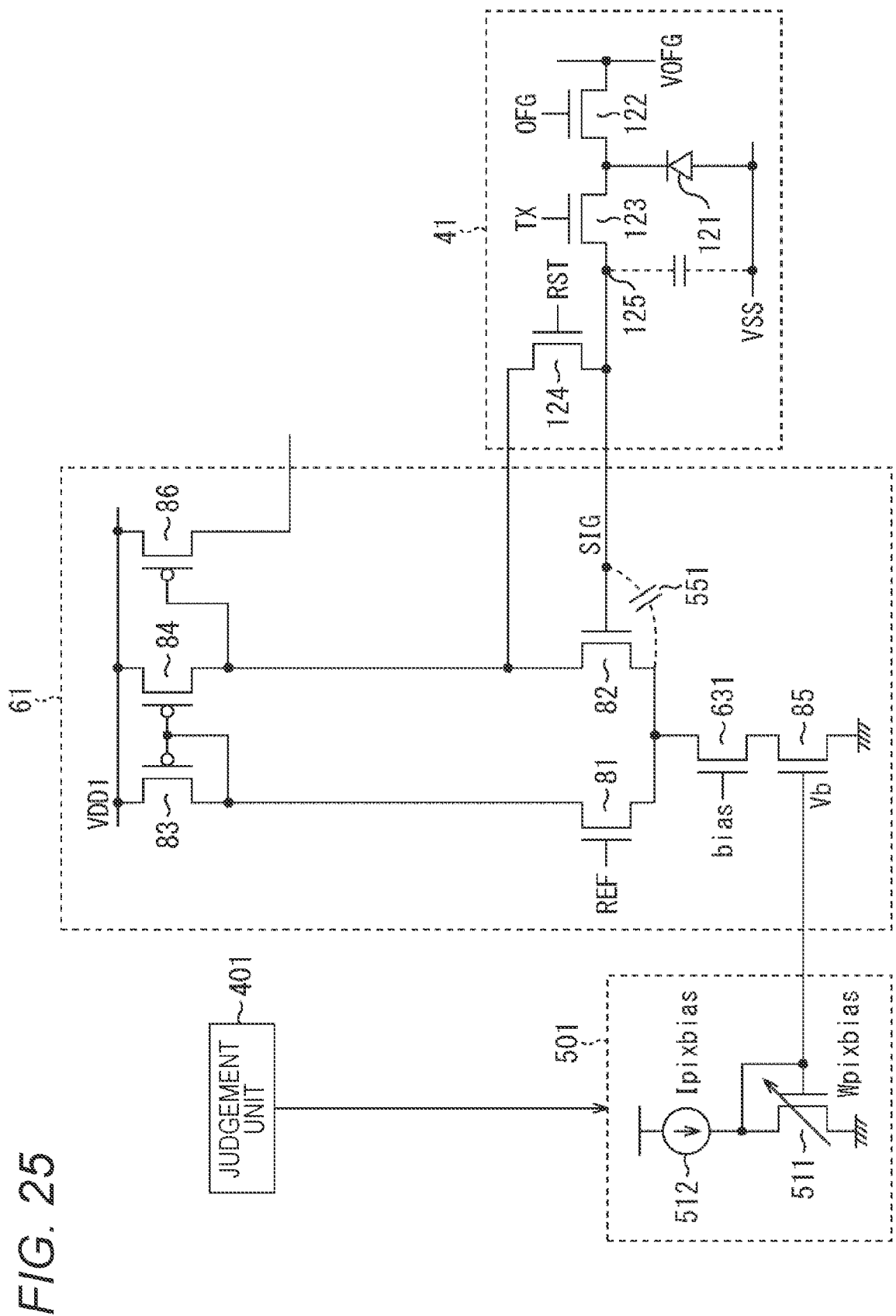
FIG. 25 is a diagram for explaining a configuration of a bias circuit.

FIG. 25 illustrates a configuration example (seventh configuration) of the ADC 42 and its peripheral units in a case where the current flowing through the transistor element in the ADC 42 is controlled according to a result of the judgement from the judgement unit 401. FIG. 25 illustrates the differential input circuit 61 and the pixel circuit 41 in the ADC 42.

In the configuration of the differential input circuit 61 illustrated in FIG. 25, a transistor 631 is provided on the drain side of the transistor 85 as a configuration for once boosting the voltage of the FD 125 at the start of transfer. The transistor 631 functions as a switch, and is provided to connect or separate (disconnect) the transistor 85 in the differential input circuit 61.

That is, when the transistor 631 is in a turned-on state as a switch, the transistor 85 is in a state of being connected in the differential input circuit 61, and the bias current Vb is in a state of being supplied from the bias circuit 501 to the transistor 85 and supplied to the source side of the transistor 81 or the transistor 82.

On the other hand, when the transistor 631 is in a turned-off state as a switch, the transistor 85 is in a state of being separated in the differential input circuit 61, and the bias current Vb is in a state of being supplied from the bias circuit 501 to the transistor 85 but not supplied to the source side of the transistor 81 or the transistor 82.

Furthermore, here, the transistor 631 is a transistor that includes an NMOS transistor, and when the control pulse bias is turned on, the voltage is applied to the gate of the transistor 631, the transistor 631 is in a turned-on state, and when the control pulse bias is turned off, no voltage is applied to the gate of the transistor 631, and the transistor 631 is in a turned-off state.

In a case where the transistor 631 includes a PMOS transistor, the operation is reversed. As the operation of the transistor 631, when the control pulse bias is turned on, the voltage is applied to the gate of the transistor 631, the transistor 631 is in a turned-off state, and when the control pulse bias is turned off, no voltage is applied to the gate of the transistor 631, and the transistor 631 is in a turned-on state.

Instead of the transistor 631, it may include a switch for turning on and off. Note that considering the formation of the transistor 631 in the pixel 21, the formation as a transistor rather than as a switch has an advantage that it can be manufactured in a process similar to the process of the formation of other transistors.

The operation of the pixel 21 including the transistor 631 illustrated in FIG. 25 is performed according to the timing chart illustrated in FIG. 19. Since the description with reference to the timing chart illustrated in FIG. 19 has already been made, a duplicate description is omitted.

At time t7, when the transfer transistor 123 of the pixel circuit 41 is turned on by the Hi transfer signal TX and the charge generated by the photodiode 121 is started to be transferred to the FD 125 (before it is started), the control pulse bias is turned off, no voltage is applied to the gate of the transistor 631, the transistor 631 is in a turned-off state, the potential of the parasitic capacitance 551 increases, and, as a result, the voltage of the FD 125 is boosted.

Thereafter, at the point of time when the transfer signal TX is returned to Low (at almost the same time or after the transfer signal TX returns to Low), when the control pulse bias is turned back on, the voltage is applied to the gate of the transistor 631, the transistor 631 is in a turned-on state, the potential of the parasitic capacitance 551 is lowered, and, as a result, the voltage of the FD 125 is stepped down.

In this manner, when the voltage of the FD 125 is once boosted at the start of transfer, the charge remaining in the FD 125 can be prevented from flowing back to the PD 121 side. Furthermore, after the voltage of the FD 125 is once boosted, the charge is transferred from the FD 125, and after that transfer, the voltage is returned to the original voltage such that the transfer that suppresses the generation of dark current in the FD 125 can be performed.

Note that the first to seventh configurations for controlling the current of the differential input circuit can be applied alone or in combination.

<Regarding Timing of Application of Control>

As described above, the noise in the ADC 42 is controlled on the basis of the result of the judgement of the judgement unit 401. The timing at which the result of the judgement of the judgement unit 401 is output and the timing at which the result of the judgement applied will be described with reference to FIG. 26.

The pixel 21 starts exposure at a predetermined timing. By the drive of the pixel 21 described with reference to FIG. 5, the discharge transistor 122 is always controlled to be off. However, as indicated by the broken lines in FIG. 5, at a desired time, the discharge signal OFG is set to Hi and the discharge transistor 122 is once turned on and then turned off to set an arbitrary exposure period. For example, the start of exposure can be defined by a falling pulse of OFG (FIG. 5).

Figure 5:
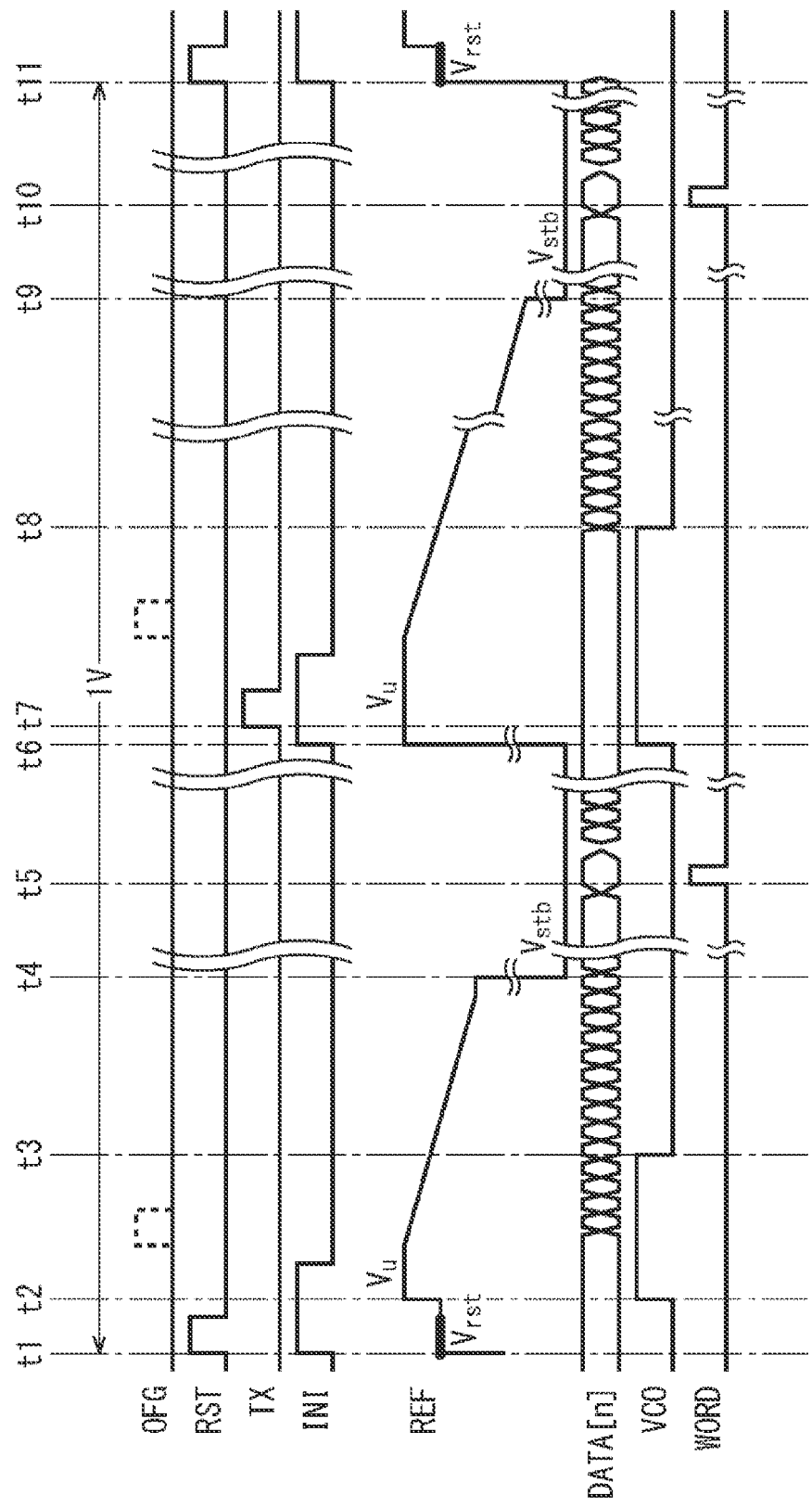
FIG. 5 is a timing chart for explaining the operation of a pixel.

The exposure time is from the start of exposure to the falling time of the transfer signal TX (FIG. 5). In the case of one ADC 42 per pixel, the ratio is 1:1. However, when the FD 125 is shared by a plurality of pixels and one ADC 42 is used, the exposure time can be individually set (pixel sharing will be described later).

An RST (reset) period is provided during the exposure period, the FD 125 is initialized, AutoZero of the comparison circuit 51 (FIG. 2) is performed, and preparations for starting the processing in the ADC 42 are performed. Thereafter, the positive feedback circuit (PSB) 63 is initialized, and, at the same time, the initial voltage of the DAC 25 is set.

After the reset period, a P-phase acquisition period (hereinafter simply referred to as a P-phase, P-phase acquisition period, etc.), which is an A/D conversion period of the reset level of the pixel. The voltage of the DAC 25 is gradually lowered, and data is written to the latch storage unit (FIG. 2). When the signal from the pixel circuit 41 input to the differential input circuit 61 and the signal from the DAC 25 have the same value (same voltage), the output from the comparison circuit 51 is inverted, and writing data is written on the latch storage unit 72.

Note that, here, the case where the positive feedback circuit 63 is provided is described as an example as a circuit for speeding up the reaction, but as long as a circuit can achieve a similar function (storage of latch data over a predetermined time), any other circuits may be used.

Data acquired in the P-phase acquisition period is output from the ADC 42 in the P-phase output period.

After the P-phase output period, a D-phase acquisition period (hereinafter simply referred to as D-phase, D-phase acquisition period, etc.) that is an A/D conversion period of the signal level of the pixel is provided. In the D-phase acquisition period, the transfer transistor 123 (FIG. 4) is turned on, and the signal of the photodiode 121 is transferred to the FD 125. The voltage of the DAC 25 is gradually lowered, and the time code from the time code transfer unit 23 is supplied to the latch control circuit 71 (FIG. 2).

When the signal from the pixel circuit 41 input to the differential input circuit 61 and the signal from the DAC 25 have the same value (same voltage), the output from the comparison circuit 51 is inverted, and the time code at that time is written in the latch storage unit 72.

By dropping the signal (slope) from the DAC 25 to the GND level (voltage at which the pixel current is turned off), the power consumed by the ADC 42 in the pixel 21 is set to the zero state, and the standby state is set.

On the other hand, the data acquired in the D-phase acquisition period is output from the ADC 42 in the D-phase output period.

A processing unit (not illustrated) that processes the signal from the ADC 42 performs CDS of the P-phase data and the D-phase data, thereby removing fixed pattern noise, FD 125 reset noise, and circuit reset noise.

At this time, the finally remaining noise is thermal noise, 1/f noise, and random telegraph signal (RTS) noise determined by the value of the current that the analog circuit flows during the operation. In order to control these noises, the noise can be reduced by controlling the current value in the circuit (ADC 42) according to the output signal level as described above.

Figure 26:
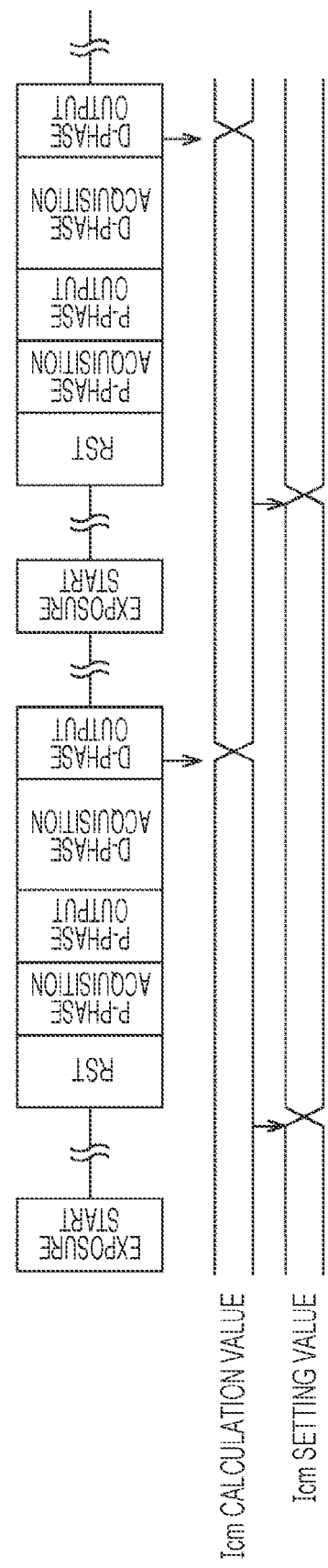
FIG. 26 is a diagram for explaining the timing of control.

Therefore, as the timing for controlling the noise according to the output signal level, for example, there is timing as illustrated in FIG. 26. Note that, here, the noise control by the bias circuit 501 will be described as an example.

The signals of all the pixels may be read to calculate the average value of the signals and calculate the amount of current flowing through a predetermined transistor in the ADC 42 from the average value. Furthermore, a part of the D-phase output may be read out, the luminance value thereof may be judged, and the current value (bias value) of the next frame may be calculated.

In FIG. 26, in the D-phase output period, the current value Icm is calculated by the judgement unit 401, and after the start of exposure of the next frame and before the reset period, the calculated current value Icm is applied to the analog circuit, for example, the differential input circuit 61 in the ADC 42.

Note that, the current value Icm can be configured to be calculated in the P-phase output period, and the current value Icm calculated in the D-phase acquisition period of the same frame can be applied. However, in such a case, data to which different current values Icm are applied in the P-phase and the D-phase in the same frame will be used, and in the CDS of the P-phase data and the D-phase data, there is a possibility that the noise cannot be removed properly.

Therefore, as described above, the current value Icm is calculated in the D-phase output period, and after the start of exposure of the next frame, before the reset period, i.e., in the P-phase acquisition period and the D-phase acquisition period of the next frame, the calculated current value Icm is configured to be applied.

Note that, the current value Icm can be calculated in the P-phase output period, and the calculated current value Icm can be configured to be applied during the P-phase acquisition period and the D-phase acquisition period of the next frame.

A description will be given of the calculation of the current value Icm. Here, a case where the maximum output value is 14 bits (taken from 0 to 16383) will be described as an example. In a case where the output after CDS is less than 4096 continues over 8 frames, the (captured) image to be processed is determined to be dark, and the setting value of the current value Icm for improving the noise on the low illuminance side is driven to increase.

On the other hand, in a case where the output after CDS continues for 8 frames with a value larger than 4096, it is considered that there are many high illuminance signals, and it is determined to be a bright image that may acquire a shot noise dominant image and is driven to reduce the setting of the current value Icm.

By providing hysteresis in this way, a mechanism that prevents the screen from flickering near the threshold of 4096 may be provided. Note that, although 8 frames were mentioned here as an example, it is needless to say that the number of frames may be other than 8 frames.

<Sharing Pixel Structure>

In the embodiment described above, the comparison circuit 51 is configured such that one ADC 42 is arranged in one pixel 21, but can be configured such that a plurality of pixels 21 shares one ADC 42.

Figure 27:
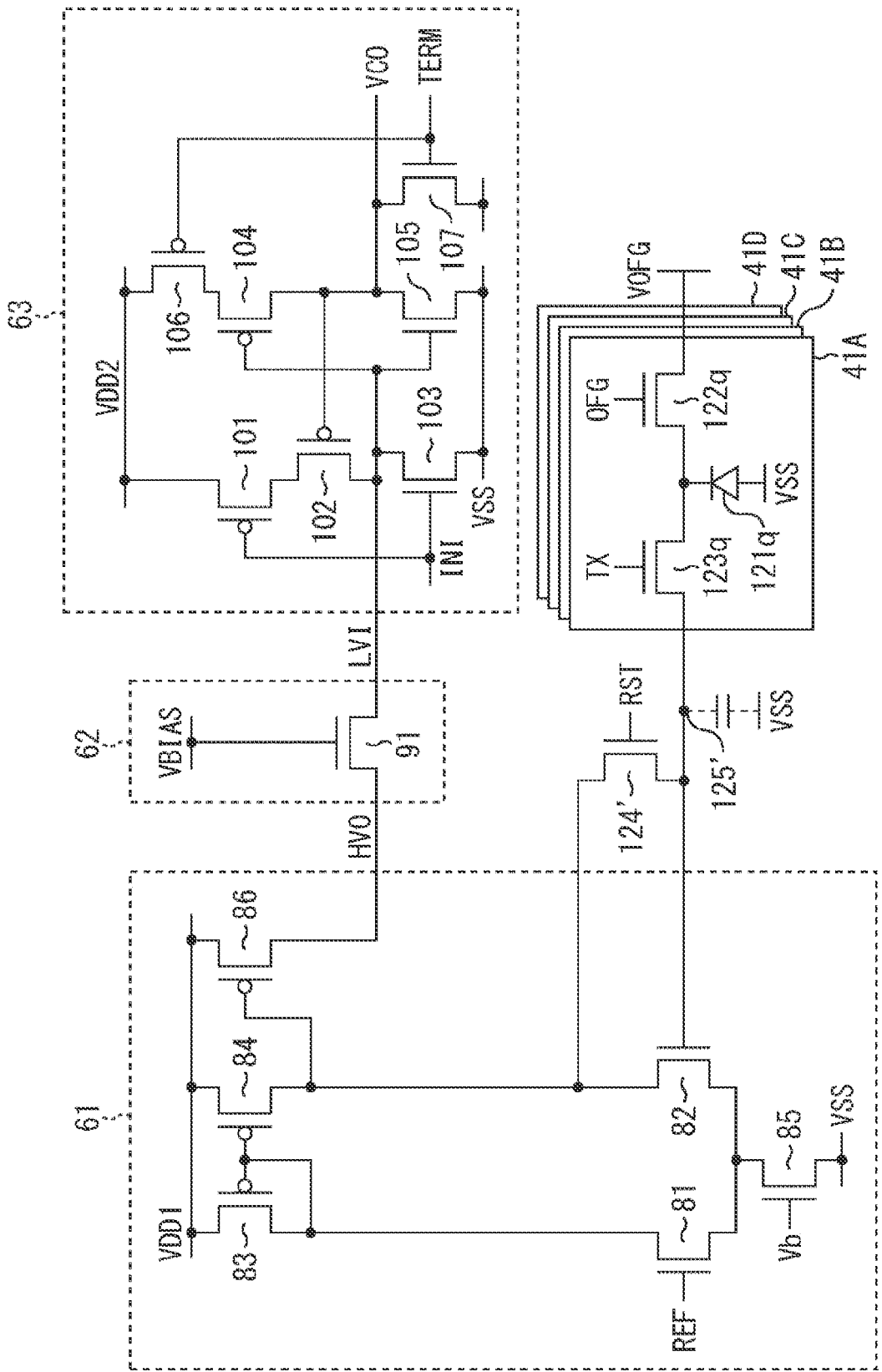
FIG. 27 is a circuit diagram illustrating a configuration example of a comparison circuit in the case of pixel sharing.

FIG. 27 is a circuit diagram illustrating a configuration example of the comparison circuit 51 in the case of pixel sharing in which one ADC 42 is shared by a plurality of pixels 21. FIG. 27 illustrates a configuration example of the comparison circuit 51 in a case where one ADC 42 is shared by four pixels 21: a pixel 21A, a pixel 21B, a pixel 21C, and a pixel 21D.

In FIG. 27, the configurations of the differential input circuit 61, the voltage conversion circuit 62, and the positive feedback circuit 63 constituting the comparison circuit 51 are similar to the configuration illustrated in FIG. 2.

In FIG. 27, pixel circuits 41A to 41D are provided for the four pixels 21A to 21D, and a photodiode 121q, a discharge transistor 122q, and a transfer transistor 123q are individually provided for the pixel circuits 41A to 41D. On the other hand, the reset transistor 124' and the FD 125' are shared by the four pixels 21A to 21D.

Note that, in FIG. 27, the circuit configuration illustrated in FIG. 2 is adopted as the circuit configuration of the comparison circuit 51, but other circuit configurations may be adopted.

In this way, the configuration illustrated in FIG. 12, 13, or 15 can be applied to sharing pixels in which a plurality of pixels 21 shares one ADC 42 to control the current in the ADC 42 (noise of the ADC 42).

The configuration of the differential input circuit 61 in the case of the pixel configuration of four pixel sharing illustrated in FIG. 27 is, for example, the same as the configuration of the differential input circuit 61 in the case of the pixel configuration, which is not pixel sharing illustrated in FIG. 12. Thus, for example, similar to the case illustrated in FIG. 12, the bias circuit 501 can be provided in the pixel configuration of four pixel sharing illustrated in FIG. 27, and the bias circuit 501 can be configured to be connected to the gate of the transistor 85 in the differential input circuit 61.

With this configuration, as in the case described with reference to FIG. 12, the current flowing through the transistor 85 can be controlled on the basis of the judgement of the judgement unit 401 (for example, judgement of whether the illumination is high or low), and the noise generated in (the comparison circuit 51 including) the differential input circuit 61 can be controlled.

Furthermore, similar to the case illustrated in FIG. 13, the DAC 25 is provided in the four pixel sharing pixel configuration illustrated in FIG. 27, and the DAC 25 can be configured to be connected to the gate of the transistor 81 in the differential input circuit 61.

With this configuration, as in the case described with reference to FIG. 13, the reference signal REF supplied to the transistor 81 can be controlled on the basis of the judgement of the judgement unit 401 (for example, judgement of whether the illumination is high or low), and the noise generated in (the comparison circuit 51 including) the differential input circuit 61 can be controlled.

Furthermore, similar to the case illustrated in FIG. 15, the bias circuit 501 and the DAC 25 can be provided in the four pixel sharing pixel configuration illustrated in FIG. 27, the bias circuit 501 can be connected to the gate of the transistor 85 in the differential input circuit 61, and the DAC 25 can be configured to be connected to the gate of the transistor 81 in the differential input circuit 61.

With this configuration, as in the case described with reference to FIG. 15, the current flowing through the transistor 85 can be controlled and the reference signal REF supplied to the transistor 81 can be controlled on the basis of the judgement of the judgement unit 401 (for example, judgement of whether the illumination is high or low), and the noise generated in (the comparison circuit 51 including) the differential input circuit 61 can be controlled.

<Regarding Timing of Application of Control in Sharing Pixels>

Figure 28:
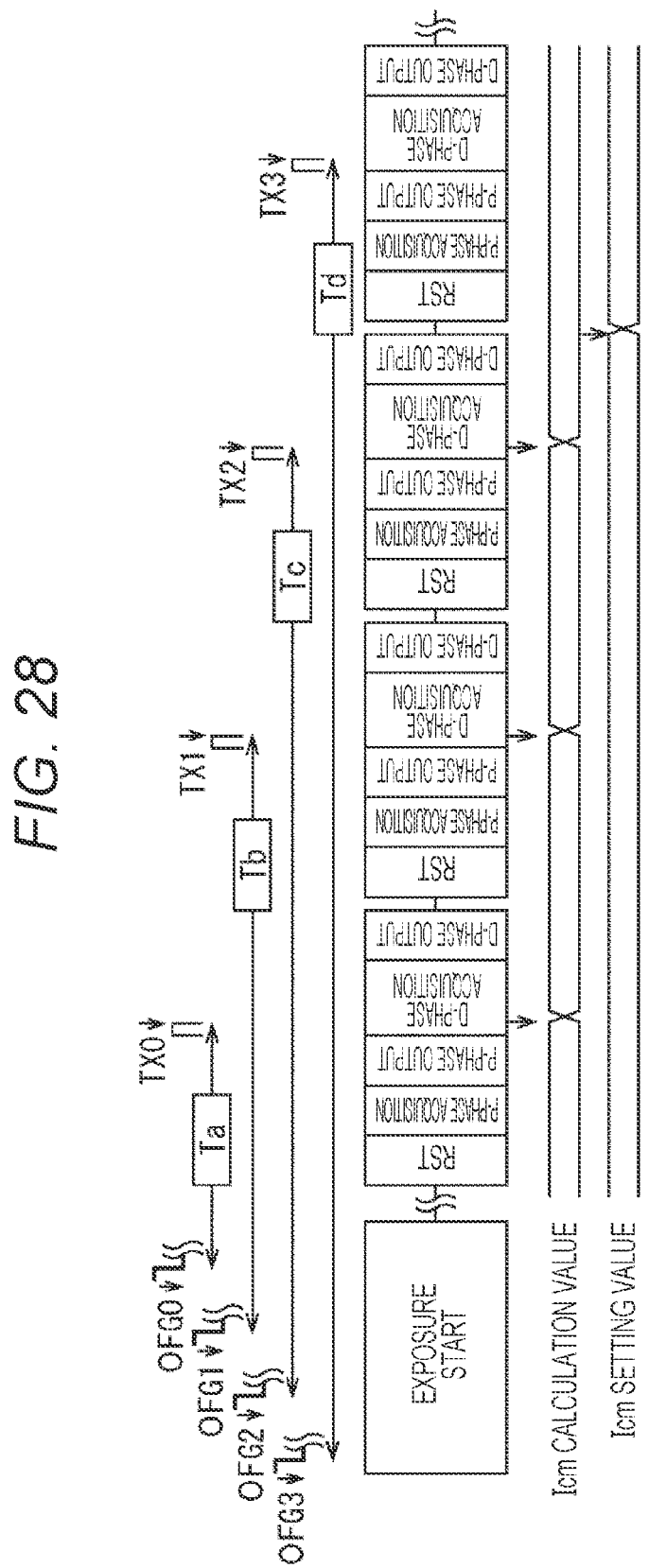
FIG. 28 is a diagram for explaining the timing of control.

The timing at which the result of judgement of the judgement unit 401 in the sharing pixels is output and the timing at which the result of the judgement is applied will be described with reference to FIG. 28.

In the sharing pixels, the processing performed by each pixel circuit 41 is similar to the case described with reference to FIG. 26. That is, each pixel circuit 41 is provided with a reset period, a P-phase acquisition period, a P-phase output period, a D-phase acquisition period, and a D-phase output period after the start of exposure, and executes a corresponding process in each period.

Here, a case where exposure is started by turning on the discharge transistor 122 (OFG) will be described as an example. In each pixel circuit 41, the exposure period is from the fall of the discharge transistor 122 provided in each pixel circuit 41 to the fall of the transfer transistor 123.

By controlling the four pixels individually, it is possible to acquire four global shutter images shifted by one pixel in terms of spatial resolution. By individually controlling the exposure times of these four images (not having the same exposure time), high dynamic range (HDR) imaging becomes possible.

For example, when the exposure time of the pixel circuit 41A is Ta, the exposure time of the pixel circuit 41B is Tb, the exposure time of the pixel circuit 41C is Tc, and the exposure time of the pixel circuit 41D is Td such that Ta:Tb:Tc:Td=1:4:16:64, the dynamic range can be increased 64 times in the exposure time ratio.

Even if an image is saturated at 64 times exposure, whiteout can be prevented when it is not saturated at 1 time exposure.

When such a drive is performed, in a case where it is dark as a whole without saturation at the shortest exposure time Ta, for example, when it is a value of 64 LSB or less with 1 bit, in a case where acquisition is made with the exposure time Td, output after CDS is likely to be 4096 or less. In such a case, as in the case described with reference to FIG. 26, for example, after reading out the exposure time Td having the longest exposure time after eight consecutive frames, the current Icm in the differential input circuit 61 or the current of the reference signal Ref (generated by the DAC 25) supplied to the differential input circuit 61 is controlled, and the generation of noise is suppressed.

Furthermore, in the case where only the exposure time Ta is used and the setting accuracy cannot be obtained due to the influence of shot noise or the like, control may be made such that signals of the exposure time Tb and Tc are used in combination to similarly judge whether, for example, the average value at the exposure time Tb exceeds 256 and the average value at the exposure time Tc exceeds 1024, and the result is applied to the exposure time Td after a certain frame.

Furthermore, the calculation may be performed with the exposure time Td of a predetermined frame, and the calculated setting may be applied to the exposure times Ta, Tb, Tc, Td of the next frame after the predetermined frame. According to such control, it is possible to optimize power consumption by applying only to long-time exposure Td in which a dark image that is most desired to avoid the influence of noise is output while performing shooting by HDR.

Note that, here, the case where the output is performed four times in the order of the P phase and the D phase has been described as an example, but the present technology described above can be basically similarly applied to reading in the order of the reverse D phase and the P phase, combined reading of the P phase and the D phase, or twice reading, 16 times reading, or the like, not four times reading.

Note that, here, four-pixel sharing has been described as an example, but the present technology can also be applied to, for example, two-pixel sharing or the like, other than four-pixel sharing.

<Multiple Substrate Configuration>

In the description heretofore, the imaging apparatus 1 has been described as being formed on a single semiconductor substrate 11, but the imaging apparatus 1 may be configured by creating circuits on a plurality of semiconductor substrates 11.

Figure 29:
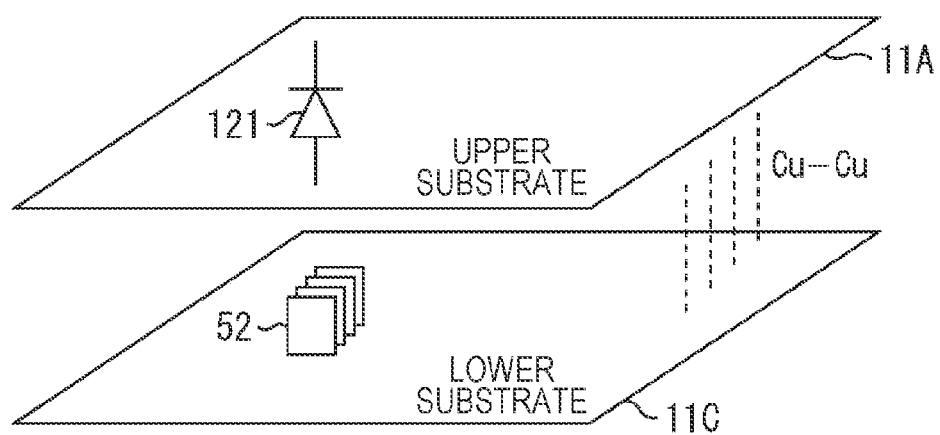
FIG. 29 is a conceptual diagram of an imaging apparatus configured by a stack of two semiconductor substrates.

FIG. 29 is a conceptual diagram constituting the imaging apparatus 1 by stacking two semiconductor substrates 11: an upper substrate 11A and a lower substrate 11C.

At least the pixel circuit 41 including the photodiode 121 is formed on the upper substrate 11A. The lower substrate 11C is provided with at least the data storage unit 52 for storing a time code and the time code transfer unit 23. The upper substrate 11A and the lower substrate 11C are bonded by, for example, a metal bonding or the like, of Cu—Cu or the like.

Figure 30:
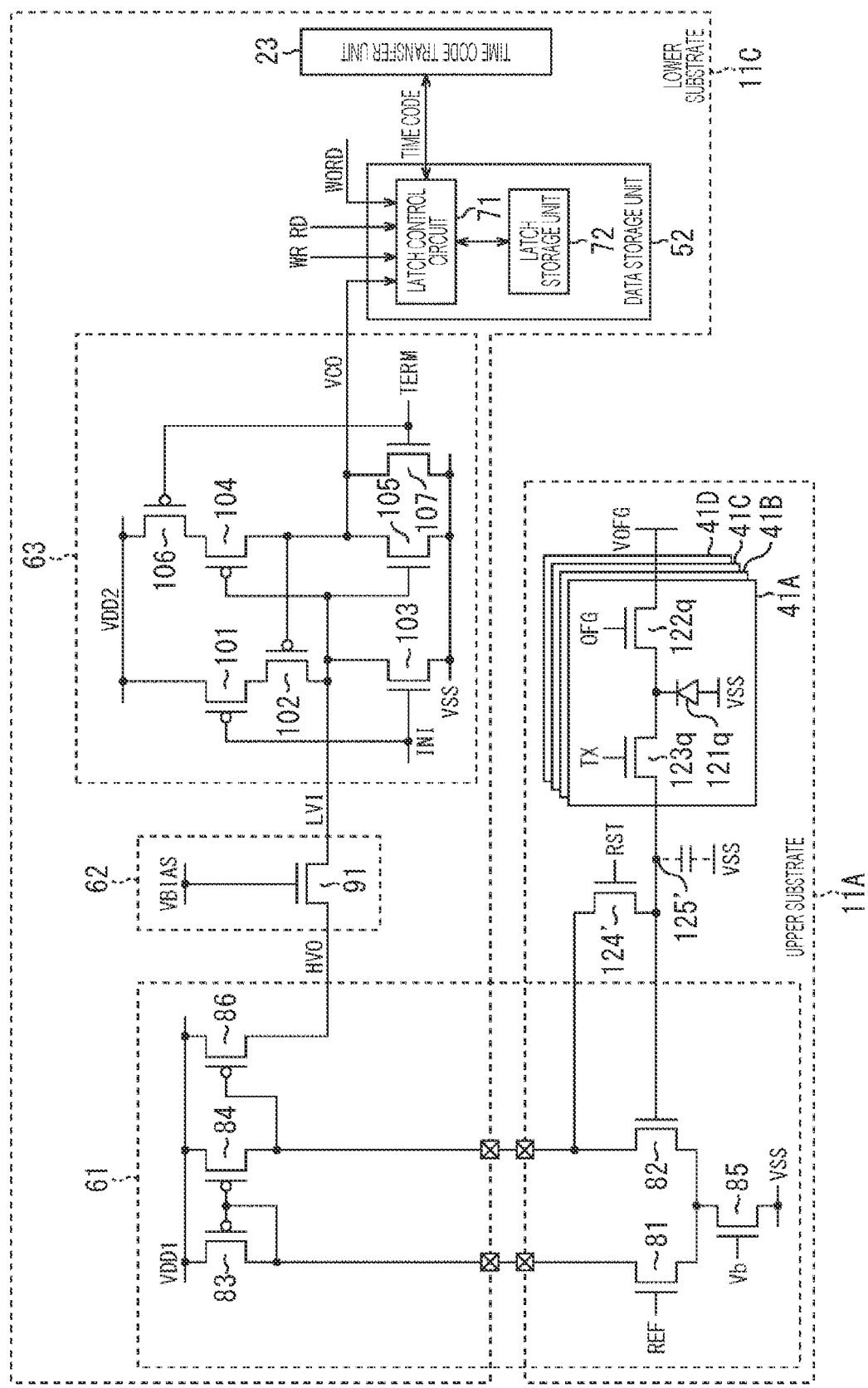
FIG. 30 is a diagram illustrating a circuit configuration example in a case where an imaging apparatus is configured by two semiconductor substrates.

FIG. 30 illustrates a circuit configuration example formed on each of the upper substrate 11A and the lower substrate 11C. On the upper substrate 11A, the pixel circuit 41 and a circuit of the transistors 81, 82, and 85 of the differential input circuit 61 of the ADC 42 are formed. On the lower substrate 11C, the circuit of the ADC 42 excluding the transistors 81, 82, and 85 and the time code transfer unit 23 are formed.

The upper substrate 11A may be a pixel wafer made only of NMOS, and the lower substrate 11C may be a logic wafer on which circuits ahead of the PMOS included in the differential input circuit 61 are formed. By configuring in this way, in response to the slow response of the PMOS of the differential input circuit 61, when the NOR threshold value of the latter stage is exceeded, the feedback (positive feedback) to the PMOS to the constant voltage side is made to sharply perform reaction.

For this reason, the time of the through current is minimized, and at the same time, a digital signal (Gray code) supplied from the outside can be accurately latched and stored. The latched data is output to an external processing unit and used for processing such as CDS.

<Multiple Substrate Configuration 2>

FIGS. 29 and 30 are an example in which the imaging apparatus 1 is configured by two semiconductor substrates 11, but may be configured by three semiconductor substrates 11.

Figure 31:
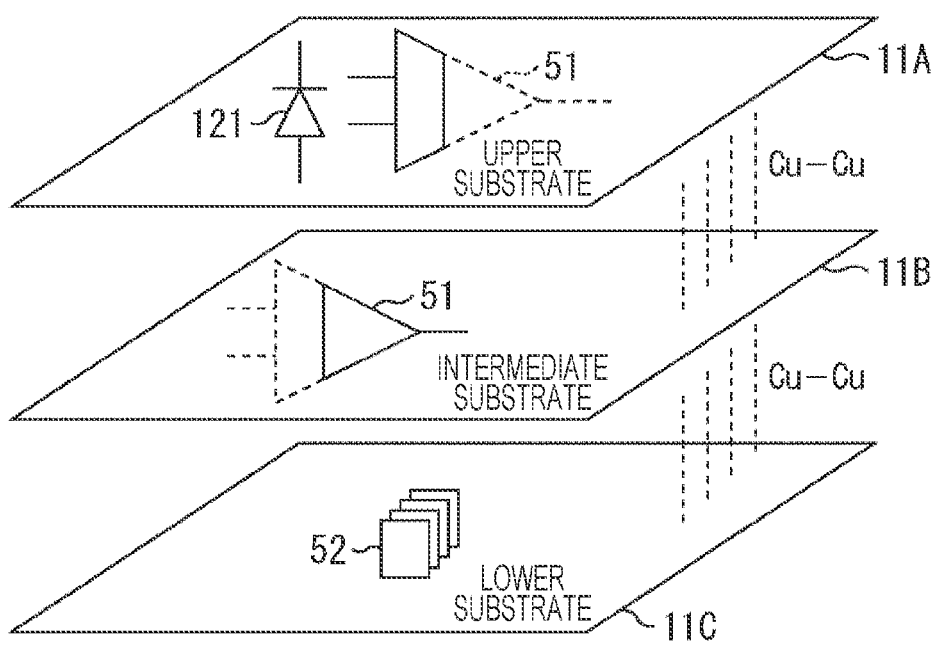
FIG. 31 is a conceptual diagram of an imaging apparatus configured by a stack of three semiconductor substrates.

FIG. 31 illustrates a conceptual diagram constituting the imaging apparatus 1 by stacking three semiconductor substrates 11: an upper substrate 11A, an intermediate substrate 11B, and a lower substrate 11C.

On the upper substrate 11A, the pixel circuit 41 including the photodiode 121 and at least a part of the comparison circuit 51 are formed. The lower substrate 11C is provided with at least the data storage unit 52 for storing a time code and the time code transfer unit 23. On the intermediate substrate 11B, the remaining circuits of the comparison circuit 51 that are not arranged on the upper substrate 11A are formed. The upper substrate 11A and the intermediate substrate 11B, and the intermediate substrate 11B and the lower substrate 11C are bonded by, for example, metal bonding or the like, of Cu—Cu or the like.

Figure 32:
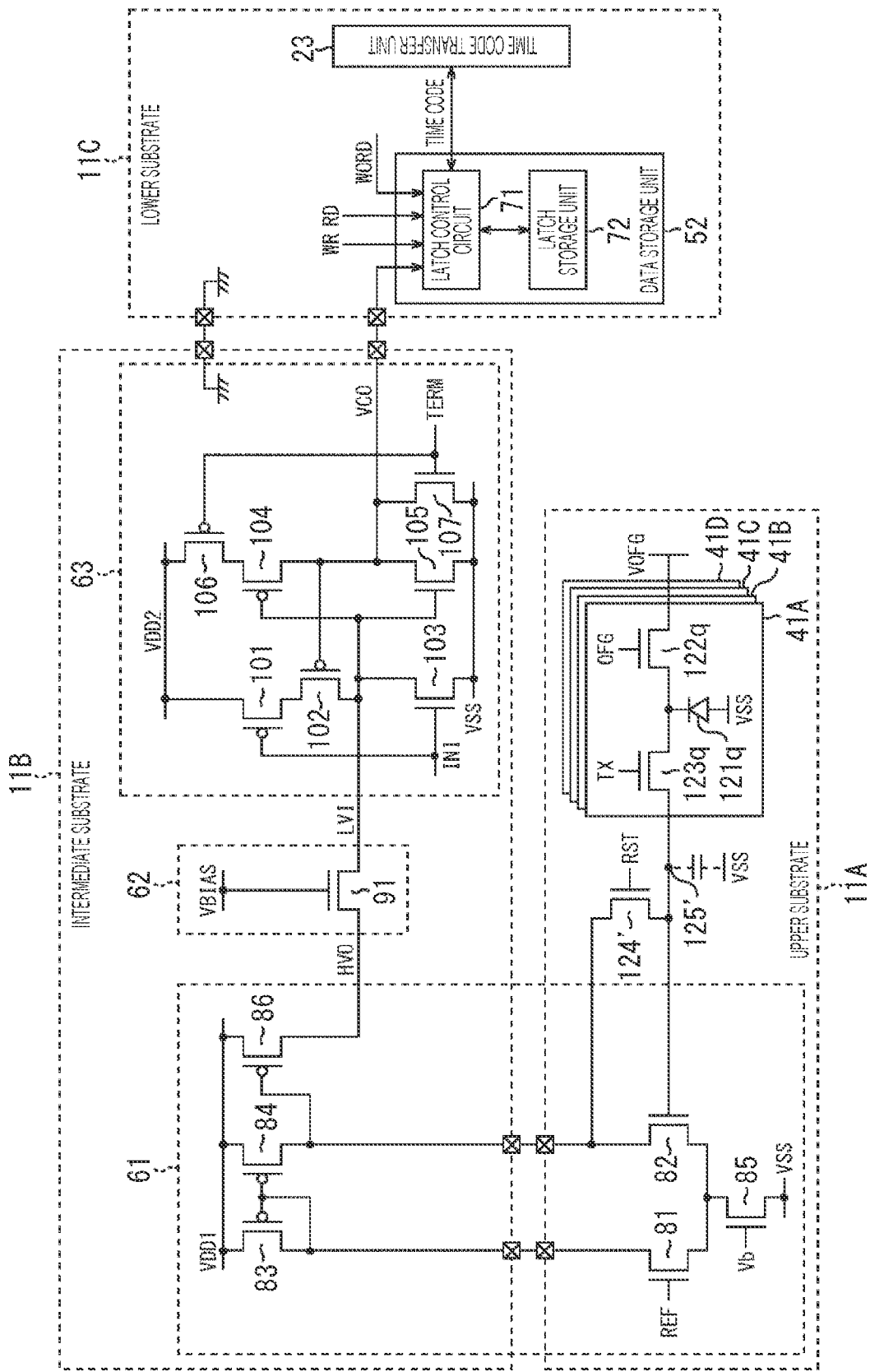
FIG. 32 is a diagram illustrating a circuit configuration example in a case where an imaging apparatus is configured by three semiconductor substrates.

FIG. 32 illustrates a circuit arrangement example of each semiconductor substrate 11 in a case where the imaging apparatus 1 includes three semiconductor substrates 11.

In the example of FIG. 32, the circuit disposed on the upper substrate 11A is the same as the circuit of the upper substrate 11A illustrated in FIG. 30, the remaining circuits of the comparison circuit 51 are disposed on the intermediate substrate 11B, and the data storage unit 52 and the time code transfer unit 23 are disposed on the lower substrate 11C.

In the example illustrated in FIGS. 29 to 32, the judgement unit 401, the bias circuit 501, the DAC 25, and the like can be formed on the lower substrate 11C. Furthermore, a substrate to be further stacked on the lower substrate 11C may be provided, and the judgement unit 401, the bias circuit 501, the DAC 25, and the like may be formed on the substrate.

Furthermore, the imaging apparatus 1 may have a stacked structure, and the ADC 42 may be configured to be connected to each pixel. For example, a photoelectric conversion element (photodiode 121) may be included in the first layer, a conversion unit (ADC 42) may be connected with respect to each photoelectric conversion element, and the conversion unit may be configured to be formed in the second layer below the first layer.

Furthermore, a structure including a plurality of image sensors (imaging apparatus 1) having two or more layers may be possible, and each of the plurality of image sensors may be an imaging apparatus 1 that detects different light, for example, radiation, infrared light, ambient light, or the like.

<Other Configurations>

The present technology is not limited to the scope applied to the configuration described above with reference to FIG. 10, for example, and can also be applied to the configuration illustrated below.

Figure 33:
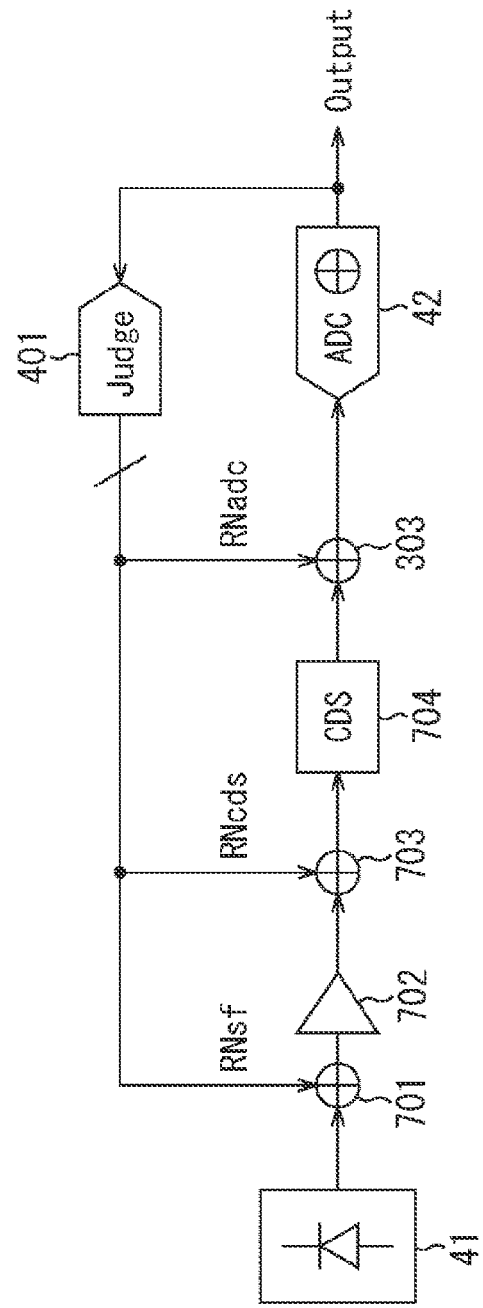
FIG. 33 is a diagram for explaining another configuration of a circuit including a judgement unit.

FIG. 33 is a diagram illustrating another configuration of the ADC 42 and peripheral circuits to which the present technology is applied. According to a comparison with the configuration illustrated in FIG. 10, the configuration illustrated in FIG. 33 is a configuration in which a source follower 702 and a CDS 604 are added between the pixel circuit 41 and the ADC 42 (adding unit 303). Furthermore, an adding unit 701 for controlling the noise in the source follower 702 and an adding unit 703 for controlling the noise in the CDS 604 are also configured to be added.

The judgement unit 401 controls the amount of noise of the source follower 702, the CDS 604, and the ADC 42 according to the output from the ADC 42. The judgement unit 401 controls the amount of noise of at least one of the source follower 702, the CDS 604, and the ADC 42.

FIG. 33 illustrates the case where the judgement result of the judgement unit 401 is supplied to each of the adding unit 701, the adding unit 703, and the adding unit 303, but, for example, the judgement result can be configured to be supplied only to the adding unit 701 of the source follower 702. Furthermore, the judgement result from the judgement unit 401 can be supplied only to the CDS 604 or to the ADC 42 only.

Furthermore, as illustrated in FIG. 33, the judgement result of the judgement unit 401 may be supplied to the adding unit 701, the adding unit 703, and the adding unit 303 respectively, and the amount of noise of the source follower 702, the CDS 604, and the ADC 42 may be controlled respectively. At this time, the same judgement result may be supplied, or different judgement results suitable for each may be supplied.

In the configuration illustrated in FIG. 33, for example, the current of the current source of the source follower 702 is controlled, and a reduction in noise and a reduction in power consumption are achieved. Furthermore, for example, by controlling the current of the analog elements constituting the CDS 604, noise reduction and power consumption reduction are achieved. Furthermore, when the current in the ADC 42 is controlled as described above, noise reduction and power consumption reduction are achieved.

Figure 34:
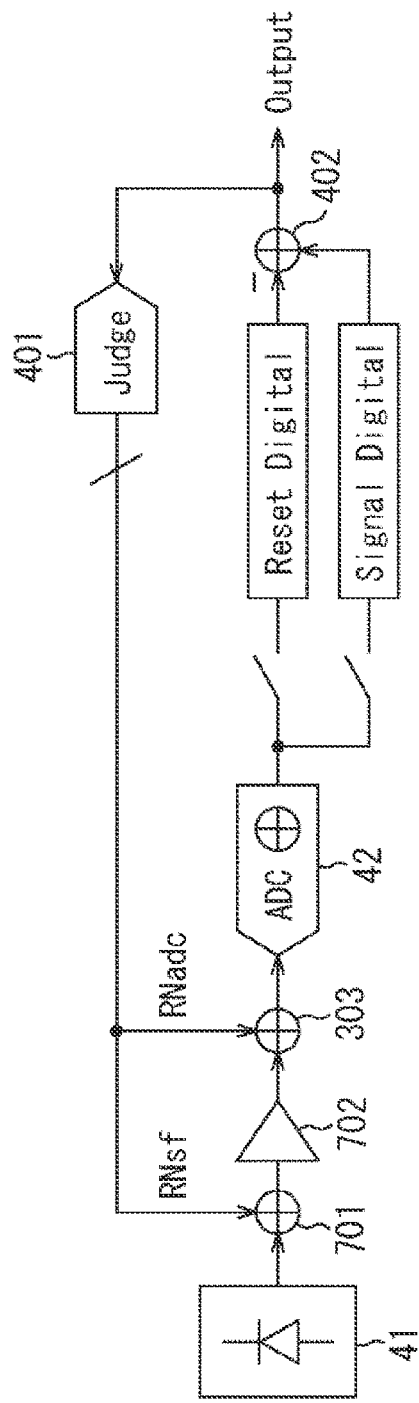
FIG. 34 is a diagram for explaining another configuration of a circuit including a judgement unit.

FIG. 34 is a diagram illustrating another configuration of the ADC 42 and peripheral circuits to which the present technology is applied. According to a comparison with the configuration illustrated in FIG. 10, the configuration illustrated in FIG. 34 is a configuration in which the source follower 702 is added between the pixel circuit 41 and the ADC 42 (adding unit 303). Furthermore, the adding unit 701 for controlling the noise in the source follower 702 is also configured to be added.

The configuration illustrated in FIG. 34 illustrates a configuration of the case where the present technology is applied to a slope-type column ADC. In such a configuration, only one of the source follower 702 and the ADC 42 can be configured to control the amount of noise. Furthermore, the amount of noise of the source follower 702 and the ADC 42 can be configured to be controlled respectively.

In a case where the amount of noise of the source follower 702 and the ADC 42 is controlled, regarding the judgement result from the judgement unit 401, the same judgement result may be supplied or different judgement results may be supplied.

In the configuration illustrated in FIG. 34, for example, the current of the current source of the source follower 702 is controlled, and a reduction in noise and a reduction in power consumption are achieved. Furthermore, when the current in the ADC 42 is controlled as described above, noise reduction and power consumption reduction are achieved.

Figure 35:
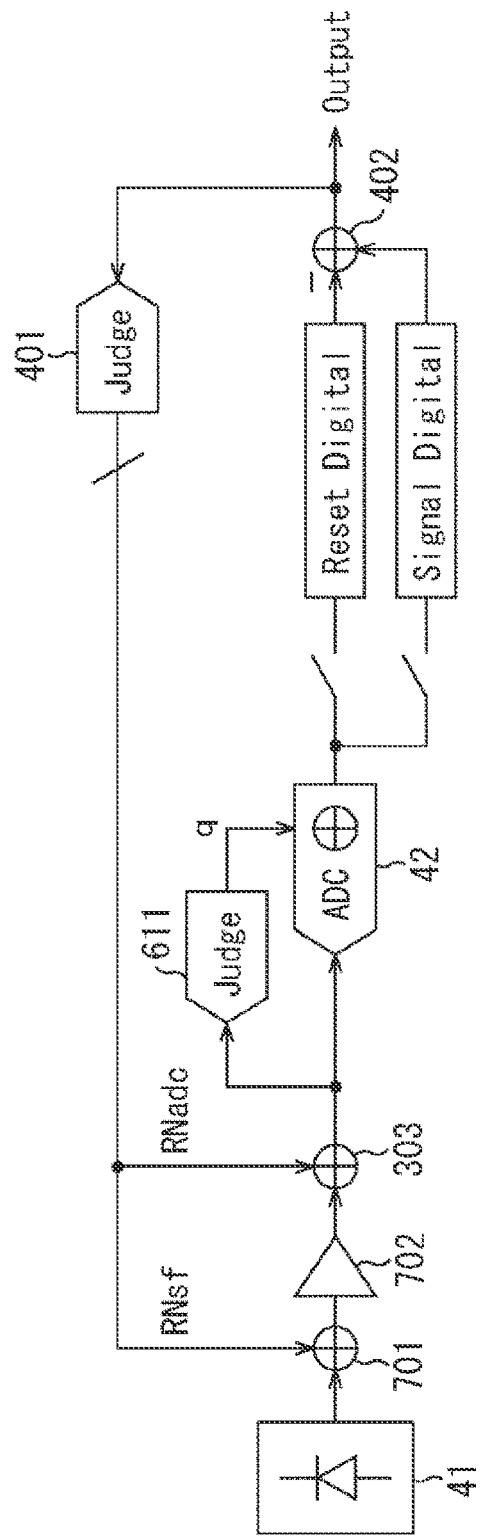
FIG. 35 is a diagram for explaining another configuration of a circuit including a judgement unit.

FIG. 35 is a diagram illustrating another configuration of the ADC 42 and peripheral circuits to which the present technology is applied. According to a comparison with the configuration illustrated in FIG. 10, the configuration illustrated in FIG. 35 is a configuration in which the source follower 702 is added between the pixel circuit 41 and the ADC 42 (adding unit 303). Furthermore, the adding unit 701 for controlling the noise in the source follower 702 is also configured to be added. Moreover, a judgement unit 711 that controls the ADC 42 according to the output from the source follower 702 is configured to be added.

The configuration illustrated in FIG. 35 illustrates a configuration of the case where the present technology is applied to an adaptive gain multi-slope ADC. In such a configuration, only one of the source follower 702 and the ADC 42 can be configured to control the amount of noise. Furthermore, the amount of noise of the source follower 702 and the ADC 42 can be configured to be controlled respectively.

In a case where the amount of noise of the source follower 702 and the ADC 42 is controlled, regarding the judgement result from the judgement unit 401, the same judgement result may be supplied or different judgement results may be supplied.

In the configuration illustrated in FIG. 35, for example, the current of the current source of the source follower 702 is controlled, and a reduction in noise and a reduction in power consumption are achieved. Furthermore, when the current in the ADC 42 is controlled as described above, noise reduction and power consumption reduction are achieved.

Figure 36:
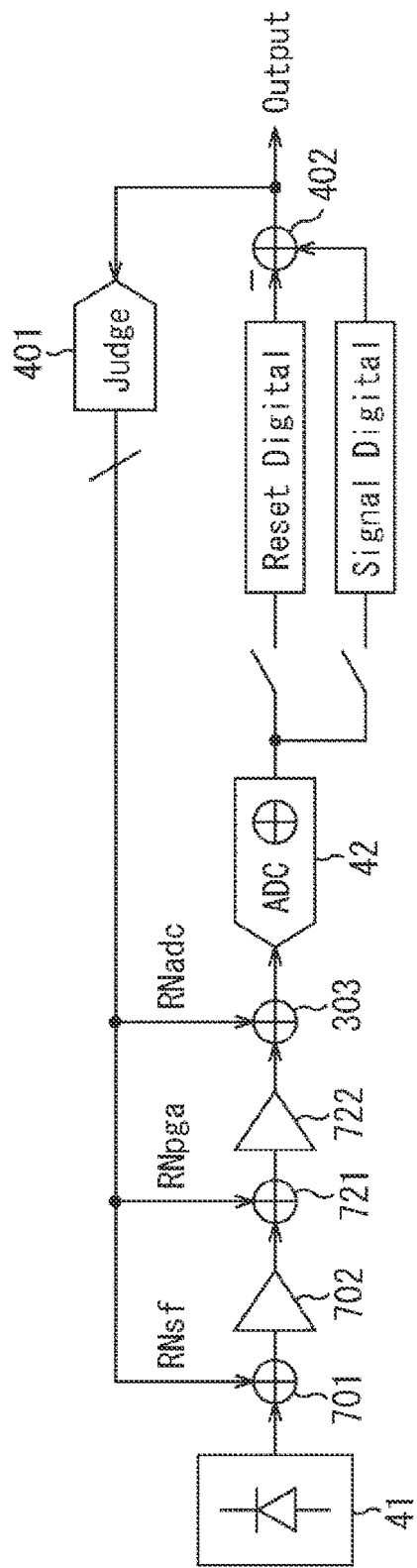
FIG. 36 is a diagram for explaining another configuration of a circuit including a judgement unit.

FIG. 36 is a diagram illustrating another configuration of the ADC 42 and peripheral circuits to which the present technology is applied. According to a comparison with the configuration illustrated in FIG. 10, the configuration illustrated in FIG. 36 is a configuration in which the source follower 702 and a gain amplifier 722 are added between the pixel circuit 41 and the ADC 42 (adding unit 303). Furthermore, the adding unit 701 for controlling the noise in the source follower 702 and an adding unit 721 for controlling the noise in the gain amplifier 722 are also configured to be added.

The judgement unit 401 controls the amount of noise of each of the source follower 702, the gain amplifier 722, and the ADC 42 in accordance with the output from the ADC 42. The judgement unit 401 controls the amount of noise of at least one of the source follower 702, the gain amplifier 722, and the ADC 42.

The judgement unit 401 may supply the same judgement result or may supply different judgement results to the source follower 702, the gain amplifier 722, and the ADC 42.

In the configuration illustrated in FIG. 36, for example, the current of the current source of the source follower 702 is controlled, and a reduction in noise and a reduction in power consumption are achieved. Furthermore, for example, by controlling the current of the analog elements constituting the gain amplifier 722, noise reduction and power consumption reduction are achieved. Furthermore, when the current in the ADC 42 is controlled as described above, noise reduction and power consumption reduction are achieved.

The present technology can be applied to any of these configurations, and by applying the present technology, the current consumed by an analog circuit such as a source follower, a gain amplifier, a CDS, an ADC, or the like can be variably adjusted adaptively from an AD-converted output signal such that low power can be achieved at high illuminance and low noise can be achieved at low illuminance.

Furthermore, the stacked structure described with reference to FIGS. 29 to 22 can be applied to any of these configurations.

<Examples of Application to Electronic Equipment>

The present disclosure is not limited to application to an imaging apparatus. That is, the present disclosure can be generally applied to electronic equipment using an imaging apparatus in an image capturing unit (photoelectric conversion unit) such as an imaging apparatus such as a digital still camera, video camera, or the like, a portable terminal apparatus having an imaging function, or a copying machine using the imaging apparatus for an image reading unit. The imaging apparatus may be in a form of being formed as one chip or may be in a module form having an imaging function in which an imaging unit and a signal processing unit or an optical system are collectively packaged.

Figure 37:
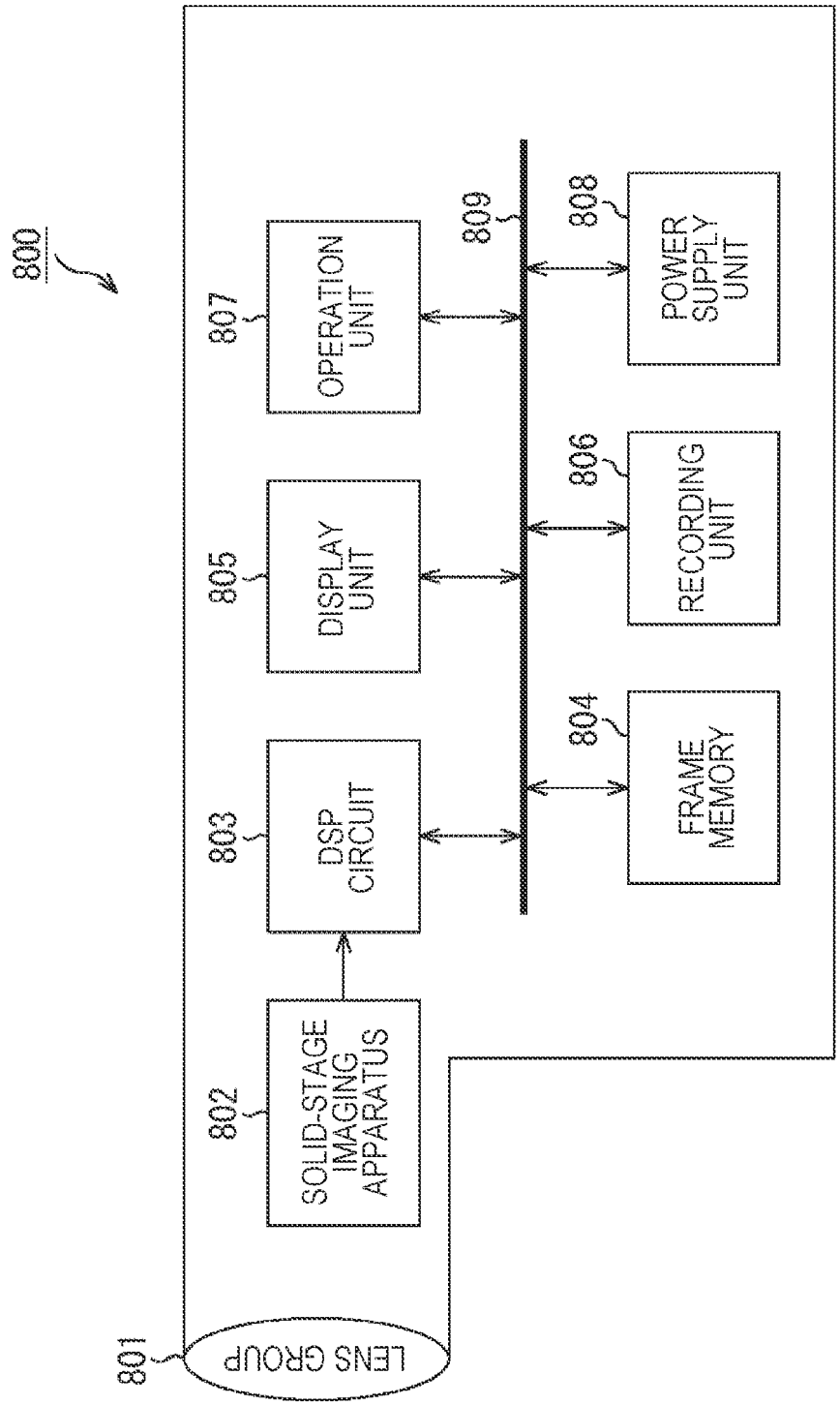
FIG. 37 is a block diagram illustrating a configuration example of an imaging apparatus as electronic equipment according to the present disclosure.

FIG. 37 is a block diagram illustrating a configuration example of an imaging apparatus as electronic equipment according to the present disclosure.

An imaging apparatus 800 in FIG. 37 includes an optical unit 801 including a lens group and the like, an imaging apparatus (imaging device) 802 that adopts the configuration of the imaging apparatus 1 described above, and a digital signal processor (DSP) circuit 803 that is a camera signal processing circuit. Furthermore, the imaging apparatus 800 also includes a frame memory 804, a display unit 805, a recording unit 806, an operation unit 807, and a power supply unit 808. The DSP circuit 803, the frame memory 804, the display unit 805, the recording unit 806, the operation unit 807, and the power supply unit 808 are connected to each other via a bus line 809.

The optical unit 801 takes in incident light (image light) from a subject and forms an image on an imaging surface of the imaging apparatus 802. The imaging apparatus 802 converts the amount of incident light that forms an image on the imaging surface by the optical unit 801 into an electric signal in units of pixel, and outputs the electric signal as a pixel signal.

The display unit 805 includes, for example, a panel-type display apparatus, e.g., a liquid crystal panel or an organic electro luminescence (EL) panel, and displays a moving image or a still image captured by the imaging apparatus 802. The recording unit 806 records a moving image or a still image captured by the imaging apparatus 802 on a recording medium such as a hard disk, a semiconductor memory, or the like.

The operation unit 807 issues operation instructions with respect to various functions of the imaging apparatus 800 under a user's operation. The power supply unit 808 appropriately supplies various power sources, which are operation power for the DSP circuit 803, the frame memory 804, the display unit 805, the recording unit 806, and the operation unit 807, to these supply targets.

As the imaging apparatus 802, the imaging apparatus 1 adopting the above-described configuration can be used.

The present disclosure is applicable not only to an imaging apparatus but also to all semiconductor apparatuses having other semiconductor integrated circuits.

An embodiment of the present disclosure is not limited to the aforementioned embodiment, but various changes may be made within a scope without departing from the gist of the present disclosure.

Although the circuit configuration of each of the above-described embodiments has been described as a circuit configuration using electrons as charges, the present disclosure may be a circuit configuration using holes as charges. Furthermore, in each circuit configuration described above, it is possible to achieve a circuit configuration in which the polarities of the transistors (NMOS transistor and PMOS transistor) are switched. In this case, the control signal input to the transistor is a signal in which Hi and Low are reversed.

In each of the embodiments described above, the reference signal REF has been described as a slope signal whose level (voltage) monotonously decreases with time, but the reference signal REF may be a slope signal whose level (voltage) monotonously increases with time.

In addition, the form which combines all or one part of the aforementioned plurality of embodiments can be adopted. A form in which other embodiments that are not described in the above-described embodiments are appropriately combined may be provided.

<Application Example for In-Vivo Information Acquisition System>

The technology according to the present disclosure (present technology) is applicable to a variety of products. For example, the technology according to the present disclosure may be applied to an endoscopic surgery system.

Figure 38:
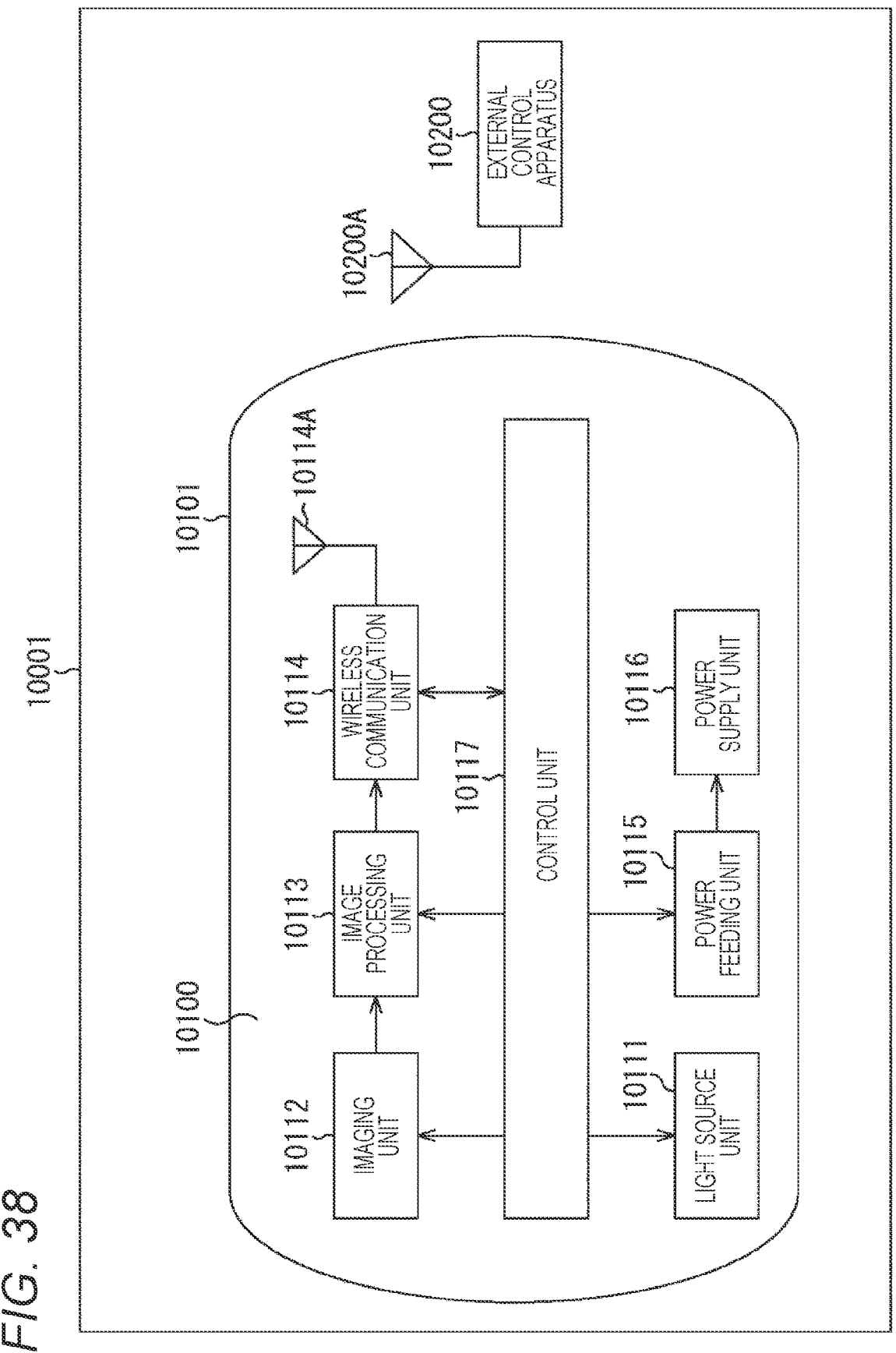
FIG. 38 is a block diagram illustrating an example of a schematic configuration of an in-vivo information acquisition system.

FIG. 38 is a block diagram illustrating an example of a schematic configuration of a patient in-vivo information acquisition system using a capsule endoscope to which the technology according to the present disclosure (present technology) can be applied.

An in-vivo information acquisition system 10001 includes a capsule endoscope 10100 and an external control apparatus 10200.

The capsule endoscope 10100 is swallowed by a patient at the time of examination. The capsule endoscope 10100 has an imaging function and a wireless communication function, moves inside the organs such as the stomach and the intestine by peristaltic motion or the like until it is spontaneously discharged from the patient, sequentially capture images of the inside of the organs (hereinafter also referred to as in-vivo images) at predetermined intervals, and sequentially wirelessly transmits information about the in-vivo images to the external control apparatus 10200 outside the body.

The external control apparatus 10200 comprehensively controls the operation of the in-vivo information acquisition system 10001. Furthermore, the external control apparatus 10200 receives information about the in-vivo image transmitted from the capsule endoscope 10100, and on the basis of the received information about the in-vivo image, generates image data for displaying the in-vivo image on a display apparatus (not illustrated).

In the in-vivo information acquisition system 10001, in this way, the in-vivo image obtained by capturing the state of the patient's body can be obtained from time to time until the capsule endoscope 10100 is swallowed and discharged.

The configurations and functions of the capsule endoscope 10100 and the external control apparatus 10200 will be described in more detail.

The capsule endoscope 10100 includes a capsule-type housing 10101. In the housing 10101, a light source unit 10111, an imaging unit 10112, an image processing unit 10113, a wireless communication unit 10114, a power feeding unit 10115, and a power supply unit 10116, and a control unit 10117 are accommodated.

The light source unit 10111 includes a light source, for example, a light emitting diode (LED), or the like, and irradiates the imaging field of the imaging unit 10112 with light.

The imaging unit 10112 includes an image sensor and an optical system including a plurality of lenses provided in the preceding stage of the image sensor. Reflected light (hereinafter referred to as observation light) of light emitted to the body tissue to be observed is collected by the optical system and is incident on the image sensor. In the imaging unit 10112, in the image sensor, the observation light incident thereon is photoelectrically converted, and an image signal corresponding to the observation light is generated. The image signal generated by the imaging unit 10112 is provided to the image processing unit 10113.

The image processing unit 10113 is configured by a processor such as a central processing unit (CPU), a graphics processing unit (GPU), or the like, and performs various types of signal processing on the image signal generated by the imaging unit 10112. The image processing unit 10113 provides the image signal subjected to signal processing to the wireless communication unit 10114 as RAW data.

The wireless communication unit 10114 performs predetermined processing such as modulation processing or the like on the image signal that has been subjected to signal processing by the image processing unit 10113, and transmits the image signal to the external control apparatus 10200 via an antenna 10114A. Furthermore, the wireless communication unit 10114 receives a control signal related to drive control of the capsule endoscope 10100 from the external control apparatus 10200 via the antenna antenna 10114A. The wireless communication unit 10114 provides the control signal received from the external control apparatus 10200 to the control unit 10117.

The power feeding unit 10115 includes a power receiving antenna coil, a power regeneration circuit that regenerates power from a current generated in the antenna coil, a booster circuit, and the like. In the power feeding unit 10115, electric power is generated using a so-called non-contact charging principle.

The power supply unit 10116 is configured by a secondary battery, and stores the power generated by the power feeding unit 10115. In FIG. 38, in order to avoid complication of the drawing, illustration of an arrow or the like indicating a destination of power supply from the power supply unit 10116 is omitted, but the power stored in the power supply unit 10116 is supplied to the light source unit 10111, the imaging unit 10112, the image processing unit 10113, the wireless communication unit 10114, and the control unit 10117, and can be used for driving them.

The control unit 10117 includes a processor such as a CPU, and controls according to a control signal transmitted from the external control apparatus 10200 to drive the light source unit 10111, the imaging unit 10112, the image processing unit 10113, the wireless communication unit 10114, and the power feeding unit 10115.

The external control apparatus 10200 is configured by a processor such as a CPU, a GPU, or the like, a microcomputer or a control board in which a processor and a storage element such as a memory are mounted. The external control apparatus 10200 controls the operation of the capsule endoscope 10100 by transmitting a control signal to the control unit 10117 of the capsule endoscope 10100 via the antenna 10200A. In the capsule endoscope 10100, for example, the light irradiation condition on the observation target in the light source unit 10111 can be changed by a control signal from the external control apparatus 10200. Furthermore, an imaging condition (for example, a frame rate, an exposure value, or the like in the imaging unit 10112) can be changed by a control signal from the external control apparatus 10200. Furthermore, the content of processing in the image processing unit 10113 and the conditions for the wireless communication unit 10114 to transmit an image signal (for example, a transmission interval, the number of transmission images, or the like) may be changed by a control signal from the external control apparatus 10200.

Furthermore, the external control apparatus 10200 performs various types of image processing on the image signal transmitted from the capsule endoscope 10100, and generates image data for displaying the captured in-vivo image on the display apparatus. For example, various signal processing such as development processing (demosaic processing), high-image quality processing (band emphasizing processing, super-resolution processing, noise reduction (NR) processing and/or shake correction processing, or the like), and/or magnification processing (electronic zoom processing), may be performed. The external control apparatus 10200 controls the drive of the display apparatus to display the in-vivo image captured on the basis of the generated image data. Alternatively, the external control apparatus 10200 may cause the generated image data to be recorded on a recording apparatus (not illustrated) or to be printed out by a printing apparatus (not illustrated).

An example of the in-vivo information acquisition system to which the technology according to the present disclosure can be applied has been described. The technology according to the present disclosure can be applied to, for example, any one of the light source unit 10111 to the control unit 10117 among the configurations described above. Specifically, the imaging apparatus 1 including the ADC 42 illustrated in FIG. 3 and the like can be applied to the imaging unit 10112.

<Application Example to Endoscopic Surgery System>

The technology according to the present disclosure (present technology) is applicable to a variety of products. For example, the technology according to the present disclosure may be applied to an endoscopic surgery system.

Figure 39:
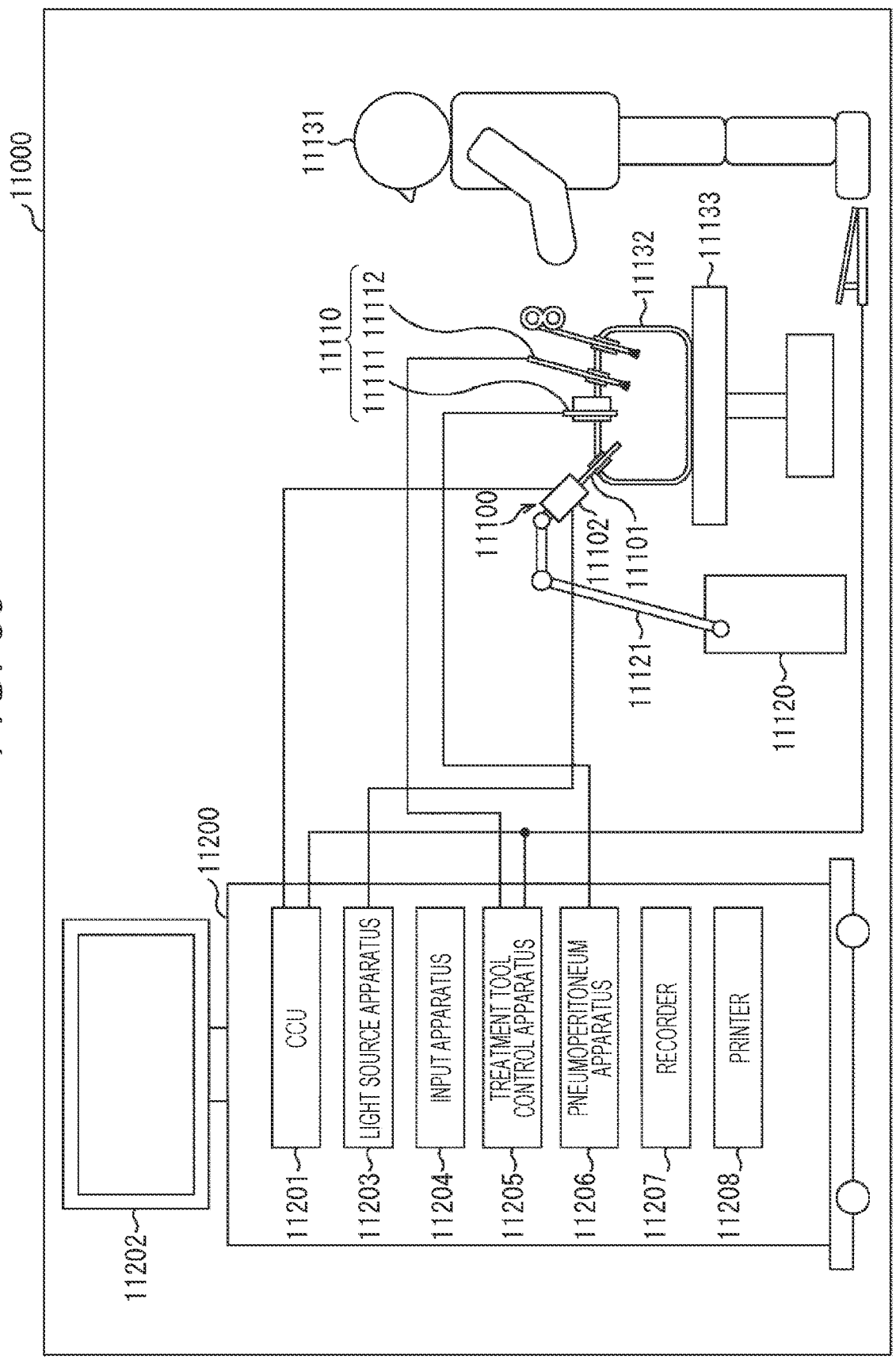
FIG. 39 is a diagram illustrating an example of a schematic configuration of an endoscopic surgery system.

FIG. 39 is a diagram illustrating an example of a schematic configuration of an endoscopic surgery system to which the technology (present technology) according to the present disclosure can be applied.

FIG. 39 illustrates a situation where an operator (doctor) 11131 is performing surgery on a patient 11132 on a patient bed 11133 using the endoscopic surgery system 11000. As illustrated, the endoscopic surgery system 11000 includes an endoscope 11100, other surgical tools 11110, e.g., a pneumoperitoneum tube 11111, an energy treatment tool 11112, or the like, a support arm apparatus 11120 supporting the endoscope 11100, and a cart 11200 on which various apparatuses for an endoscopic surgery are mounted.

The endoscope 11100 includes a lens tube 11101 in which a region of a predetermined length from a tip end, is inserted into the body cavity of the patient 11132, and a camera head 11102 connected to a base end of the lens tube 11101. In the illustrated example, the endoscope 11100 configured as a so-called rigid scope including a rigid lens tube 11101, is illustrated, but the endoscope 11100 may be configured as a so-called flexible scope including a flexible lens tube.

An opening portion into which an objective lens is fitted, is provided on the tip end of the lens tube 11101. A light source apparatus 11203 is connected to the endoscope 11100, and light generated by the light source apparatus 11203 is guided to the tip end of the lens tube by a light guide provided to extend in the lens tube 11101, and is emitted towards an observation target in the body cavity of the patient 11132 through the objective lens. Note that the endoscope 11100 may be a forward-viewing endoscope, or may be an oblique-viewing endoscope or a side-viewing endoscope.

In the camera head 11102, an optical system and an imaging element are provided, and reflection light (observation light) from the observation target, is condensed in the image sensor by the optical system. The observation light is subjected to the photoelectric conversion by the image sensor, and an electrical signal corresponding to the observation light, that is, an image signal corresponding to an observation image, is generated. The image signal is transmitted to a camera control unit (CCU) 11201, as RAW data.

The CCU 11201 includes a central processing unit (CPU), a graphics processing unit (GPU), or the like, and integrally controls the operation of the endoscope 11100 and the display apparatus 11202. Moreover, the CCU 11201 receives the image signal from the camera head 11102 and performs various image processing for displaying the image based on the image signal, for example, as development processing (demosaic processing) or the like, on the image signal.

The display apparatus 11202 displays an image based on the image signal subjected to the image processing by the CCU 11201 according to the control from the CCU 11201.

The light source apparatus 11203, for example, includes a light source such as a light emitting diode (LED) or the like, and supplies the irradiation light at the time of capturing the surgery site to the endoscope 11100.

The input apparatus 11204 is an input interface with respect to the endoscopic surgery system 11000. The user is capable of performing the input of various information items, or the input of an instruction with respect to endoscopic surgery system 11000, through the input apparatus 11204. For example, the user inputs an instruction or the like to change conditions of imaging (type of irradiation light, magnification, focal length, and the like) by the endoscope 11100.

The treatment tool control apparatus 11205 controls the driving of the energy treatment tool 11112 for the cauterization and the incision of the tissue, the sealing of the blood vessel, or the like. In order to ensure a visual field of the endoscope 11100 and to ensure a working space of the surgery operator, the pneumoperitoneum apparatus 11206 sends gas into the body cavity through the pneumoperitoneum tube 11111 such that the body cavity of the patient 11132 is inflated. The recorder 11207 is an apparatus capable of recording various information items associated with the surgery. The printer 11208 is an apparatus capable of printing various information items associated with the surgery, in various formats such as a text, an image, or a graph.

Note that the light source apparatus 11203 that supplies irradiation light when capturing the surgical site to the endoscope 11100 can be configured from, for example, a white light source configured by an LED, a laser light source, or a combination thereof. In a case where the white light source includes a combination of RGB laser light sources, it is possible to control an output intensity and an output timing of each color (each wavelength) with a high accuracy, and thus, it is possible to adjust a white balance of the captured image with the light source apparatus 11203. Furthermore, in this case, laser light from each of the RGB laser light sources is emitted to the observation target in a time division manner, and the driving of the image sensor of the camera head 11102 is controlled in synchronization with the emission timing, and thus, it is also possible to capture an image corresponding to each of RGB in a time division manner. According to such a method, it is possible to obtain a color image without providing a color filter in the image sensor.

Furthermore, the driving of the light source apparatus 11203 may be controlled such that the intensity of the light to be output is changed for each predetermined time. The driving of the image sensor of the camera head 11102 is controlled in synchronization with a timing when the intensity of the light is changed, images are acquired in a time division manner, and the images are synthesized, and thus, it is possible to generate an image of a high dynamic range, without so-called black defects and overexposure.

Furthermore, the light source apparatus 11203 may be configured to supply light of a predetermined wavelength band corresponding to special light imaging. In the special light imaging, for example, light of a narrow band is applied, compared to irradiation light at the time of performing usual observation by using wavelength dependency of absorbing light in the body tissue (i.e., white light), and thus, so-called narrow band imaging of capturing a predetermined tissue of a blood vessel or the like in a superficial portion of a mucous membrane with a high contrast, is performed. Alternatively, in the special light imaging, fluorescent light imaging of obtaining an image by fluorescent light generated by being irradiated with excited light, may be performed. In the fluorescent light imaging, for example, the body tissue is irradiated with the excited light, and the fluorescent light from the body tissue is observed (autofluorescent light imaging), or a reagent such as indian cyanine green (ICG) is locally injected into the body tissue, and the body tissue is irradiated with excited light corresponding to a fluorescent light wavelength of the reagent, and thus, a fluorescent image is obtained. The light source apparatus 11203 can be configured to supply the narrow band light and/or the excited light corresponding to such special light imaging.

Figure 40:
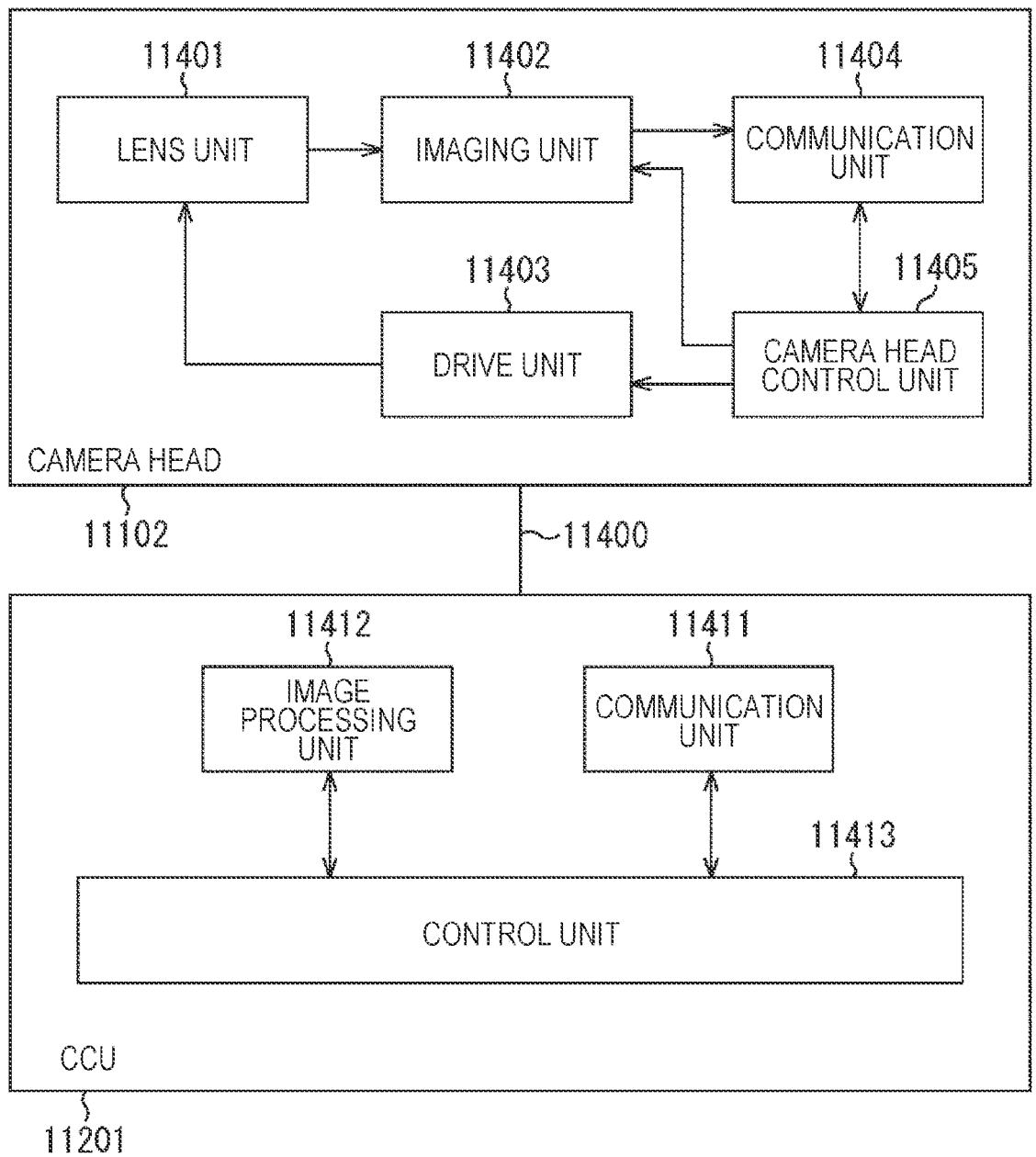
FIG. 40 is a block diagram illustrating an example of a function configuration of a camera head and a CCU.

FIG. 40 is a block diagram illustrating an example of a functional configuration of the camera head 11102 and the CCU 11201 illustrated in FIG. 39.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are connected to be capable of mutual communication through a transmission cable 11400.

The lens unit 11401 is an optical system provided in a connection portion with the lens tube 11101. Observation light incorporated from a tip end of the lens tube 11101 is guided to the camera head 11102 and is incident on the lens unit 11401. The lens unit 11401 includes a combination of a plurality of lenses including a zoom lens and a focus lens.

The image sensor constituting the imaging unit 11402 may be one (so-called single plate type) or plural (so-called multi-plate type). In a case where the imaging unit 11402 is configured as a multi-plate type, for example, image signals corresponding to RGB may be generated by each image sensor, and a color image may be obtained by combining them. Alternatively, the imaging unit 11402 may include a pair of image sensors for respectively acquiring right-eye and left-eye image signals corresponding to 3D (dimensional) display. The 3D display is performed, and thus, the surgery operator 11131 is capable of more accurately grasping the depth of the biological tissue in the surgery portion. Note that, in a case where the imaging unit 11402 is configured by a multi-plate type configuration, a plurality of lens units 11401 may be provided corresponding to each of the image sensor.

Furthermore, the imaging unit 11402 may not be necessarily provided in the camera head 11102. For example, the imaging unit 11402 may be provided immediately after the objective lens, in the lens tube 11101.

The driving unit 11403 includes an actuator, and moves the zoom lens and the focus lens of the lens unit 11401 along the optical axis by a predetermined distance, according to the control from the camera head control unit 11405. Therefore, it is possible to suitably adjust the magnification and the focal point of the image imaged by the imaging unit 11402.

The communication unit 11404 includes a communication apparatus for transmitting and receiving various information items with respect to the CCU 11201. The communication unit 11404 transmits the image signal obtained from the imaging unit 11402 to the CCU 11201 through the transmission cable 11400, as the RAW data.

Furthermore, the communication unit 11404 receives a control signal for controlling the driving of the camera head 11102 from the CCU 11201 and supplies the control signal to the camera head control unit 11405. The control signal, for example, includes information associated with the imaging condition, such as information of designating a frame rate of the imaged image, information of designating an exposure value at the time of the imaging, and/or information of designating the magnification and the focal point of the imaged image.

Note that the imaging conditions such as the frame rate, exposure value, magnification, and focus described above may be appropriately designated by the user, or may be automatically set by the control unit 11413 of the CCU 11201 on the basis of the acquired image signal. In the latter case, a so-called auto exposure (AE) function, an auto focus (AF) function, and an auto white balance (AWB) function are provided in the endoscope 11100.

The camera head control unit 11405 controls the driving of the camera head 11102 on the basis of the control signal from the CCU 11201 received through the communication unit 11404.

The communication unit 11411 includes a communication apparatus for transmitting and receiving various information items with respect to the camera head 11102. The communication unit 11411 receives the image signal to be transmitted from the camera head 11102, through the transmission cable 11400.

Furthermore, the communication unit 11411 transmits the control signal for controlling the driving of the camera head 11102 to the camera head 11102. The image signal and the control signal can be transmitted by electrical communication, optical communication, or the like.

The image processing unit 11412 performs various image processing on the image signal which is the RAW data transmitted from the camera head 11102.

The control unit 11413 performs various types of control related to imaging of the surgical site or the like by the endoscope 11100 and display of a captured image obtained by imaging of the surgical site or the like. For example, the control unit 11413 generates the control signal for controlling the driving of the camera head 11102.

Furthermore, the control unit 11413 causes the display apparatus 11202 to display the captured image of the surgery site or the like on the basis of the image signal subjected to the image processing by the image processing unit 11412. At this time, the control unit 11413 may recognize various objects in the captured image by using various image recognition technologies. For example, the control unit 11413 detects the shape, the color, or the like of the edge of the object included in the captured image, and thus, it is possible to recognize a surgical tool such as forceps, a specific biological portion, bleed, mist at the time of using the energy treatment tool 11112, and the like When the captured image is displayed on the display apparatus 11202, the control unit 11413 may display various surgery support information items to be superimposed on the image of the surgery site, by using a recognition result. Surgery support information is displayed in a superimposed manner and presented to the operator 11131, thereby reducing the burden on the operator 11131 and allowing the operator 11131 to proceed with surgery reliably.

The transmission cable 11400 connecting the camera head 11102 and the CCU 11201 together, is an electrical signal cable corresponding to the communication of the electrical signal, an optical fiber corresponding to the optical communication, or a composite cable thereof.

Here, in the illustrated example, the communication is performed in a wired manner, by using the transmission cable 11400, but the communication between the camera head 11102 and the CCU 11201, may be performed in a wireless manner.

An example of the endoscopic surgery system to which the technology according to the present disclosure can be applied, has been described. Among the configurations described above, the technology according to the present disclosure can be applied to the endoscope 11100, (the imaging unit 11402 of) the camera head 11102, (the image processing unit 11412 of) the CCU 11201, and the like. Specifically, the imaging apparatus 1 including the ADC 42 illustrated in FIG. 3 and the like can be applied to the imaging unit 10402.

Note that, here, although an endoscopic surgery system has been described as an example, the technology according to the present disclosure may be applied to, for example, a microscope surgery system and the like.

<Application Examples to Mobile Objects>

The technology according to the present disclosure (present technology) is applicable to a variety of products. For example, the technology according to the present disclosure may be implemented as apparatuses mounted on any type of movable bodies such as automobiles, electric vehicles, hybrid electric vehicles, motorcycles, bicycles, personal mobilities, airplanes, drones, ships, robots.

Figure 41:
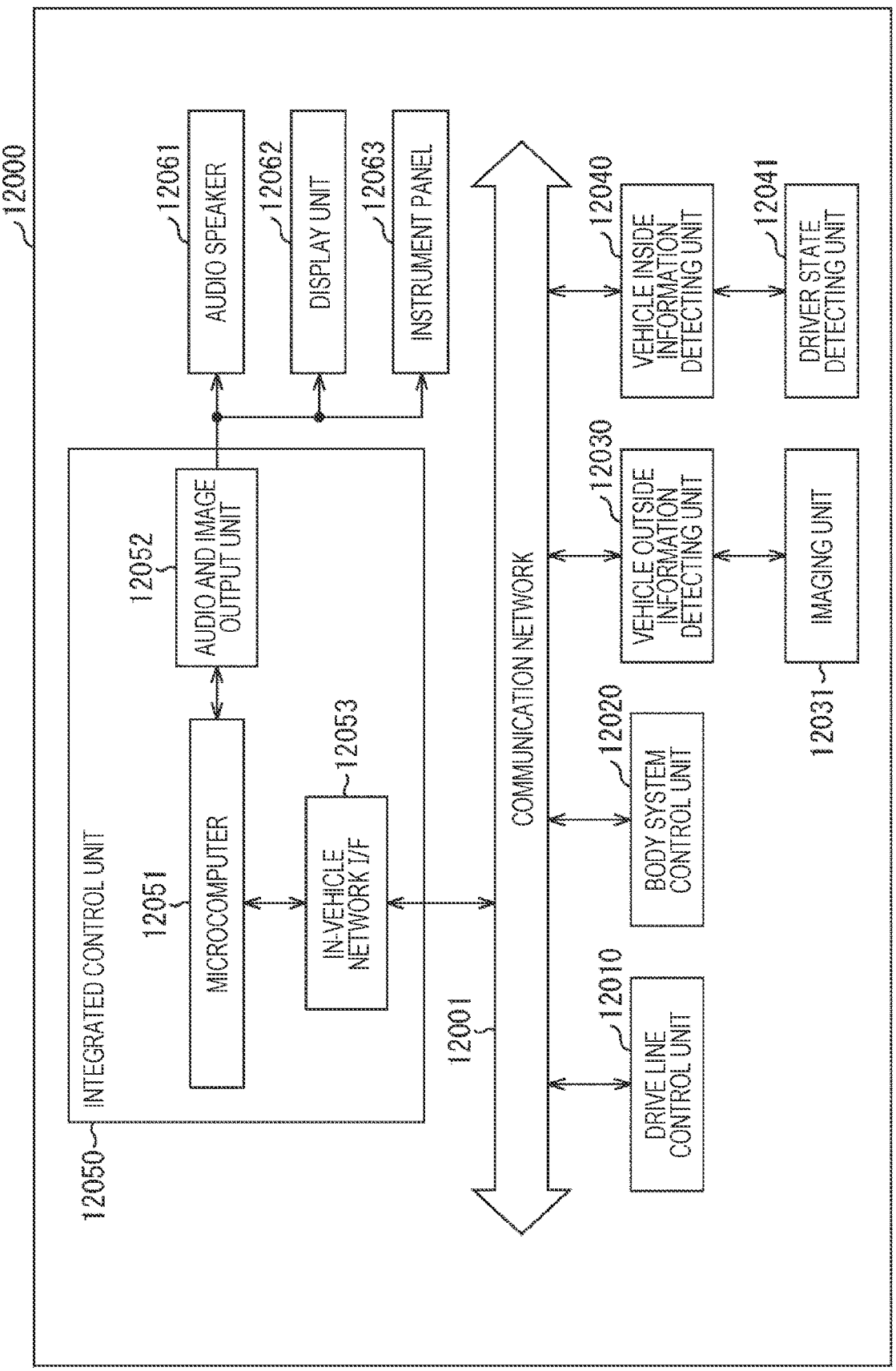
FIG. 41 is a block diagram illustrating a schematic configuration example of a vehicle control system.

FIG. 41 is a block diagram illustrating a schematic configuration example of a vehicle control system, which is an example of a movable body control system to which the technology according to the present disclosure can be applied.

The vehicle control system 12000 includes a plurality of electronic control units connected via a communication network 12001. In the example illustrated in FIG. 41, the vehicle control system 12000 includes a drive line control unit 12010, a body system control unit 12020, a vehicle outside information detecting unit 12030, a vehicle inside information detecting unit 12040, and an integrated control unit 12050. Furthermore, a microcomputer 12051, an audio and image output unit 12052, and an in-vehicle network interface (I/F) 12053 are illustrated as functional configurations of the integrated control unit 12050.

The drive line control unit 12010 controls the operation of apparatuses related to the drive line of the vehicle in accordance with a variety of programs. For example, the drive line control unit 12010 functions as a control apparatus for a driving force generating apparatus such as an internal combustion engine or a driving motor that generates the driving force of the vehicle, a driving force transferring mechanism that transfers the driving force to wheels, a steering mechanism that adjusts the steering angle of the vehicle, a braking apparatus that generates the braking force of the vehicle, and the like.

The body system control unit 12020 controls the operations of a variety of apparatuses attached to the vehicle body in accordance with a variety of programs. For example, the body system control unit 12020 functions as a control apparatus for a keyless entry system, a smart key system, a power window apparatus, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 accepts input of these radio waves or signals, and controls the vehicle door lock apparatus, the power window apparatus, the lights, or the like.

The vehicle outside information detecting unit 12030 detects information regarding the outside of the vehicle including the vehicle control system 12000. For example, the imaging unit 12031 is connected to the vehicle outside information detecting unit 12030. The vehicle outside information detecting unit 12030 causes the imaging unit 12031 to capture images of the outside of the vehicle, and receives the captured image. The vehicle outside information detecting unit 12030 may perform processing of detecting an object such as a person, a car, an obstacle, a traffic sign, or a letter on a road, or processing of detecting the distance on the basis of the received image.

The imaging unit 12031 is an optical sensor that receives light and outputs an electric signal corresponding to the amount of received light. The imaging unit 12031 can output the electric signal as the image or output the electric signal as ranging information. Furthermore, the light received by the imaging unit 12031 may be visible light or invisible light such as infrared light.

The vehicle inside information detecting unit 12040 detects information of the inside of the vehicle. The vehicle inside information detecting unit 12040 is connected, for example, to a driver state detecting unit 12041 that detects the state of the driver. The driver state detecting unit 12041 includes, for example, a camera that images a driver, and the vehicle inside information detecting unit 12040 may compute the degree of the driver's tiredness or the degree of the driver's concentration or determine whether or not the driver has a doze, on the basis of detection information input from the driver state detecting unit 12041.

The microcomputer 12051 can calculate a control target value of the driving force generating apparatus, the steering mechanism, or the braking apparatus on the basis of information regarding the inside and outside of the vehicle acquired by the vehicle outside information detecting unit 12030 or the vehicle inside information detecting unit 12040, and output a control instruction to the drive line control unit 12010. For example, the microcomputer 12051 can perform cooperative control for the purpose of executing the functions of the advanced driver assistance system (ADAS) including vehicle collision avoidance or impact reduction, follow-up driving based on the inter-vehicle distance, constant vehicle speed driving, vehicle collision warning, vehicle lane deviation warning, or the like.

Furthermore, the microcomputer 12051 can perform cooperative control for the purpose of automatic driving or the like for autonomous running without depending on the driver's operation through control of the driving force generating apparatus, the steering mechanism, the braking apparatus, or the like on the basis of information around the vehicle acquired by the vehicle outside information detecting unit 12030 or the vehicle inside information detecting unit 12040.

Furthermore, the microcomputer 12051 can output a control instruction to the body system control unit 12030 on the basis of the information outside the vehicle obtained by the vehicle outside information detecting unit 12030. For example, the microcomputer 12051 can perform the cooperative control for realizing glare protection such as controlling the head light according to a position of a preceding vehicle or an oncoming vehicle detected by the vehicle outside information detecting unit 12030 to switch a high beam to a low beam.

The audio and image output unit 12052 transmits an output signal of at least one of a sound or an image to an output apparatus capable of visually or aurally notifying a passenger of the vehicle or the outside of the vehicle of information. In the example of FIG. 41, an audio speaker 12061, a display unit 12062, and an instrument panel 12063 are exemplified as the output apparatus. For example, the display unit 12062 may include at least one of an onboard display or a head-up display.

Figure 42:
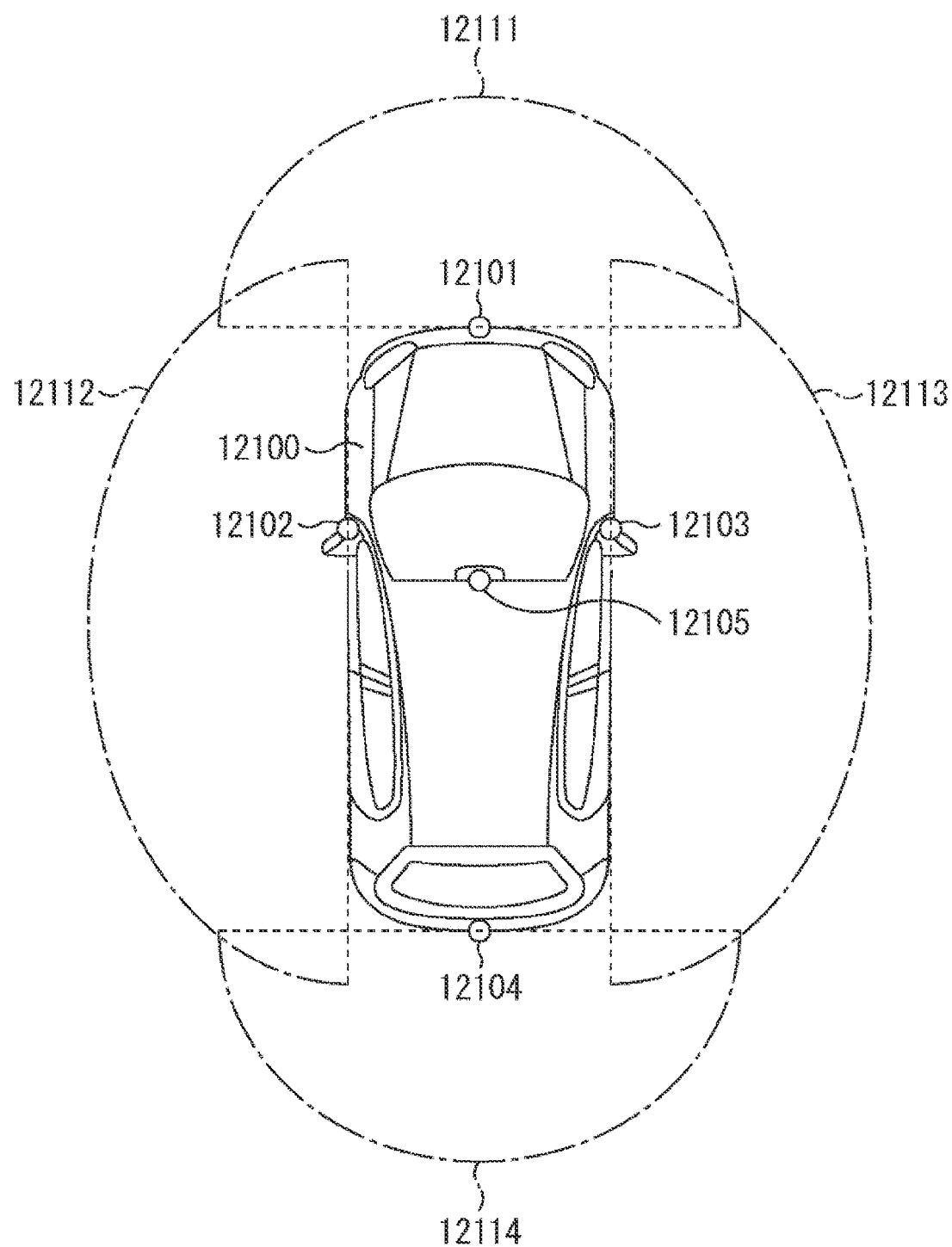
FIG. 42 is an explanatory diagram illustrating an example of an installation position of an imaging unit.

FIG. 42 is a view illustrating an example of an installation position of the imaging unit 12031.

In FIG. 42, imaging units 12101, 12102, 12103, 12104, and 12105 are provided as the imaging unit 12031.

The imaging units 12101, 12102, 12103, 12104 and 12105 are positioned, for example, at the front nose, a side mirror, the rear bumper, the back door, the upper part of the windshield in the vehicle compartment, or the like of a vehicle 12100. The imaging unit 12101 attached to the front nose and the imaging unit 12105 attached to the upper part of the windshield in the vehicle compartment mainly acquire images of the area ahead of the vehicle 12100. The imaging units 12102 and 12103 attached to the side mirrors mainly acquire images of the areas on the sides of the vehicle 12100. The imaging unit 12104 attached to the rear bumper or the back door mainly acquires images of the area behind the vehicle 12100. The imaging unit 12105 attached to the upper part of the windshield in the vehicle compartment is used mainly to detect a preceding vehicle, a pedestrian, an obstacle, a traffic light, a traffic sign, a lane, or the like.

Note that FIG. 42 illustrates an example of the respective imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of obtaining distance information. For example, at least one of the imaging units 12101 to 12104 may be a stereo camera including a plurality of image sensors, or may be an image sensor having pixels for phase difference detection.

For example, the microcomputer 12051 may extract especially a closest three-dimensional object on a traveling path of the vehicle 12100, the three-dimensional object traveling at a predetermined speed (for example, 0 km/h or higher) in a direction substantially the same as that of the vehicle 12100 as the preceding vehicle by determining a distance to each three-dimensional object in the imaging ranges 12111 to 12114 and change in time of the distance (relative speed relative to the vehicle 12100) on the basis of the distance information obtained from the imaging units 12101 to 12104. Moreover, the microcomputer 12051 can set an inter-vehicle distance to be secured in advance from the preceding vehicle, and can perform automatic brake control (including follow-up stop control), automatic acceleration control (including follow-up start control) and the like. In this manner, it is possible to perform the cooperative control for realizing automatic driving or the like to autonomously travel independent from the operation of the driver.

For example, the microcomputer 12051 can extract three-dimensional object data regarding the three-dimensional object while sorting the data into a two-wheeled vehicle, a regular vehicle, a large vehicle, a pedestrian, and other three-dimensional object such as a utility pole on the basis of the distance information obtained from the imaging units 12101 to 12104 and use the data for automatically avoiding obstacles. For example, the microcomputer 12051 discriminates obstacles around the vehicle 12100 into an obstacle visibly recognizable to a driver of the vehicle 12100 and an obstacle difficult to visually recognize. Then, the microcomputer 12051 determines a collision risk indicating a degree of risk of collision with each obstacle, and when the collision risk is equal to or higher than a set value and there is a possibility of collision, the microcomputer 12051 can perform driving assistance for avoiding the collision by outputting an alarm to the driver via the audio speaker 12061 and the display unit 12062 or performing forced deceleration or avoidance steering via the drive line control unit 12010.

At least one of the imaging units 12101 to 12104 may be an infrared camera for detecting infrared rays. For example, the microcomputer 12051 can recognize a pedestrian by determining whether or not there is a pedestrian in the captured images of the imaging units 12101 to 12104. Such pedestrian recognition is carried out, for example, by a procedure of extracting feature points in the captured images of the imaging units 12101 to 12104 as infrared cameras and a procedure of performing pattern matching processing on a series of feature points indicating an outline of an object to discriminate whether or not the object is a pedestrian. When the microcomputer 12051 determines that there is a pedestrian in the captured images of the imaging units 12101 to 12104 and recognizes the pedestrian, the audio and image output unit 12052 controls the display unit 12062 to superimpose a rectangular contour for emphasis on the recognized pedestrian. Furthermore, the audio and image output unit 12052 may control the display unit 12062 to display icons or the like indicating pedestrians at desired positions.

An example of the vehicle control system to which the technology according to the present disclosure is applicable is heretofore described. The technology according to the present disclosure can be applied, for example, to the imaging unit 12031 and the like among the configurations described above. Specifically, the imaging apparatus 1 including the ADC 42 illustrated in FIG. 3 and the like can be applied to the imaging unit 12031.

Note that, in the present specification, the system represents the entire apparatus configured by a plurality of apparatuses.

Note that the effects described in the present description are merely illustrative and are not limitative, and other effects may be provided.

Note that the embodiment of the present technology is not limited to the aforementioned embodiments, but various changes may be made within the scope not departing from the gist of the present technology.

Note that the present technology may be configured as below.

(1)

An imaging apparatus including:

a photoelectric conversion element;

a conversion unit configured to convert a signal from the photoelectric conversion element into a digital signal;

a bias circuit configured to supply a bias current for controlling current flowing through an analog circuit in the conversion unit; and a control unit configured to control the bias circuit on the basis of an output signal from the conversion unit, in which at start of transfer of a charge from the photoelectric conversion element, the control unit boosts a voltage at a predetermined position of the analog circuit.

(2)

The imaging apparatus according to (1), in which the conversion unit converts the signal from the photoelectric conversion element into the digital signal using a slope signal whose level monotonously decreases with time.

(3)

The imaging apparatus according to (1) or (2), in which the control unit performs control to reduce the current flowing through the analog circuit in a case where the level of the output signal is large.

(4)

The imaging apparatus according to any of (1) to (3), in which the control unit performs control to increase the current flowing through the analog circuit in a case where the level of the output signal is small.

(5)

The imaging apparatus according to any of (1) to (4), in which the voltage at the predetermined position of the analog circuit is a voltage of a floating diffusion layer.

(6)

The imaging apparatus according to any of (1) to (5), in which the bias circuit includes a switch, and the control unit controls the switch so that the bias current from the bias circuit is not supplied to the analog circuit at the start of transfer of the charge from the photoelectric conversion element.

(7)

The imaging apparatus according to (6), in which the switch is connected to a ground side at the start of transfer of the charge from the photoelectric conversion element.

(8)

The imaging apparatus according to (6), in which the bias circuit includes a source follower circuit.

(9)

The imaging apparatus according to any of (1) to (5), further including:

a wiring configured to apply a voltage to the predetermined position of the analog circuit, in which a voltage is applied to the wiring at the start of transfer of the charge from the photoelectric conversion element.

(10)

The imaging apparatus according to any of (1) to (5), further including:

a transistor configured to bring a portion receiving supply from the bias circuit and the predetermined position of the analog circuit into a connection or disconnection state, in which at the start of transfer of the charge from the photoelectric conversion element, the transistor is brought into the disconnection state.

(11)

Electronic equipment including:

an imaging apparatus including:

a photoelectric conversion element;

a conversion unit configured to convert a signal from the photoelectric conversion element into a digital signal;

a bias circuit configured to supply a bias current for controlling current flowing through an analog circuit in the conversion unit; and a control unit configured to control the bias circuit on the basis of an output signal from the conversion unit, in which at start of transfer of a charge from the photoelectric conversion element, the control unit boosts a voltage at a predetermined position of the analog circuit.

REFERENCE SIGNS LIST

1 Imaging apparatus
21 Pixel
22 Pixel array unit
23 Time code transfer unit
25 DAC
26 Time code generation unit
28 Output unit
41 Pixel circuit
42 ADC
51 Comparison circuit
52 Data storage unit
61 Differential input circuit
62 Voltage conversion circuit
63 Positive feedback circuit
71 Latch control circuit
72 Latch storage unit
81 to 87, 91 Transistor
101 to 105, 111 to 113 Transistor
401 Judgement unit
501 Bias circuit
511 Transistor
512 Current source
531 Bias circuit
541, 542 Switch
551 Parasitic capacitance
552 Current source
571 Bias circuit
581 Transistor
582 Variable current source
583 Transistor
611 Wiring
612 Parasitic capacitance
631 Transistor
701 Adding unit
702 Source follower
703 Adding unit
721 Adding unit
722 Gain amplifier

The invention claimed is:

1. A light detecting device, comprising:

a first substrate that includes:
a plurality of pixels coupled to a floating diffusion; and
a first part of a differential input circuit shared by the plurality of pixels;

a second substrate laminated to the first substrate, wherein the second substrate includes:
a second part of the differential input circuit coupled to the first part of the differential input circuit;
a feedback circuit coupled to the second part of the differential input circuit; and
a data storage unit coupled to the feedback circuit; and a wiring, wherein the floating diffusion is boosted by a voltage supplied to the wiring.

2. The light detecting device according to claim 1, wherein
the first part of the differential input circuit includes a first input and a second input,
the first input is coupled to the plurality of pixels, and
the second input is coupled to a digital-to-analog converter that controls voltages of a reference signal.

3. The light detecting device according to claim 2, wherein
the reference signal is a slope signal, and
a level of the reference signal monotonously decreases with a time.

4. The light detecting device according to claim 3, further comprising
a comparison circuit that includes the differential input circuit and the feedback circuit, wherein the comparison circuit is configured to:
compare a first signal received at the first input with a second signal received at the second input; and
output an output signal as a result of the comparison.

5. The light detecting device according to claim 4, wherein the feedback circuit is configured to increase a transition speed of the output signal of the comparison circuit.

6. The light detecting device according to claim 5, wherein
the data storage unit includes a latch storage unit, and
the latch storage unit is configured to store a time code based on the output signal.

7. The light detecting device according to claim 6, further comprising a time code transfer unit configured to supply the time code, wherein the time code transfer unit extends to a column direction of the plurality of pixels.

8. The light detecting device according to claim 7, wherein the time code is a Gray code.

9. The light detecting device according to claim 8, wherein the first substrate and the second substrate are electrically connected by a metal bonding.

10. The light detecting device according to claim 9, wherein the first part of the differential input circuit and the second part of the differential input circuit are electrically connected by the metal bonding.

11. A light detecting device, comprising:
a first substrate that includes:
a plurality of pixels; and
a first part of a differential input circuit shared by the plurality of pixels;
a second substrate laminated to the first substrate, wherein the second substrate includes:
a second part of the differential input circuit coupled to the first part of the differential input circuit;
a feedback circuit coupled to the second part of the differential input circuit; and
a data storage unit coupled to the feedback circuit,
wherein the first part of the differential input circuit and the second part of the differential input circuit are electrically connected by a metal bonding; and
a wiring, wherein a floating diffusion is coupled to the plurality of pixels, and the floating diffusion is boosted by a voltage supplied to the wiring.

12. The light detecting device according to claim 11, wherein
the first part of the differential input circuit includes a first input and a second input,
the first input is coupled to the plurality of pixels, and
the second input is coupled to a digital-to-analog converter that controls voltages of a reference signal.

13. The light detecting device according to claim 12, wherein
the reference signal is a slope signal, and
a level of the reference signal monotonously decreases with a time.

14. The light detecting device according to claim 13, further comprising
a comparison circuit that includes the differential input circuit and the feedback circuit, wherein the comparison circuit is configured to:
compare a first signal received at the first input with a second signal received at the second input, and
output an output signal as a result of the comparison.

15. The light detecting device according to claim 14, wherein the feedback circuit is configured to increase a transition speed of the output signal of the comparison circuit.

16. The light detecting device according to claim 15, wherein
the data storage unit includes a latch storage unit, and
the latch storage unit is configured to store a time code based on the output signal.

17. The light detecting device according to claim 16, further comprising a time code transfer unit configured to supply the time code, wherein the time code transfer unit extends to a column direction of the plurality of pixels.

18. The light detecting device according to claim 17, wherein the time code is a Gray code.

19. The light detecting device according to claim 18, wherein the first substrate and the second substrate are electrically connected by the metal bonding.

20. A light detecting device, comprising:
a first substrate that includes:
a plurality of pixels including the specific pixel; and
a first part of a differential input circuit coupled to the specific pixel;
a second substrate laminated to the first substrate, wherein the second substrate includes:
a second part of the differential input circuit coupled to the first part of the differential input circuit;
a feedback circuit coupled to the second part of the differential input circuit; and
a data storage unit coupled to the feedback circuit,
wherein the first part of the differential input circuit and the second part of the differential input circuit are electrically connected by a metal bonding; and
a wiring, wherein a floating diffusion is coupled to the specific pixel, and the floating diffusion is boosted by a voltage supplied to the wiring.

21. The light detecting device according to claim 20, wherein
the first part of the differential input circuit includes a first input and a second input,
the first input is coupled to the specific pixel, and
the second input is connected coupled to a digital-to-analog converter that controls voltages of a reference signal.

22. The light detecting device according to claim 21, wherein
the reference signal is a slope signal, and
a level of the reference signal monotonously decreases with a time.

23. The light detecting device according to claim 22, further comprising
a comparison circuit that includes the differential input circuit and the feedback circuit, wherein the comparison circuit is configured to:

compare a first signal received at the first input with a second signal received at the second input, and output an output signal as a result of the comparison.

24. The light detecting device according to claim 23, wherein the feedback circuit is configured to increase a transition speed of the output signal of the comparison circuit.

25. The light detecting device according to claim 24, wherein the data storage unit includes a latch storage unit, and the latch storage unit is configured to store a time code based on the output signal.

26. The light detecting device according to claim 25, further comprising a time code transfer unit configured to supply the time code, wherein the time code transfer unit extends to a column direction of the plurality of pixels.

27. The light detecting device according to claim 26, wherein the time code is a Gray code.

28. The light detecting device according to claim 27, wherein the first substrate and the second substrate are electrically connected by the metal bonding.

* * * * *